US009245273B2

(12) United States Patent
Nam et al.

(10) Patent No.: US 9,245,273 B2
(45) Date of Patent: Jan. 26, 2016

(54) CONTROL SYSTEM AND METHOD FOR ADVERTISEMENT EXPOSURE

(75) Inventors: Ki-Won Nam, Seoul (KR); Ji-Hyuk Cha, Seoul (KR); Pyong-Taek Kim, Seoul (KR)

(73) Assignee: Ki-Won Nam, Seoul (KR)

( * ) Notice: Subject to any disclaimer, the term of this patent is extended or adjusted under 35 U.S.C. 154(b) by 593 days.

(21) Appl. No.: 12/990,305

(22) PCT Filed: Apr. 30, 2009

(86) PCT No.: PCT/KR2009/002301
§ 371 (c)(1),
(2), (4) Date: Jan. 18, 2011

(87) PCT Pub. No.: WO2009/134096
PCT Pub. Date: Nov. 5, 2009

(65) Prior Publication Data
US 2011/0106628 A1 May 5, 2011

(30) Foreign Application Priority Data

Apr. 30, 2008 (KR) .................. 10-2008-0040917
May 26, 2008 (KR) .................. 10-2008-0048603
Jul. 23, 2008 (KR) .................. 10-2008-0071477
Jul. 23, 2008 (KR) .................. 10-2008-0071888

(51) Int. Cl.
*G06Q 30/00* (2012.01)
*G06Q 30/02* (2012.01)

(52) U.S. Cl.
CPC ............ *G06Q 30/02* (2013.01); *G06Q 30/0251* (2013.01); *G06Q 30/0269* (2013.01); *G06Q 30/0277* (2013.01)

(58) Field of Classification Search
CPC .................................................... G06Q 30/02
See application file for complete search history.

(56) References Cited

U.S. PATENT DOCUMENTS 6,064,967 A * 5/2000 Speicher .................. 705/14.4
6,226,621 B1 * 5/2001 Warsh .................... 705/14.36

(Continued)

FOREIGN PATENT DOCUMENTS

KR    1020000037344 B1    7/2000
KR    1020010086645 A     9/2001

(Continued)

OTHER PUBLICATIONS

International Search Report, Application No. PCT/KR2009/002301, dated Dec. 18, 2009.

*Primary Examiner* — John G Weiss
*Assistant Examiner* — Vincent Cao
(74) *Attorney, Agent, or Firm* — Novick, Kim & Lee, PLLC; Jae Youn Kim

(57) ABSTRACT

A control system and method of advertisement exposure are provided, in which the control system for advertisement exposure includes: a communication unit for communicating via a network with a multiplicity of client terminals, each including a web browser having a main area where a predetermined webpage is output and a sub area different from the main area; a storage unit for storing advertisement information and information about an incentive created to correspond to the advertisement information and offered to a user; and a control unit for outputting the advertisement information to at least one of the main are and sub area, and accumulating a corresponding incentive depending on an amount of viewing by plural users for the advertisement information to output information about the accumulated incentive to the sub area of the web browser. Accordingly, the advertisement information can be exposed more effectively through the web browser.

8 Claims, 47 Drawing Sheets

(56) References Cited

U.S. PATENT DOCUMENTS

| | | | |
|---|---|---|---|
| 6,311,185 B1* | 10/2001 | Markowitz et al. | 705/14.49 |
| 6,804,659 B1* | 10/2004 | Graham et al. | 705/14.49 |
| 2001/0029468 A1* | 10/2001 | Yamaguchi et al. | 705/14 |
| 2002/0052788 A1* | 5/2002 | Perkes et al. | 705/14 |
| 2005/0021397 A1* | 1/2005 | Cui et al. | 705/14 |
| 2005/0283464 A1* | 12/2005 | Allsup et al. | 707/3 |
| 2009/0024469 A1* | 1/2009 | Broder et al. | 705/14 |

FOREIGN PATENT DOCUMENTS

| | | |
|---|---|---|
| KR | 1020020066350 A | 8/2002 |
| KR | 1020060045900 A | 5/2006 |
| KR | 1020060056655 A | 6/2006 |
| KR | 1020080017178 A | 2/2008 |

* cited by examiner

CONTROL SYSTEM AND METHOD FOR ADVERTISEMENT EXPOSURE

TECHNICAL FIELD

The present invention relates to a control system and method for advertisement exposure, and more particularly, to a control system and method for advertisement exposure, which output advertisement information to a web browser of a client terminal connected via a network.

BACKGROUND ART

An online advertisement market and a shopping market are the markets which aim to effectively expose advertisement or shopping information to many customers and lead products or services (hereinafter, referred to as collectively "products") into product purchase after all. To achieve this purpose, a variety of advertisement techniques or shopping revitalization techniques are being introduced.

In one example, the present applicant applied for patent, entitled "member-integrated rewards point offering system and method of offering the same" (Korean Patent Application Nos. 10-2006-45900 and 10-2006-56655), which can motivate advertisement viewing and achieve shopping revitalization by making it possible that rewards earned upon a plurality of customers' viewing an advertisement are accumulated in real time by integrated processing, and when a certain customer makes a product purchase, the accumulated rewards are offered as a discount rate of a corresponding purchase price.

In order to more effectively utilize such an invention as "member-integrated rewards point offering system and method of offering the same", it is necessary to further increase the frequency of exposure of advertisement information and the amount of viewing by users for the advertisement information.

However, the conventional advertisement exposure method, which simply exposes advertisement information on a web page output through a web browser, has a limitation in greatly increasing the frequency of exposure of advertisement information and the amount of viewing by users for the advertisement information.

DISCLOSURE

Technical Problem

It is, therefore, an object of the present invention to provide a control system and method for advertisement exposure, which are capable of more effectively exposing advertisement information through a web browser.

Technical Solution

In accordance with one aspect of the present invention, there is provided a control system for advertisement exposure, the system comprising: a communication unit for performing communication via a network with a plurality of client terminals, each including a web browser having a main area where a predetermined web page is output and a sub area different from the main area; a storage unit that stores advertisement information and information on an incentive created correspondingly to the advertisement information and provided to a user; and a control unit for outputting the advertisement information to at least one of the main area and the sub area, accumulating a corresponding incentive depending on an amount of viewing by plural users for the advertisement information, and outputting information on the accumulated incentive to the sub area of the web browser. Accordingly, the advertisement information can be effectively exposed through the web browser. In addition, it is possible to continuously expose the advertisement information to the sub area independently of a change in contents of the main area, a user's operation, or the like. Moreover, if it is difficult to post an advertisement on the main area, the difficulty can be solved by posting the advertisement on the sub area. Also, the advertisement as well as an incentive corresponding thereto can be exposed, thereby maximizing purchase motivation of the user to thus enhance advertisement effects.

The sub area can be located in a marginal space of a toolbar area of the web browser. Accordingly, it is possible to further ensure that the exposure of advertisement to the sub area can be increased by utilizing an area with minimized exposure limitation while the web browser is open.

The storage unit may classify and store the plurality of advertisement information by category, and the control unit may output advertisement information of a category that matches a web page output to the main area, among the plurality of advertisement information, to the sub area. Thus, the contents of the advertisement information exposed to the sub area may be associated with the main area, thereby more rapidly and conveniently providing advertisement information that corresponds to the intention of a user who wants to obtain such advertisement information.

The control unit may determine a category of the advertisement information that matches a web page output to the main area depending on a first user's input. Thus, a mechanical matching error may be minimized by utilizing the intellectual ability of the user in matching the main area with the advertisement information. Moreover, a large number of users, who have accessed to the network, not a few users, may participate in, enabling a great amount of matching operation more efficiently.

The control unit may verify the category of the advertisement information that matches the web page output to the main area, determined by the first user, depending on a second user's input. Accordingly, other users can correct or supplement the matching result of a user, thereby further improving the accuracy and reliability of matching.

The storage unit may classify and store the plurality of advertisement information by category and further store information on a particular web page, and when the web page output to the main area corresponds to the particular web page, the control unit may output the advertisement information of a category, in which the particular web page is allowed to be exposed, to the sub area.

Accordingly, if the advertisement information of the sub area comes into conflict with the contents of the main area, it is possible to prevent such phenomenon in advance.

The storage unit may classify and store the plurality of advertisement information by category and further stores information on a specific user's field of interest, and the control unit may output the advertisement information of a category that matches the specific user's filed of interest to the sub area of the client terminal of the corresponding user. Accordingly, it is possible to provide the advertisement information that further coincides with the intention of the user.

The storage unit may classify and store the plurality of advertisement information by category, and the control unit may output the advertisement information of a category that matches a user's input value entered through the web browser, among the plurality of advertisement information, to the sub area. Accordingly, it is possible to more quickly and conveniently provide the advertisement information that coincides with the intention of the user.

The storage unit may classify and store the plurality of advertisement information by category, and the control unit may output the advertisement information of a category that matches an email received in the client terminal, among the plurality of advertisement information, to the sub area. Accordingly, it is possible to provide the advertisement information that coincides with the intention of the user by using the information from more various media.

The storage unit may further store information on the registration time of the plurality of advertisement information, and the control unit may preferentially output advertisement information with later registration time, among the plurality of advertisement information, to the sub area. Accordingly, it is possible to enhance the advertisement effect of the new products.

In accordance with another aspect of the present invention, there is provided a control method for advertisement exposure, the method comprising: storing advertisement information and information on an incentive created correspondingly to the advertisement information and provided to a user; outputting the advertisement information to at least one of a main area and a sub area different from the main area, the main area being an area where a predetermined web page on a web browser provided in each of plural client terminals that are communicable via a network is output; and accumulating a corresponding incentive depending on an amount of viewing by plural users for the output advertisement information, and outputting information on the accumulated incentive to the sub area of the web browser.

Accordingly, the advertisement information can be effectively exposed through the web browser. In addition, it is possible to continuously expose the advertisement information to the sub area independently of a change in contents of the main area, a user's operation, or the like. Moreover, if it is difficult to post an advertisement on the main area, the difficulty can be solved by posting the advertisement on the sub area. Also, the advertisement as well as an incentive corresponding thereto can be exposed, thereby maximizing purchase motivation of the user to thus enhance advertisement effects.

The storing may include classifying and storing the plurality of advertisement information by category, and the outputting the advertisement information may include outputting the advertisement information of a category that matches a web page output to the main area, among the plurality of advertisement information, to the sub area. Thus, the contents of the advertisement information exposed to the sub area may be associated with the main area, thereby more rapidly and conveniently providing advertisement information that corresponds to the intention of a user who wants to obtain such advertisement information.

The outputting the advertisement information of a category that matches a web page output may include determining a category of the advertisement information that matches the web page output to the main area depending on a first user's input. Thus, a mechanical matching error may be minimized by utilizing the intellectual ability of the user in matching the main area with the advertisement information. Moreover, a large number of users, who have accessed to the network, not a few users, may participate in, enabling a great amount of matching operation more efficiently.

The outputting the advertisement information of a category that matches a web page output may further include verifying the category of the advertisement information matching the web page output to the main area, determined by the first user, depending on a second user's input. Accordingly, other users can correct or supplement the matching result of a user, thereby further improving the accuracy and reliability of matching.

The storing may include classifying and storing the plurality of advertisement information by category; and storing information on a particular web page, wherein when the web page output to the main area corresponds to the particular web page, the outputting the advertisement information includes outputting the advertisement information of a category, in which the particular web page is allowed to be exposed, to the sub area. Accordingly, if the advertisement information of the sub area comes into conflict with the contents of the main area, it is possible to prevent such phenomenon in advance.

The storing may include classifying and storing the plurality of advertisement information by category; and storing information on a specific user's field of interest, wherein the outputting the advertisement information may include outputting the advertisement information of a category that matches the specific user's filed of interest to the sub area of the client terminal of the corresponding user. Accordingly, it is possible to provide the advertisement information that further coincides with the intention of the user.

The storing may include classifying and storing the plurality of advertisement information by category, wherein the outputting the advertisement information may include outputting the advertisement information of a category that matches a user's input value entered through the web browser, among the plurality of advertisement information, to the sub area. Accordingly, it is possible to more quickly and conveniently provide the advertisement information that coincides with the intention of the user.

The storing may include classifying and storing the plurality of advertisement information by category, wherein the outputting the advertisement information may include outputting the advertisement information of a category that matches an email received in the client terminal, among the plurality of advertisement information, to the sub area. Accordingly, it is possible to provide the advertisement information that coincides with the intention of the user by using the information from more various media.

The control method of advertisement exposure may further comprises storing information on the registration time of the plurality of advertisement information, wherein the outputting the advertisement information may include preferentially outputting advertisement information with later registration time, among the plurality of advertisement information, to the sub area. Accordingly, it is possible to enhance the advertisement effect of the new products.

Advantageous Effects

As described above, in accordance with the present invention, advertisement information can be exposed more effectively through a web browser.

DESCRIPTION OF DRAWINGS

The above and other objects and features of the present invention will become apparent from the following description of preferred embodiments, given in conjunction with the accompanying drawings, in which.

BEST MODE FOR THE INVENTION

Figure 1:
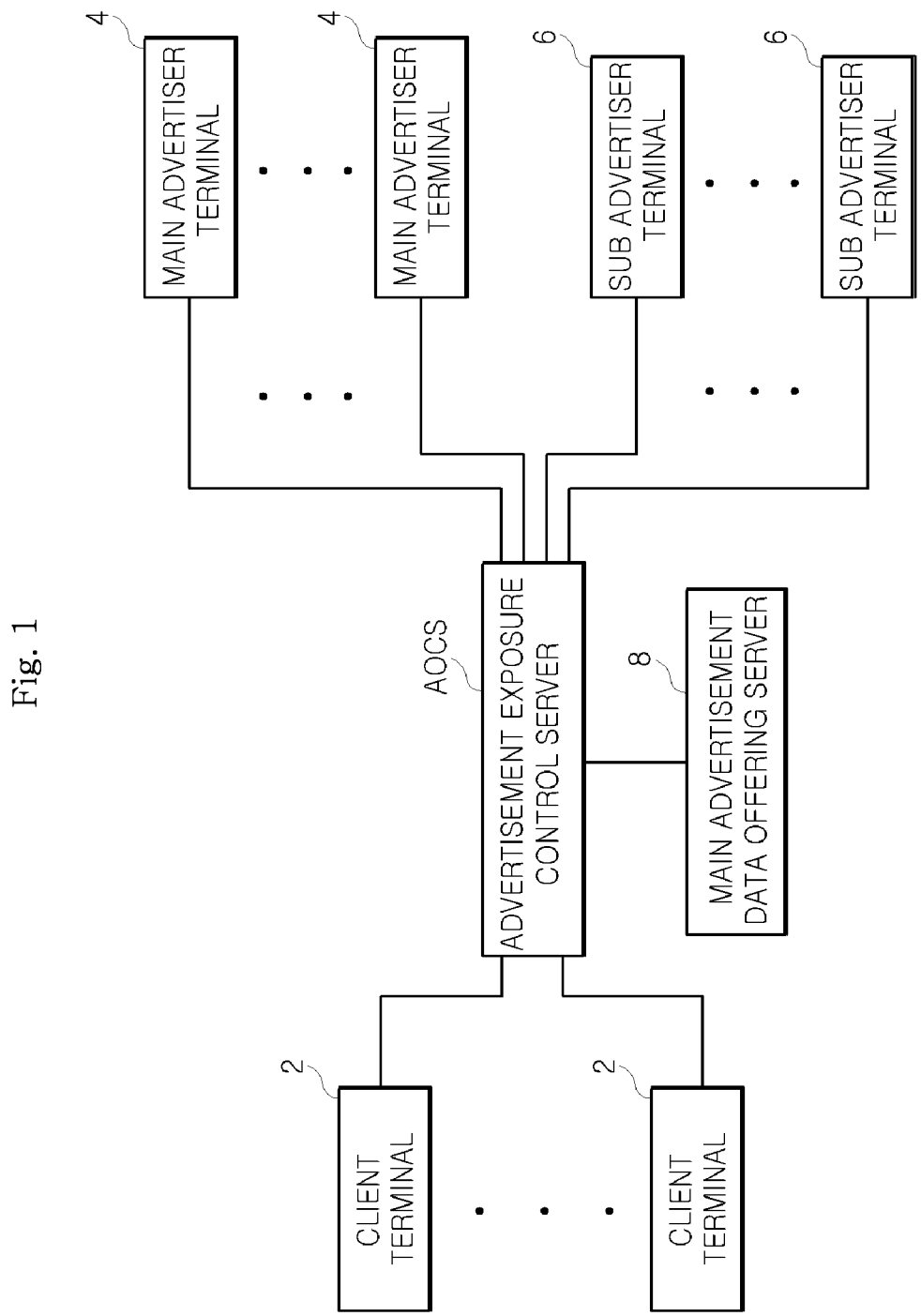
FIG. 1 is a block diagram schematically showing the configuration of a control system for advertisement exposure in accordance with an embodiment of the present invention.
Figure 2:
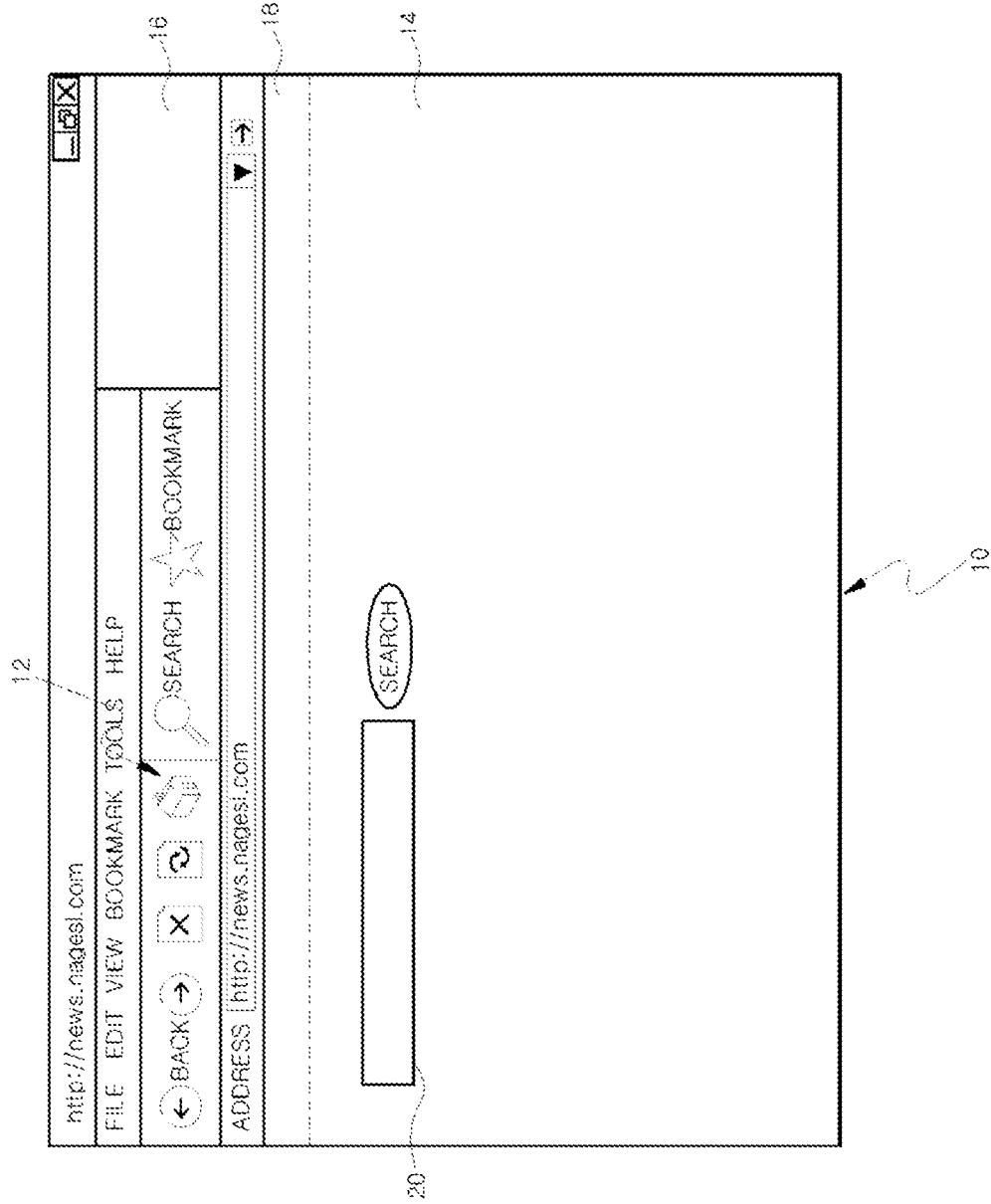
FIG. 2 shows an example of a web browser of a client terminal in accordance with an embodiment of the present invention.

Hereinafter, a control system for advertisement exposure in accordance with an embodiment of the present invention will be described in detail with reference to the accompanying drawings. FIG. 1 is a schematic block diagram showing the configuration of a control system for advertisement exposure in accordance with an embodiment of the present invention. FIG. 2 shows an example of a web browser of a client terminal in accordance with an embodiment of the present invention.

Referring to FIGS. 1 and 2, the control system for advertisement exposure in accordance with an embodiment of the present invention outputs certain advertisement information to a web browser 10 of a client terminal 2 having a main area 14 where main information is output and a sub area 16 different from the main area 14, and also outputs information about an incentive corresponding to the advertisement information to the sub area 16.

In this embodiment, the sub area 16 is a separate area on the web browser 10, which is different from the main area where a certain web page is output as the main information. That is, information about an incentive corresponding to advertisement information determined based on predetermined independent criteria is output to the sub area 16 of this embodiment.

Accordingly, a user can freely perform web surfing through the main area 14, and at the same time continuously receive the information about incentives of advertisement information selected based on various criteria through the sub area 16, thus significantly improving advertisement effects.

In addition, because it is possible to operate the sub area 16 independently from the main area 14, advertisement can be continuously exposed regardless of a change in a particular web page of the main area 14 due to web surfing or the like, unlike advertisements fixed to the corresponding web page of the main area 14. Also, an area on the web browser 10 is utilized as the sub area 16, and therefore, although a user's key input or the like is generated during output of advertisement information, advertisement can be continuously exposed without allowing a window to be minimized, unlike a simple pop-up window.

Moreover, since the sub area 16 is independent from a web page of the main area 14 and can also have an auxiliary function, it is possible to provide, through the sub area 16, advertisement information which the user wants but the web page of the main area 14 does not provide. For instance, if it is difficult to post an advertisement on the web page of the main area 14 due to a difficulty in having an affiliation with a large portal or large shopping mall, the sub area 14 serves as an alternative advertisement medium that can effectively take place of it.

Additionally, if posting the advertisement on the web page of the main area 14 requires an excessive cost, advertisement information may be exposed through the sub area 16 at less cost.

In this embodiment, the content of the main information includes a variety of information, which can be output in a form recognizable to the user, such as advertisements, press releases, blog posts, etc.

In this embodiment, the advertisement information can be output to at least one of the main area 14 and the sub area 16 of the web browser 10.

In this embodiment, the advertisement information can be posted for the advertiser to advertise brands or facilitate the sale of products, and, for example, it can be displayed as items that may be viewed by the user on the Internet web page such as a search portal, news portal, or online shopping mall. The advertisement information can be displayed in the form of text and/or image.

In this embodiment, the advertisement information may include single advertisement information or a plurality of advertisement information. The plurality of advertisement information may be aligned and displayed depending on predetermined rules so that the order thereof is recognizable. For instance, the plurality of advertisement information may be arranged up and down in a list form. In order to indicate the order of the plurality of advertisement information, font sizes, colors, and the like of advertisement information may be differentiated or the advertisement information may be given various emphasis effects such as highlight, flash, dynamic movement, banner, and the like. The plurality of advertisement information may be presented, without limitations, in the shape of pop-up, balloon, or the like.

In this embodiment, an incentive is provided to correspond to corresponding advertisement information to promote advertiser's products or lead them into user's purchase, and corresponds to a profit given to the user. In this embodiment, the incentive includes an economic profit such as money, actual article, service, etc., as well as a spiritual benefit such as a certain behavior that is beneficial to the user so long as its value can be objectively evaluated. Regarding the form of providing such an incentive, the incentive may be provided in various forms, including discounting the price of product to be purchased, providing cash, gift certificate, coupon, point, mileage, and the like, or providing further products in addition to the product to be purchased.

In this embodiment, the incentive-related information includes information about the size of an incentive corresponding to advertisement information. In this embodiment, the size of an incentive can be increased depending on the amount of viewing by plural users for corresponding advertisement information. In this embodiment, the amount of users' viewing refers to a frequency the users view the corresponding advertisement information, the amount of which can be evaluated. For instance, the amount of users' viewing includes the number of times of opening any advertisement information page such as the number of clicks, a viewing duration corresponding to a time from opening the advertisement information page to closing it, the number of users who simultaneously accessed a single advertisement information page, etc.

In this embodiment, the incentive is provided to a user who meets predetermined conditions, and at this time, the size of the incentive of corresponding advertisement information can be decreased by that provided to the corresponding user. In this embodiment, the incentive can be provided to the user upon purchase or upon prize winning of a corresponding product. That is, when a user purchases a product, a corresponding incentive can be offered to the user who purchases the product. Alternatively, when a user applies for any prize winning event of advertisement information, an incentive may be also offered to the user by drawing for a lottery. For instance, the lottery may be drawn regularly or irregularly, and a user who arrives at a predetermined count by counting the number of times of users' visit may be designated as a prize winner.

The control system for advertisement exposure in accordance with this embodiment monitors whether the user views advertisement information output to the main area 14 and/or sub area 16 by communication with the client terminal 2, accumulates a corresponding incentive based on the amount of viewing by plural users for the corresponding advertisement information, and outputs information on the size of the accumulated incentive to the sub area 16.

By this, information about the advertisement information as well as the size of the accumulated incentive for the corresponding advertisement information can be exposed in real time to the sub area 16, thus maximizing the user's will to purchase products to further promote the sale of products.

Referring again to FIG. 1, the control system for advertisement exposure in accordance with an embodiment of the present invention can include an advertisement exposure control server AOCS, which can communicate with at least one client terminal 2 via a wired or wireless network (not shown). Further, the advertisement exposure control server AOCS in accordance with the embodiment of the present invention can communicate with a main advertiser terminal 4 in order to upload main advertisement data as main information to a main advertisement data offering server 8.

In addition, the advertisement exposure control server AOCS in accordance with the embodiment of the present invention can communicate with a sub advertiser terminal 6 in order to upload advertisement information output to the sub area of the web browser of the client terminal 2 and corresponding incentive-related information (hereinafter, referred to as "sub advertisement", "sub advertisement information", or "sub advertisement data"). Alternatively, the control system for advertisement exposure in accordance with the embodiment of the present invention may include the main advertisement data offering server 8.

The advertisement exposure control server AOCS in accordance with the embodiment of the present invention transmits a platform application for communications, etc. to the client terminal 2 to be installed therein. In addition, the advertisement exposure control server AOCS in accordance with the embodiment of the present invention can receive category information and unique code value information for each advertisement included in the main advertisement data from the main advertiser terminal 4, and manage them.

Referring again to FIG. 2, the web browser 10 of this embodiment includes the main area 14 where the main information is output. The main area 14 may have a search window 20 provided therein depending on the characteristics of a web page.

Further, the web browser 10 of this embodiment includes a toolbar area at an upper end of the main area 14. A toolbar icon 12, a URL input window 13, etc. may be arranged in the toolbar area of the web browser 10 of this embodiment. The toolbar icon 12 includes icons relating to move back, move forward, close, refresh, home, search, bookmark, etc. A toolbar 18 may be arranged in the toolbar area of the web browser 10.

As shown in FIG. 2, the sub area 16 of this embodiment may be arranged in a marginal space of the toolbar area of the web browser 10. The toolbar area of the web browser 10 maintains continuous exposure while it is open unless particularly restricted by the user. That is, although the web browser 10 is changed to a different window, the advertisement information determined based on predetermined independent criteria and its corresponding incentive-related information may be continuously output, unlike the web page of the main area 14. Accordingly, advertisement effects can be further improved.

Figure 47:
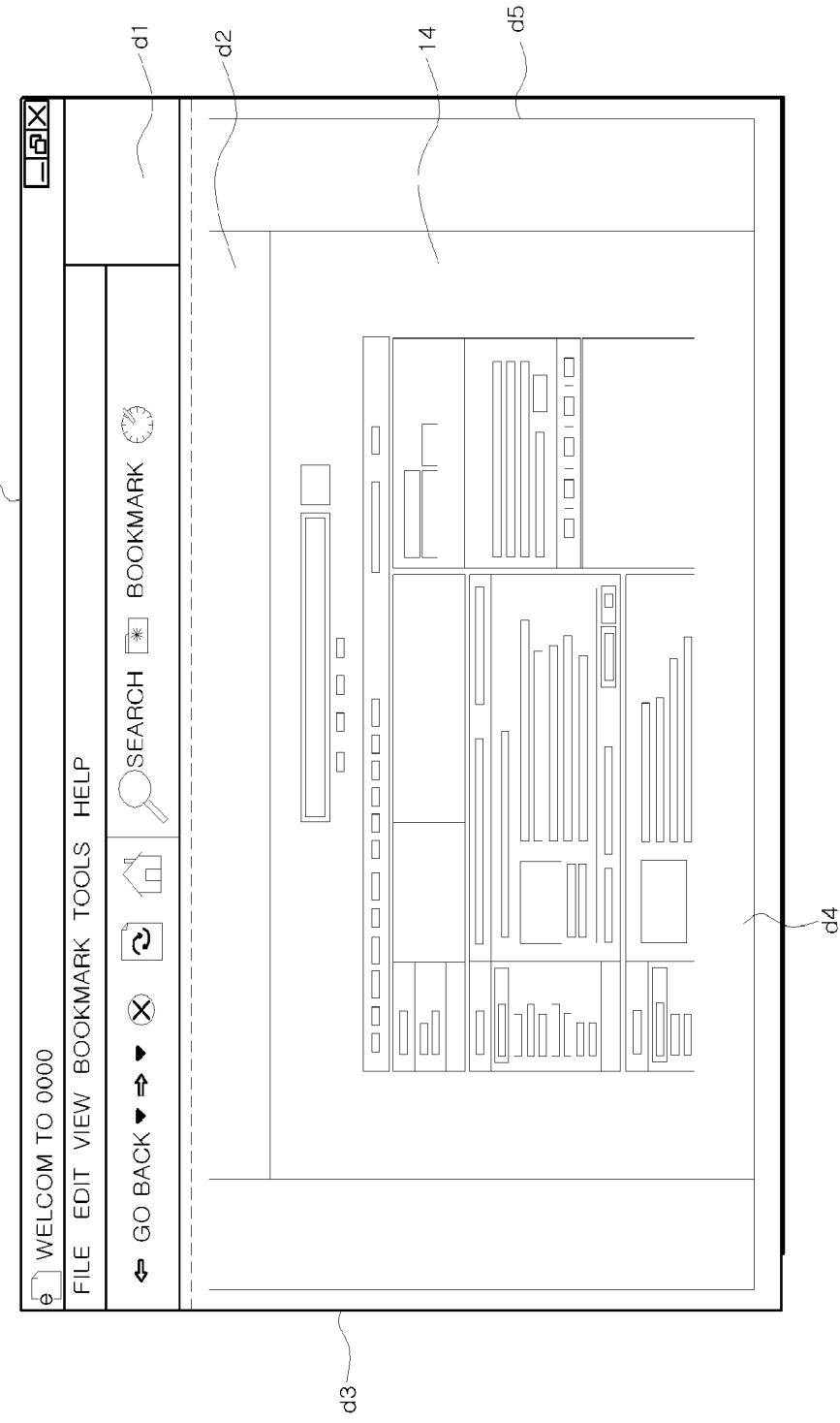
FIG. 47 shows a sub area of a web browser in accordance with still another embodiment of the present invention.

The position, size, form, etc. of the sub area 16 according to the embodiment of the present invention are not limited to those stated above, but may be implemented in various ways depending on various positions of the web browser 10. For instance, as shown in FIG. 47, the sub area in accordance with the embodiment of the present invention may be arranged in a marginal space d1 of the toolbar area, as well as on sides d3 and d5 of the main area 14 of the web browser 10, or at an upper end d2 or lower end d4 the main area 14. Alternatively, the sub area in accordance with the embodiment of the present invention may be put on the main area. Or, the sub area 16 in accordance with the embodiment of the present invention may be arranged freely by the user's setting.

The advertisement exposure control server AOCS in accordance with the embodiment of the present invention may determine a sub advertisement to be output to the sub area 16 based on the relationship with main information to be output to the main area 14. In one example, the advertisement exposure control server AOCS may select a sub advertisement that does not match the main information, namely, a sub advertisement (hereinafter, referred to as non-matching sub advertisement) corresponding to a category different from that of the main information, and then output it to the sub area 16. For instance, if the main information to be output to the main area 14 is an advertisement corresponding to a category of "automobile", an advertisement corresponding to a category such as "electronic appliance", "apartment", or the like, which has a category different from "automobile", may be selected as a sub advertisement to be output to the sub area 16. A category different from the category of the main information of this embodiment is an example of a category which allows a particular web page to be exposed.

Thus, according to the control system for advertisement exposure in accordance with the embodiment of the present invention, it is possible to prevent collision with the main information in advance, which may occur due to the sub advertisement to be output.

The advertisement exposure control server AOCS in accordance with this embodiment checks a web page output to the main area 14, and if the web page corresponds to a particular web page, it may output, to the sub area 16, a sub advertisement having a category different from that of the web page output to the main area 14. The particular web page may be a web page of an advertiser of the sub advertisement.

The sub area 16 may be adjusted in size by the manipulation of the user, or the hidden on the web browser by a hiding function. The size adjustment or hiding functions may be valid only for a predetermined period of time, the control for which is performed by the platform application 26.

Figure 3:
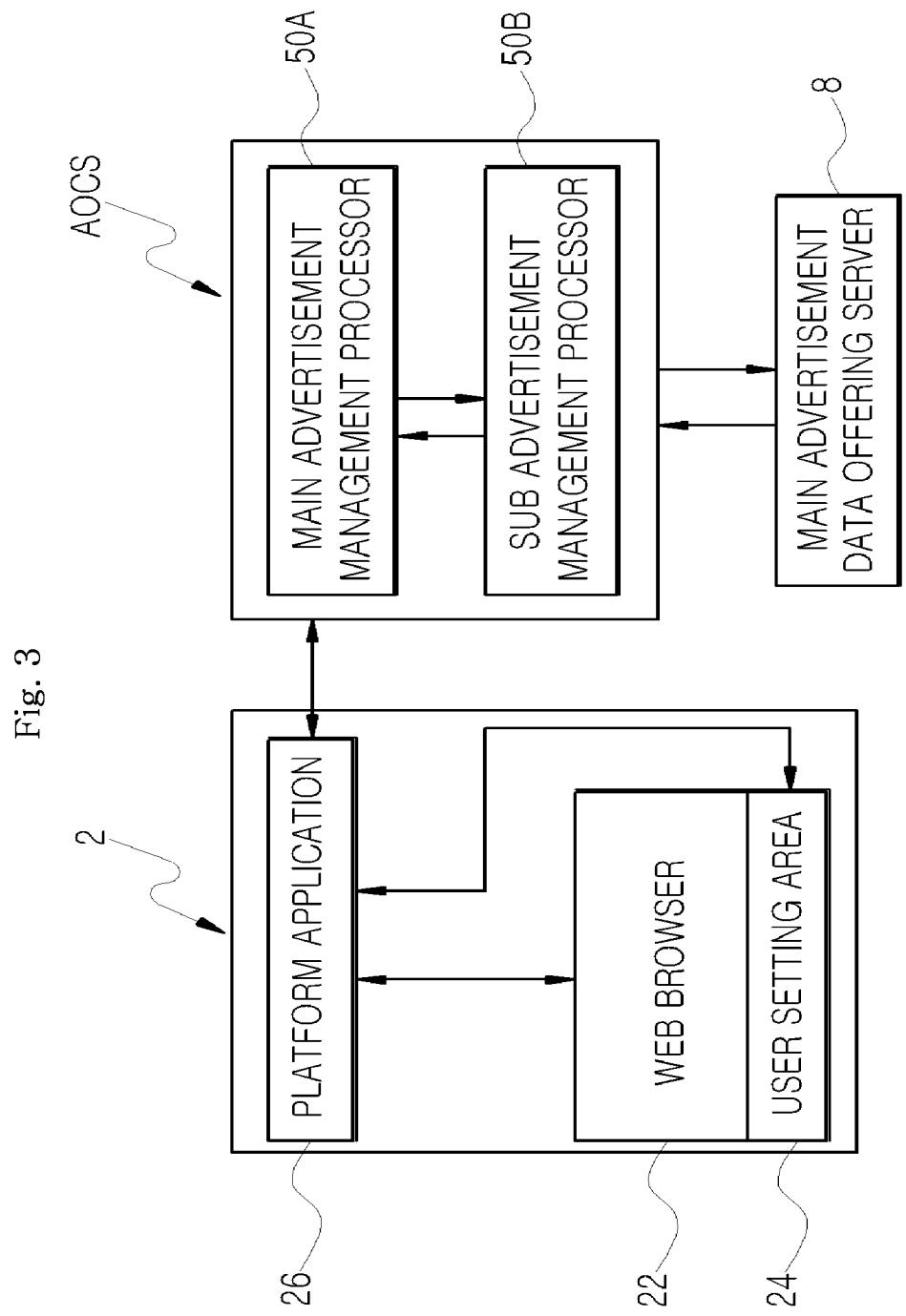
FIG. 3 is a block diagram showing a schematic configuration of the control system for advertisement exposure in accordance with the embodiment of the present invention.

FIG. 3 is a block diagram showing a schematic configuration of the control system for advertisement exposure in accordance with the embodiment of the present invention. Referring to FIG. 3, the advertisement exposure control server AOCS in accordance with the embodiment of the present invention manages main advertisement data and sub advertisement data to be output to the client terminal 2, receives a category code value of the main advertisement data as main information from the platform application 26 installed in the client terminal 2, extracts sub advertisement data that does not match the category code value, and transmits it to the client terminal 2. The advertisement exposure control server AOCS of this embodiment may include a main advertisement management processor 50A for managing the main advertisement data and a sub advertisement management processor 50B for managing the sub advertisement data.

The client terminal 2 may extract a category code value of a corresponding advertisement from the main advertisement data output to the web browsers 10 and 22 and transmit it to the advertisement exposure control server AOCS. Installed in the client terminal 2 may be the platform application 26 for outputting the sub advertisement data transmitted from the advertisement exposure control server AOCS to the sub area 16 of the web browsers 10 and 22.

The platform application 26 allows the toolbar areas of the web browsers 10 and 22 variously set by users to be automatically set to predetermined standard values so that the position and/or size of the sub area 16 can be standardized. By this, although a user setting value of the web browser 10 is different from that of each individual, the position and/or size of the sub area 16 is set equal to the standardized values, thus ensuring that the advertisement information is output.

In a user setting area 24 of FIG. 3, a program block for managing the user setting values of the toolbar area of the web browsers 10 and 22 is shown.

The main advertisement offering server 8 includes a code value indicating a category of main advertisement data in preparing the corresponding advertisement data, and the platform application 26 extracts the category value included in the main advertisement data upon receipt thereof.

The standardization of the toolbar area by the platform application 26 may be adjusted by using, for example, GetProperty function values as follows:

BOOL GetProperty (LPCTSTR ipszProperty, CString& strValue); and

COleVariant GetProperty (LPCTSTR lpszProperty).

That is, the user setting value about the toolbar area of the web browser 10 can be checked by using a CHmlView::GetProperty function, and the output of the sub area 16 to the toolbar area may be adjusted to the standardized value by using CHmlView::GetToolBar, CHmlView::SetToolBar functions.

Figure 4:
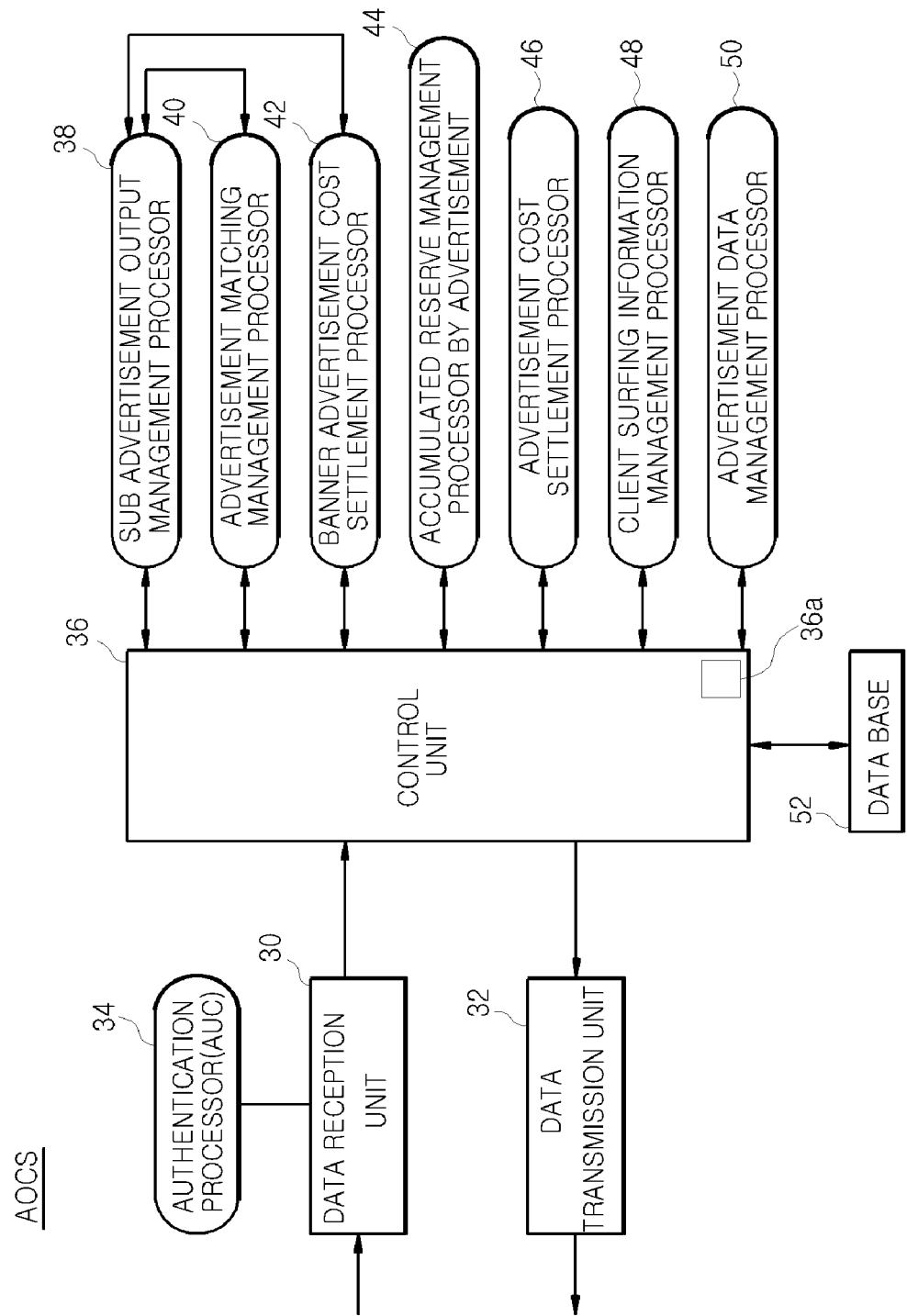
FIG. 4 is a block diagram showing the configuration of an advertisement exposure control server in accordance with the embodiment of the present invention.

FIG. 4 is a block diagram showing the configuration of the advertisement exposure control server AOCS in accordance with the embodiment of the present invention. Referring to FIG. 4, the advertisement exposure control server AOCS in accordance with the embodiment of the present invention may include a data reception unit, a data transmission unit, an authentication processor, a control unit, a sub advertisement output management processor, an advertisement matching management processor, a banner advertisement management processor, an accumulated reserve management processor by advertisement, an advertisement cost settlement processor, a client surfing information management processor, an advertisement data management processor, and a database. The data reception unit and the data transmission unit in accordance with the embodiment of the present invention are an example of a communication unit, and the database in accordance with the embodiment of the present invention is an example of a storage unit.

In another embodiment, at least one of the authentication processor, the sub advertisement output management processor, the advertisement matching management processor, the banner advertisement management processor, the accumulated reserve management processor by advertisement, the advertisement cost settlement processor, the client surfing information management processor, and the advertisement data management processor as shown in FIG. 4 may be incorporated in the control unit.

Reference numeral 30 denotes the data reception for receiving the advertisement data and category code data from the client terminal 2, the main advertiser terminal 4 and the sub advertiser terminal 6. Reference numeral 32 denotes a data transceiver for performing transmission of an advertisement data acknowledgment signal and sub advertisement data to the client terminal 2, the main advertiser terminal 4 and the sub advertiser terminal 6.

Reference numeral 34 denotes the authentication processor for performing a user authentication process when the client terminal 2, the main advertiser terminal 4 and the sub advertiser terminal 6 are connected.

Reference numeral 36 denotes the control unit for performing the control of each processor and performing transmission of advertisement data to the client terminal 2, the main advertiser terminal 4 and the sub advertiser terminal 6, and reference numeral 36a denotes a timer for counting time for information change of the sub advertisement data.

Reference numeral 38 denotes the sub advertisement output management processor for performing a process of extracting the sub advertisement based on the category code value of the main advertisement transmitted from the client terminal 2.

Reference numeral 40 denotes the advertisement matching management processor for managing whether a category of the main advertisement data matches that of the sub advertisement data so that non-matching sub advertisement is output to the sub area 16, by linking with the sub advertisement output management processor 38.

Reference numeral 42 denotes the banner advertisement management processor for performing the control such that the banner advertisement is output as the sub advertisement data for a predetermined period of time, by linking with the sub advertisement output management processor 38.

Reference numeral 44 denotes the accumulated reserve management processor by advertisement for receiving a main advertisement and sub advertisement click signal from the client terminal 2 and calculating an advertisement cost per click (CPC), and, when a banner advertisement output time has lapsed, allowing accumulated reserve information corresponding to the advertisement information as an incentive to be output to the sub area 16. The unit reserve accumulated per click may be determined based on an advertisement cost per click and a predetermined reserving rate. In this embodiment, the advertisement cost per click, the unit reserve, the reserving rate, and the like are an example of the incentive-related information.

Reference numeral 46 denotes the advertisement cost settlement processor for settling the cost of the sub advertisement and main advertisement per click, receiving a click signal of the sub advertisement while the main advertisement is output, and allowing a certain rate of the advertisement cost to be conserved to the main advertiser.

Reference numeral 48 denotes the client surfing information management processor for receiving category information of a web site to which the corresponding user visited through the platform application 26 installed in the client terminal 2, and managing client surfing information to determine which category of sub advertisement is to be output later.

Reference numeral 50 denotes the advertisement data management processor for receiving the sub advertisement data and main advertisement data from the advertiser terminal and managing them.

Reference numeral 52 denotes the database for storing the sub advertisement data and main advertisement data, storing banner advertisement data output as the sub advertisement data and accumulated reserve information by product output as the sub advertisement data, and banner advertisement output time data, and storing code information by respective categories.

The control unit in accordance with the embodiment of the present invention may include a ROM (implementable by a hard disk drive, or the like) which is a non-volatile memory that stores a computer program programmed to execute the above-described functions, an RAM which is a volatile memory in which at least part of the computer program stored in the ROM is loaded, and a processor such as a CPU for executing the computer program loaded in the RAM.

Figure 5:
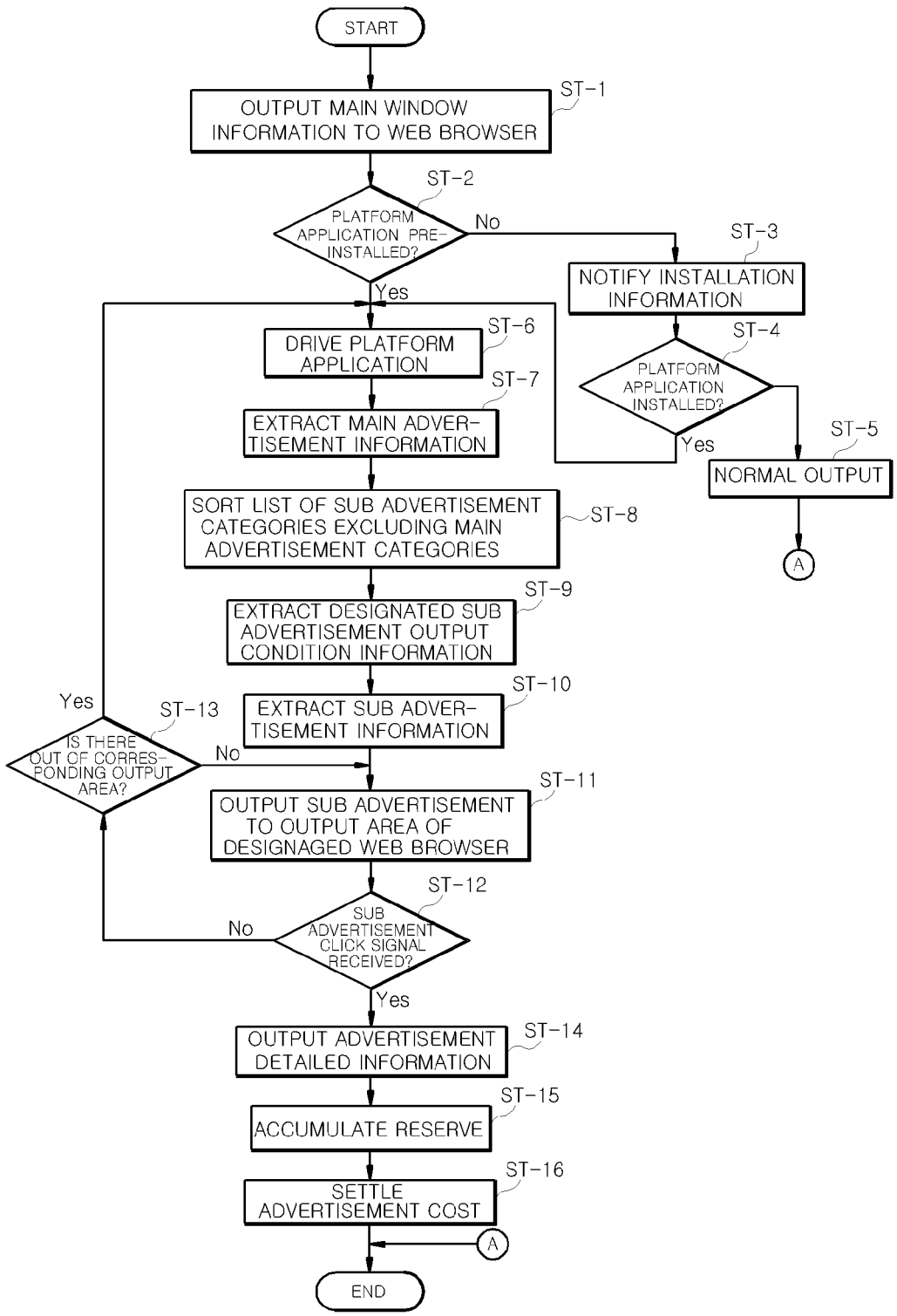
FIG. 5 is a flowchart describing the operation of the control system for advertisement exposure in accordance with the embodiment of the present invention

FIG. 5 is a flowchart showing the operation of the control system for advertisement exposure in accordance with the embodiment of the present invention. First, when the user has access to the main advertisement data offering server 8 which offers a web site such as a search portal, shopping mall, or the like through the client terminal 2, the advertisement exposure control system in accordance with the embodiment of the present invention outputs a web page of the web site as the main information to the main area 14 on the web browser 10 executed by the client terminal 2 (ST-1). The user's access to the main advertisement data offering server 8 may also include access through a link via the advertisement exposure control server AOCS.

The advertisement exposure control system determines whether or not the platform application 26 is installed in the client terminal 2 (ST-2). If the platform application 26 is not installed in the client terminal 2, the advertisement exposure control system outputs information about installation of the platform application 26 to the web browser 10 (ST-3), and checks whether or not the user wants to install the platform application 26 (ST-4).

If the user does not want to install the platform application 26, the advertisement exposure control system outputs the main information as in a general operation (ST-5). On the other hand, if the user wants to install the platform application 26, the advertisement exposure control system installs the platform application 26 in the client terminal 2 and then proceeds to step ST-6 upon completion of such installation.

Meanwhile, if the client terminal 2 had access to the advertisement exposure control server AOCS, the advertisement exposure control server AOCS can determine whether or not the platform application 26 is installed to induce such installation.

In step ST-2, if the platform application 25 has been already installed in the client terminal 2, the platform application 26 is driven (ST-6), such that category information of the main advertisement is extracted as the main information output to the web browser 20 of the client terminal 10 (ST-7).

The category information of the main advertisement includes at least one of the category code value and unique advertisement code value. The category of the main advertisement may be determined by the platform application 22 in the client terminal 2 or the advertisement exposure control system. In latter case, the advertisement exposure control system may determine the category of the corresponding main advertisement by analyzing the main information of the web site to which the user has currently accessed.

In step ST-7, the client terminal 2 transmits the category code value of the main advertisement to the advertisement exposure control server AOCS, wherein the advertisement exposure control server AOCS aligns a list of sub advertisement categories of non-matching sub advertisements corresponding to the category, excluding the category of the corresponding main advertisement (ST-8).

The advertisement exposure control server AOCS extracts a designated sub advertisement or certain advertisement data from a list of pre-aligned sub advertisement categories (ST-10), and outputs the sub advertisement data to the sub area 16 of the web browser 10 of the client terminal 2 (ST-11).

Next, the advertisement exposure control server AOCS determines whether or not a click signal of the corresponding sub advertisement is received from the client terminal 2 (ST-12). That is, upon receipt of the click signal with respect to the sub advertisement, the platform application 26 of the client terminal 2 outputs the corresponding click information to the advertisement exposure control server AOCS.

If the sub advertisement click signal is received from the client terminal 2, the advertisement exposure control server AOCS outputs detailed information of the corresponding sub advertisement to the web browser 10 of the client terminal 2 (ST-14), and accumulates a certain amount of reserve with respect to the corresponding advertisement information in reward for the corresponding click (ST-15). The detailed information of the sub advertisement includes detailed information of products and information about a hyperlink connected to the advertiser site upon click.

On the other hand, if the sub advertisement click signal is not received from the client terminal 2, the advertisement exposure control server AOCS determines whether there is out of a corresponding advertisement output area by communication with the platform application 26 installed in the corresponding client terminal 2 (ST-13).

Meanwhile, the advertisement exposure control server AOCS settles, between the main advertiser and the sub advertiser, an advertisement cost which is incurred due to the output of the main advertisement and by clicking the sub advertisement (ST-14).

Figure 6:
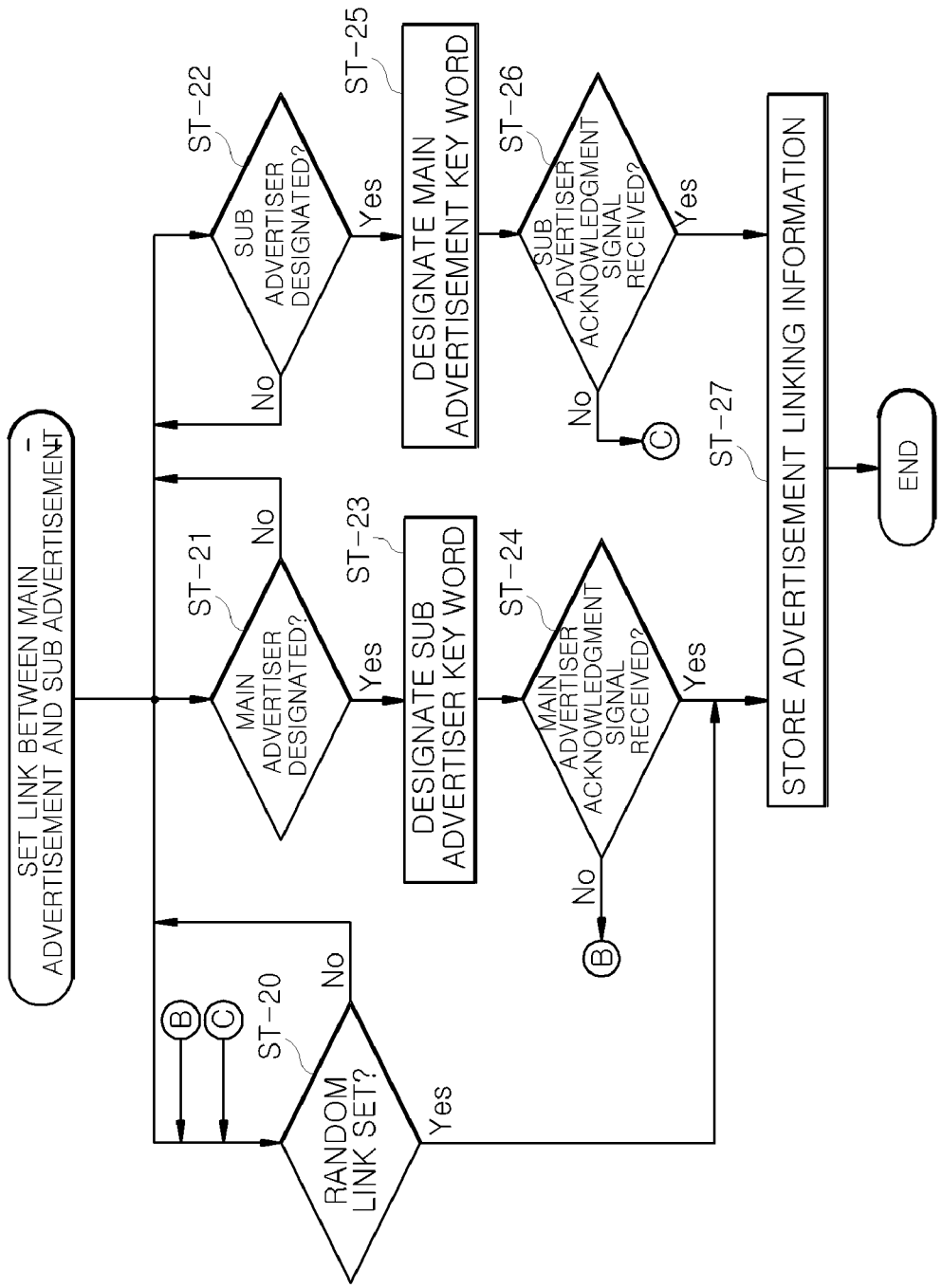
FIGS. 6 and 7 are flowcharts describing the operation of setting link between a main advertisement and a sub advertisement in the control system for advertisement exposure in accordance with the embodiment of the present invention.
Figure 7:
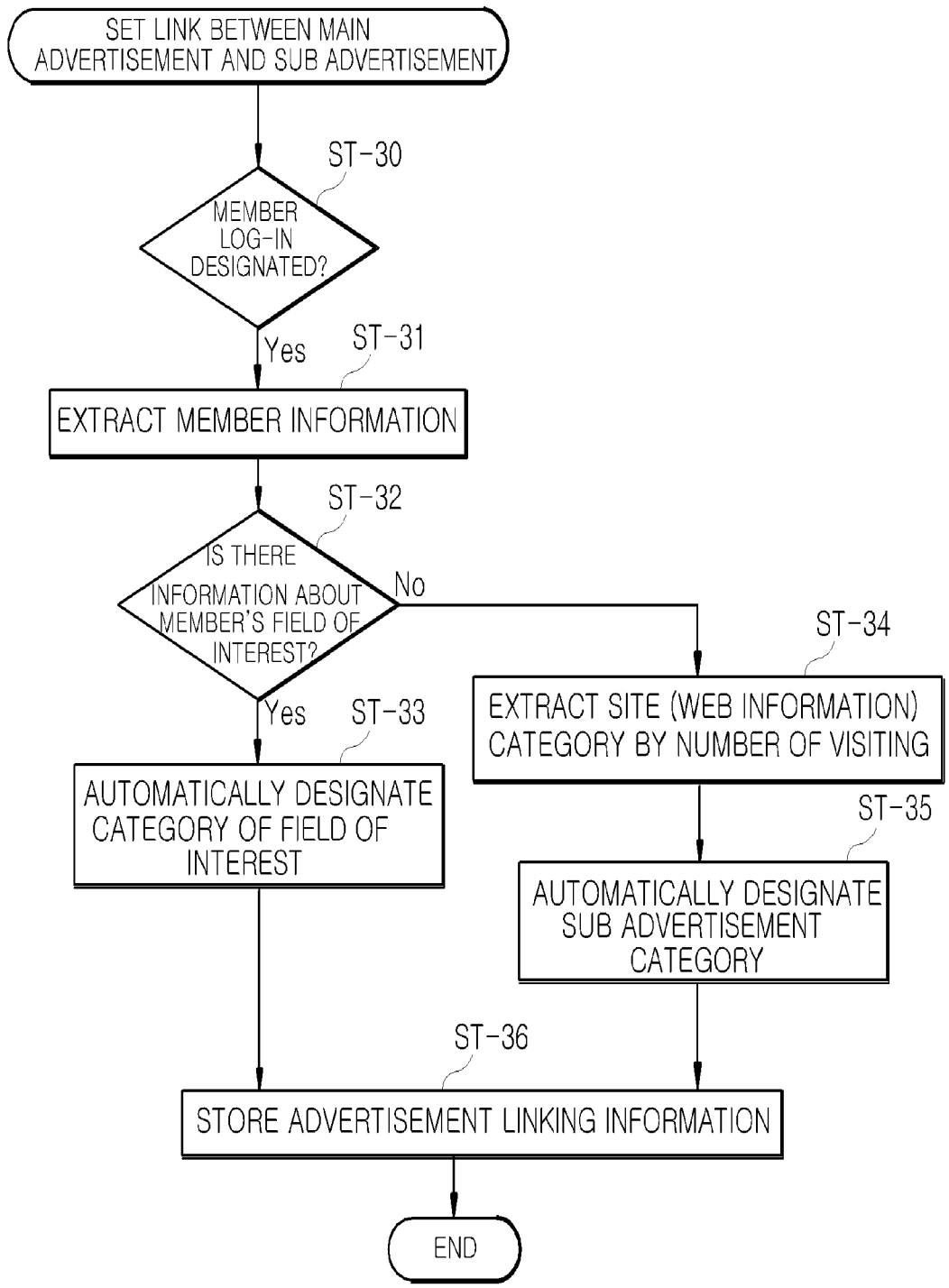

FIGS. 6 and 7 are flowcharts describing the operation of establishing a link between the main advertisement and sub advertisement in the control system for advertisement exposure in accordance with the embodiment of the present invention.

First, the advertisement exposure control system in accordance with the embodiment of the present invention may perform the process of establishing link between the main advertisement and the sub advertisement, which is a pre-processing process of the sub advertisement output process shown in FIG. 5.

In this embodiment, the process of establishing link between the main advertisement and the sub advertisement may be performed in two ways, as shown in FIGS. 6 and 7.

First, referring to FIG. 6, the main advertiser or the sub advertiser has access to the advertisement exposure control server AOCS through the main advertiser terminal 4 or the sub advertiser terminal 6 and can then establish information on advertisements to be linked with each other (ST-21 and ST-23, ST-22 and ST-25).

That is, the advertisement exposure control server AOCS determines whether or not a random link establishment signal is received from the main advertiser terminal 4 and the sub advertiser terminal 6 (ST-24, ST-26), and stores corresponding advertisement linking information if the random link establishment signal is received (ST-27).

Even in case of random link, the present invention basically does not simultaneously output the main advertisement and the sub advertisement included in the same category to a single screen of the web browser 10 to be exposed. That is, even in case of random advertisement link, the present invention basically extracts non-matching advertisement information through the process of FIG. 5 and exposes it.

The advertisement exposure control server AOCS determines whether or not a designation signal of a particular main advertisement (e.g., "AAA") is received from the sub advertiser terminal 6 (ST-21), and if the designation signal is received, the advertisement exposure control server AOCS designates a key word (e.g., "BBB") of the advertisement of the corresponding sub advertiser (ST-23) and transmits the corresponding sub advertisement information to the main advertiser terminal 4.

Then, the main advertiser checks the corresponding sub advertisement information based on the key word of the corresponding sub advertisement, and determines whether or not the sub advertisement is to be exposed to a certain area of the web browser 10 of the client terminal 2 where its own main advertisement is output.

The advertisement exposure control server AOCS determines whether an acknowledgment signal is received from the main advertiser terminal 4 (ST-24), and stores the corresponding advertisement linking information (ST-27).

Then, when "AAA" is output as the main advertisement of the web browser 10 of the client terminal 2 later, the advertisement of "BBB" can be output as its sub advertisement.

Meanwhile, the linking may be also made in an opposite way to the above case. Namely, the advertisement exposure control server AOCS determines whether or not a designation signal of a particular sub advertisement (e.g., "BBB") is received from the main advertiser terminal 4 (ST-22), and if the designation signal is received, the advertisement exposure control server AOCS designates a key word (e.g., "AAA") of the advertisement of the corresponding main advertiser (ST-25) and transmits the corresponding main advertisement information to the sub advertiser terminal 5.

Then, the sub advertiser checks the corresponding main advertisement information based on the key word of the corresponding main advertisement, and determines whether or not its own sub advertisement is to be exposed to a certain area of the web browser 10 of the client terminal 2, where the main advertisement is output, when it is output.

The advertisement exposure control server AOCS determines whether an acknowledgment signal is received from the sub advertiser terminal 6 (ST-26), and stores the corresponding advertisement linking information (ST-27).

FIG. 7 shows a process of establishing link so that a sub advertisement corresponding to a category of user's field of interest is exposed.

First, the advertisement exposure control server AOCS determines whether or not a log-in signal is applied from the client terminal 2 (ST-30), and extracts corresponding member information (ST-31).

The advertisement exposure control server AOCS determines whether or not there exists information about the field of interest among the corresponding member information (ST-32), and, if there exists the information about the field of interest, automatically designates a category of the corresponding field of interest (ST-33) and stores its advertisement linking information (ST-36).

In addition, although not shown, the advertisement exposure control server AOCS transmits a corresponding sub advertisement category code to the platform application 26 installed in the client terminal 2, and when the main advertisement is output to the web browser 10, the platform application 26 transmits a corresponding category information value of interest to the advertisement exposure control server AOCS together with the category information of the main advertisement.

On the other hand, if there is no description of the field of interest in the member information, the advertisement exposure control server AOCS extracts a category of the web site (web information) by the number of times of corresponding member's visit (ST-34), automatically designates its sub advertisement category (ST-35), and stores information thereon (ST-36).

That is, the advertisement exposure control server AOCS receives information about a web site to which the user visited through the web browser 10 or information about a category (e.g., in case of shopping mall) the user clicked, from the platform application 26 installed in the client terminal 2, and can manage the same by clients, to thereby determine which category of sub advertisement data is to be transmitted to the client terminal 2.

Figure 8:
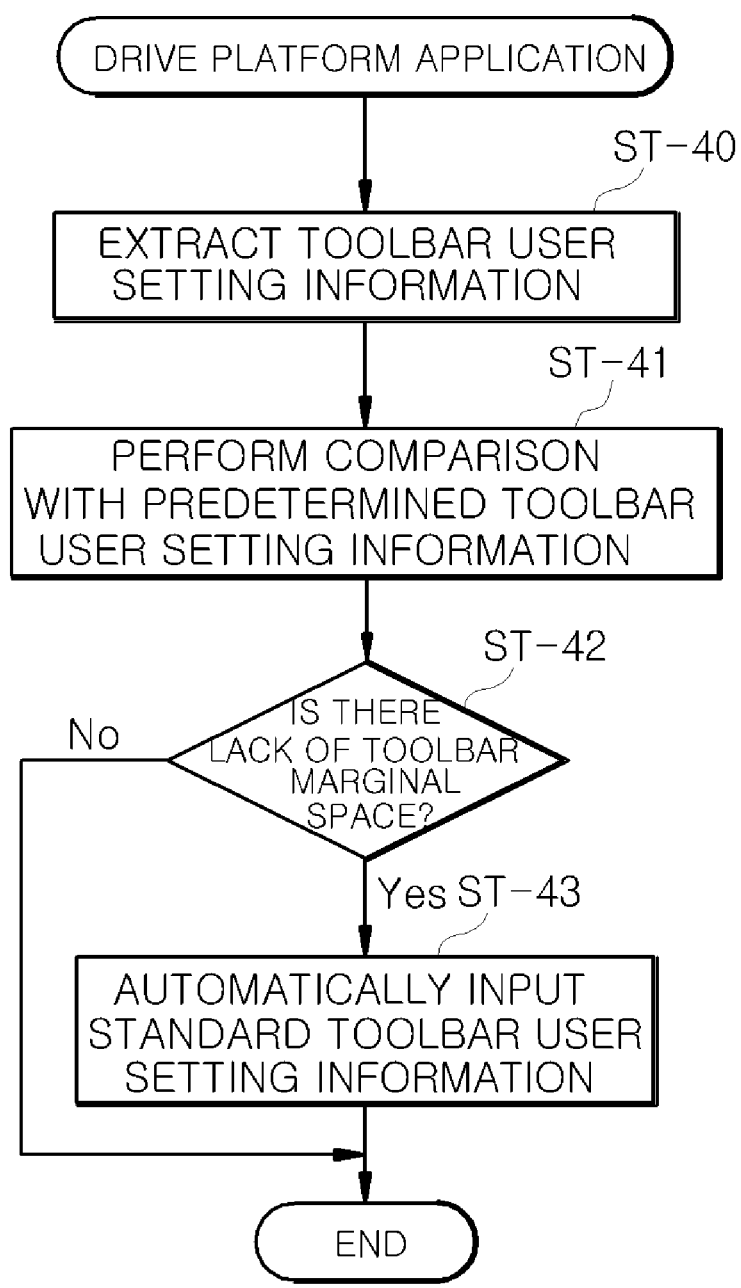
FIG. 8 is a flowchart describing the operation of a platform application in accordance with the embodiment of the present invention.

FIG. 8 is a flowchart describing the operation of the platform application 26 in accordance with the embodiment of the present invention.

First, the platform application 26 installed in the client terminal 2 changes a user setting value relating to the toolbar area of the web browser 10 to a standard value to standardize the position and/or size of the sub area 16, so that the sub advertisement can be properly exposed.

The platform application 26 extracts a user setting value regarding the toolbar area of the web browser 10 at the time of initial installation (ST-40), and compares it with predetermined user setting information, i.e., the standardized value (ST-41).

The platform application 26 determines whether the position and/or size of the sub area 16 is improper based on the currently set user setting value, namely, the marginal space in the toolbar area is insufficient (ST-42). If it is not sufficient, the user setting value is replaced by the standard value (ST-43).

In another embodiment, the platform application 26 may automatically change may automatically change the user setting value of the toolbar area to the standardized value regardless of the security or insecurity of the marginal space in the toolbar area.

Figure 9:
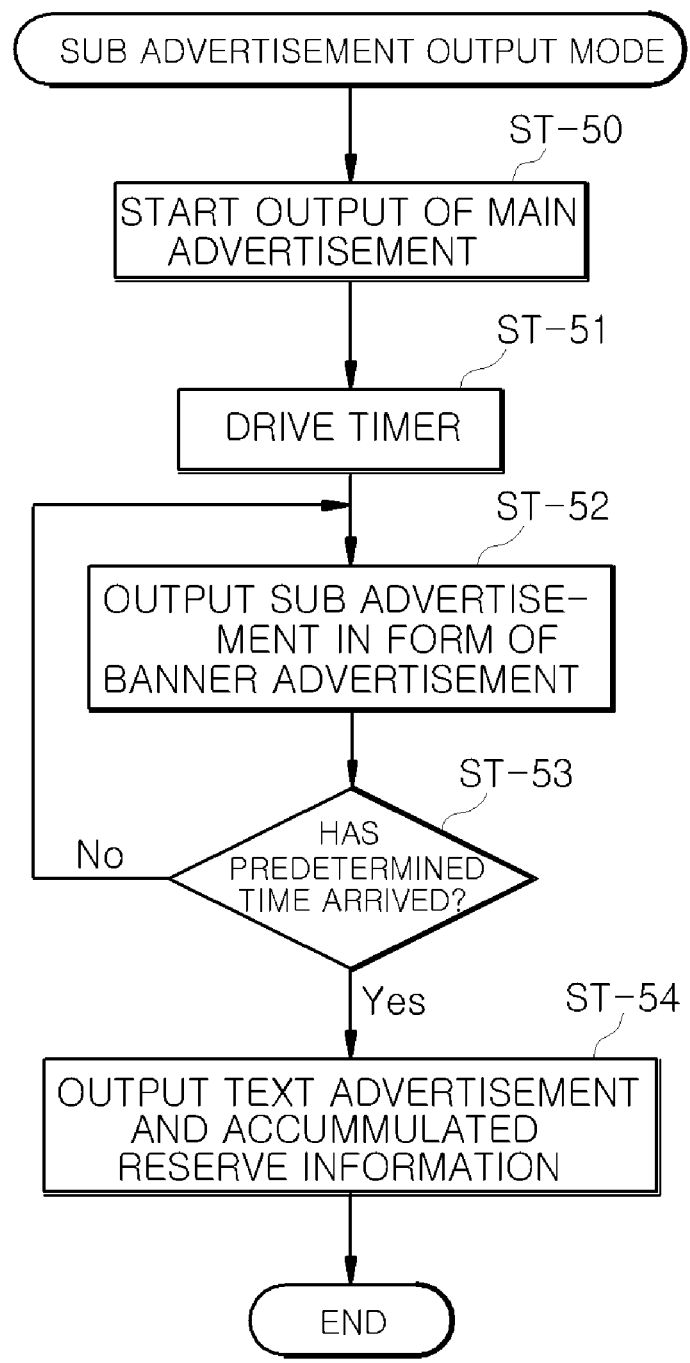
FIG. 9 is a flowchart describing the operation for time linking output control of a sub advertisement in the control system for advertisement exposure in accordance with the embodiment of the present invention.

FIG. 9 is a flowchart describing a time link output control operation of the sub advertisement in the control system for advertisement exposure in accordance with the embodiment of the present invention.

First, the advertisement exposure control system in accordance with the embodiment of the present invention performs the control so as to output the corresponding sub advertisement in the form of banner advertisement for a predetermined period of time when it is output, and output accumulated reserve information of the corresponding advertisement information when the predetermined period of time has elapsed.

Thus, when the main advertisement data is output to the screen through the web browser 10 of the client terminal 2, the platform application 26 installed in the client terminal 2 also transmits information to the advertisement exposure control server AOCS, indicating that the corresponding main advertisement data has been output (ST-50).

The advertisement exposure control server AOCS drives the timer (ST-51) and checks an output time of the main advertisement, and extracts certain sub advertisement data and transmits it to the client terminal 2. Then, the client terminal 2 outputs the transmitted sub advertisement data to the sub area 16 of the web browser 10 (ST-52). The sub advertisement data of this embodiment includes advertisement data that is obtained by combining images and text in the form of banner advertisement.

The advertisement exposure control server AOCS determines whether or not a preset time has arrived (ST-53), and, when the preset time has arrived, extracts accumulated reserve information corresponding to the sub advertisement and transmits it to the client terminal 2. Then, the client terminal 2 outputs the accumulated reserve information corresponding to the sub advertisement to the sub area 16 of the web browser 10 (ST-54).

In this embodiment, the accumulated reserve is an example of the incentive as described above and increased by a certain unit of amount (hereinafter, referred to as "CPC") whenever a plurality of users clicks the corresponding sub advertisement. The accumulated reserve may be used as a discount cost of a corresponding purchase price when any one user purchases a product of the corresponding sub advertisement. The accumulated reserve is varied by clicking the sub advertisement by the user. If there is a plurality of sub advertisements, their sort order may be changed.

The advertisement exposure control server AOCS may output all or part of the plurality of sub advertisements to the sub area 16. Also, the advertisement exposure control server AOCS may preferentially output a sub advertisement with large accumulated reserve among the plurality of sub advertisements.

Figure 10:
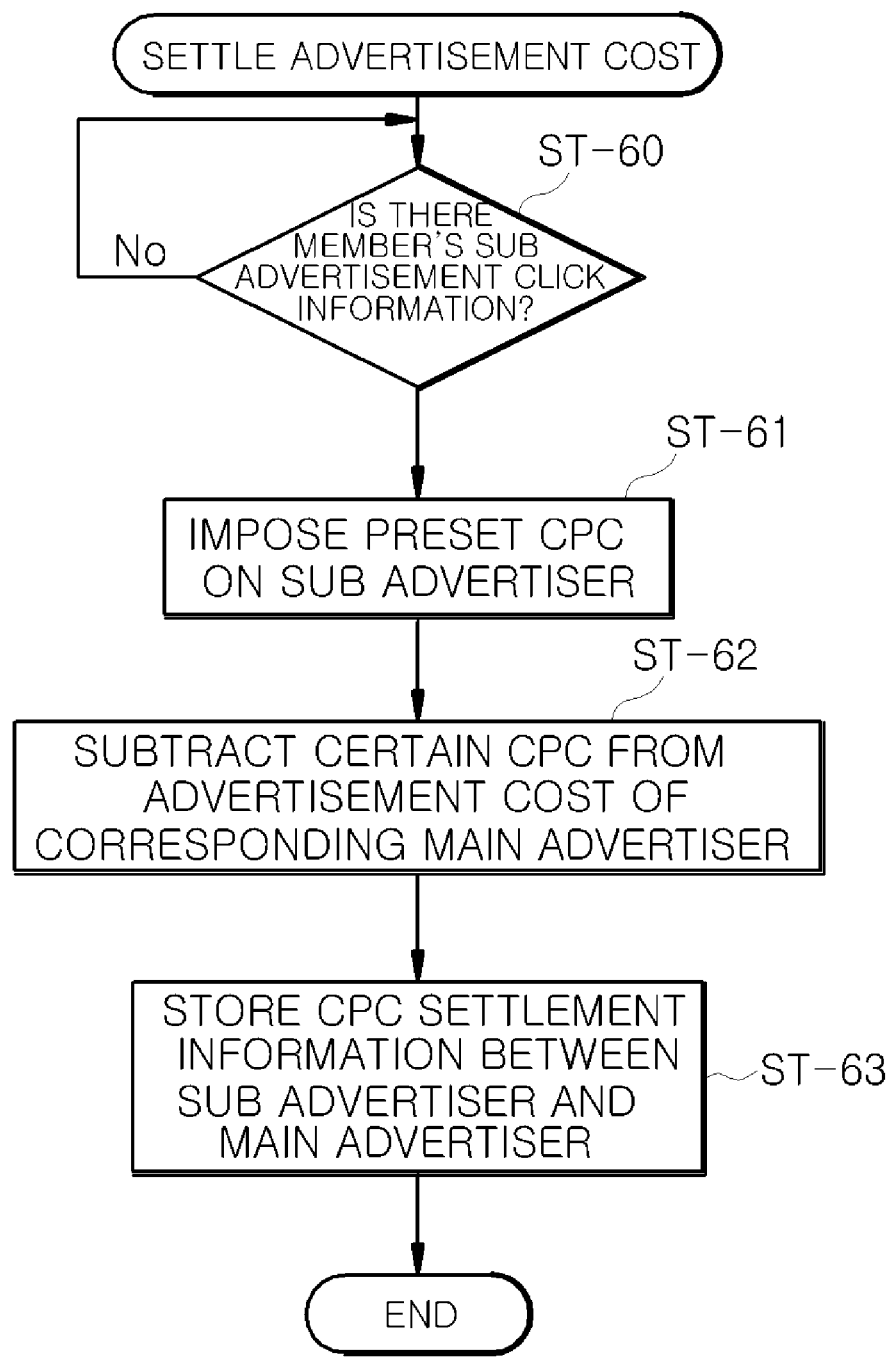
FIG. 10 is a flowchart describing an advertisement cost settling process of the control system for advertisement exposure in accordance with the embodiment of the present invention.

FIG. 10 is a flowchart describing an advertisement cost settling process of the control system for advertisement exposure in accordance with the embodiment of the present invention.

In the advertisement exposure control system in accordance with the embodiment of the present invention, it is necessary to differentially settle an advertisement cost incurred from simultaneously exposing the main advertisement and the sub advertisement to the same web browser In particular, because the sub advertisement is exposed to a portion of the web browser 10 of the client terminal 2 where the main advertisement is output, the advertisement exposure control system in accordance with the embodiment of the present invention allows part of the advertisement cost that must be paid by the sub advertiser to be paid to the main advertiser upon click of the sub advertisement.

First, the advertisement exposure control server AOCS determines whether or not a user's sub advertisement click signal is received from the platform application 26 installed in the client terminal 2 (ST-60).

If the user's sub advertisement click signal is received from the platform application 26, the advertisement exposure control server AOCS imposes a predetermined advertisement cost per click (CPC) on the sub advertiser (ST-61), and subtracts a partial cost of the cost per click (CPC) of the sub advertiser from a total of advertisement cost of the advertiser of the main advertisement exposed to the web browser 10 along with the corresponding sub advertisement (ST-62). In alternative embodiment, the category of the sub advertisement exposed to the sub area 16 may be preset by the main advertiser. In addition, the sub advertisement may be set to be exposed to the sub area 16 from a time when a predetermined period of time set by the main advertiser has elapsed since the main advertisement is exposed.

The advertisement exposure control server AOCS stores the corresponding advertisement cost settlement information (ST-63).

According to the advertisement exposure control system in accordance with the embodiment of the present invention, the main advertiser motivates the sub advertiser to expose the sub advertisement to the same web browser, and the sub advertiser can expose advertisements at a relatively small advertisement cost. Thus, both sides are high in profit.

Figure 11:
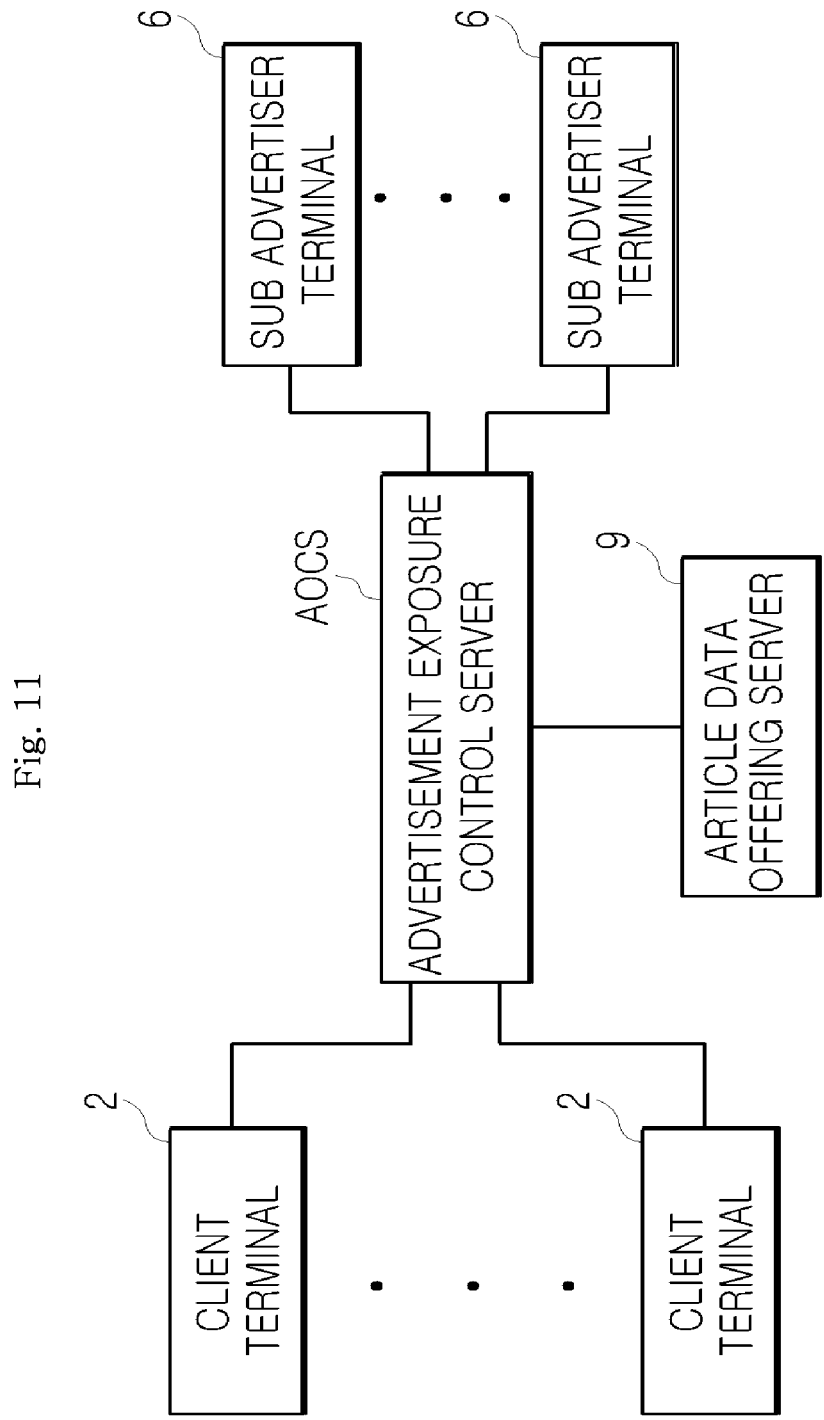
FIG. 11 shows a schematic configuration of a control system for advertisement exposure in accordance with another embodiment of the present invention.

Hereinafter, a control system for advertisement exposure in accordance with another embodiment of the present invention will be described in detail with the accompanying drawings. FIG. 11 shows a schematic configuration of the control system for advertisement exposure in accordance with this embodiment. The description of the components of the advertisement expose control system of this embodiment identical or similar to those of the embodiment as described above will be omitted.

Referring to FIG. 11, the advertisement exposure control system in accordance with this embodiment is configured to expose the sub advertisement to the marginal space of the toolbar area of the web browser 10 to be matched with the contents of the web page such as press releases, blog, café, etc. in the main area 14 of the web browser 10, namely, to the sub area 16, and to pay the advertisement cost to the manager of the press, blog, or café that uploaded the corresponding article upon click of the corresponding sub advertisement.

Hereinafter, in this embodiment, a description will be typically made with respect to an embodiment in which a sub advertisement matching the article data is output as the contents of the web page.

In this embodiment, the client terminal 2 has access to the article data offering server 9 to output the received article data to the main area 15 of the web browser 10, and outputs sub advertisement data matching the corresponding article data to the sub area 16 of the web browser 10 by communication with the advertisement exposure control server AOCS. Upon click of the sub advertisement, the client terminal 2 may transmit the click signal to the advertisement exposure control server AOCS.

In this embodiment, the sub advertiser terminal 6 uploads the sub advertisement data to be output to the sub area 16 of the web browser 10 of the client terminal 2 to the advertisement exposure control server AOCS. The article data offering server 9 can upload and store a plurality of article data. In this embodiment, the article data is an example of the main information.

Figure 12:
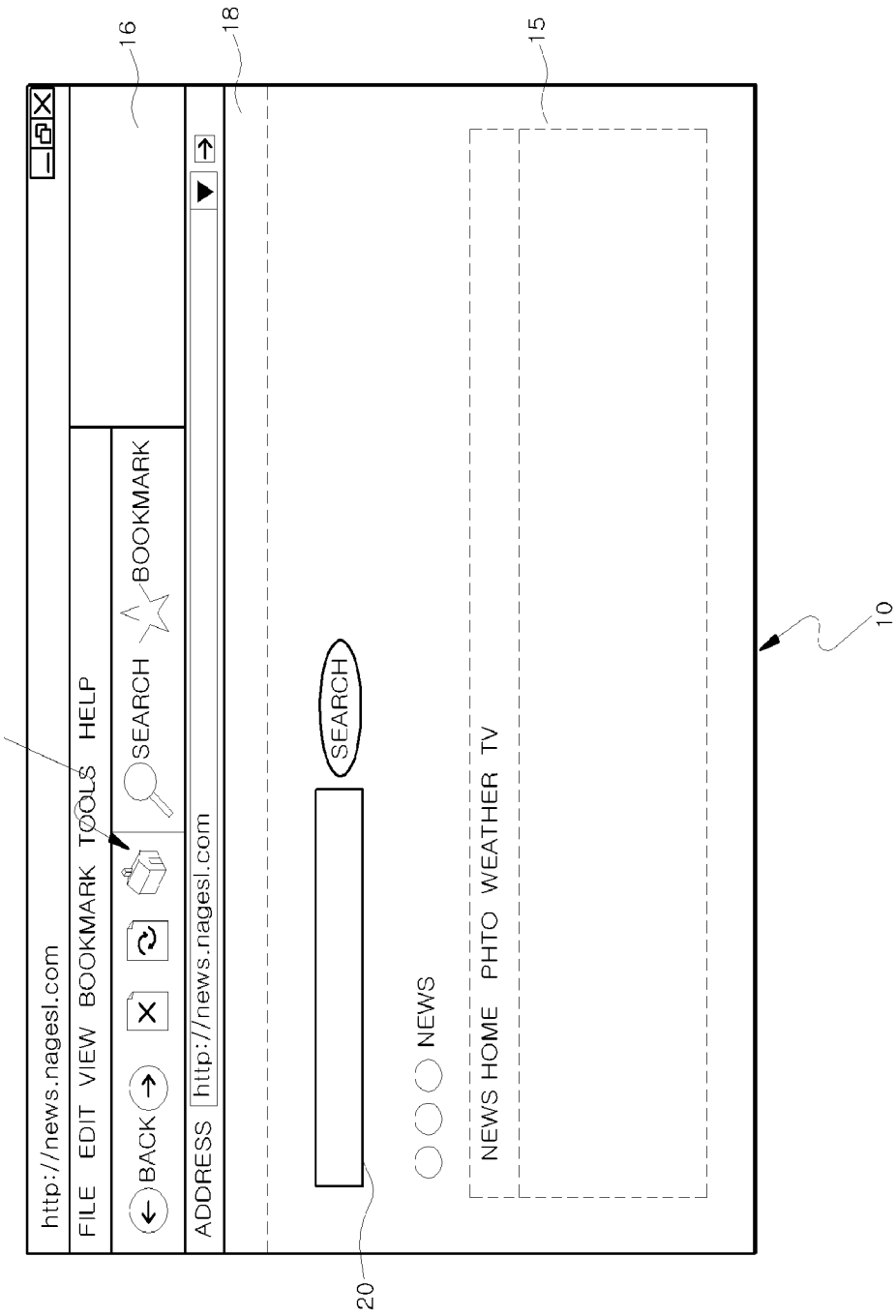
FIG. 12 is a view showing a web browser in accordance with another embodiment of the present invention.

FIG. 12 is a view showing a web browser 10 where a sub advertisement is exposed by the advertisement exposure control system in accordance with this embodiment. The web browser 10 shown in FIG. 12 is almost similar to the web browser 10 shown in FIG. 3, except that it includes an article output window 15 in which the article data is output within the main area. In addition, the web browser 10 shown in FIG. 12 may include an article search window 20 for searching for articles.

The advertisement exposure control server AOCS in accordance with this embodiment may determine the sub advertisement to be output to the sub area 16 based on the relationship with the article data to be output to the article output window 15. In one example, the advertisement exposure control server AOCS can classify and store a plurality of sub advertisements that can be output to the sub area 16 by category, and then select a sub advertisement of a category to which currently output article data belongs (hereinafter, referred to as "matching sub advertisement") to output it to the sub area 16. For instance, if the article data output to the article output window 15 is an advertisement corresponding to a category of "automobile", an advertisement relating to "automobile" that belongs to the same category may be selected as the sub advertisement output to the sub area 16.

Accordingly, according to the advertisement exposure control system in accordance with the embodiment of the present invention, while the user is reading the article output to the main area, the sub advertisement relating to the corresponding article may be exposed at the same time, thus further improving advertisement effects.

Figure 13:
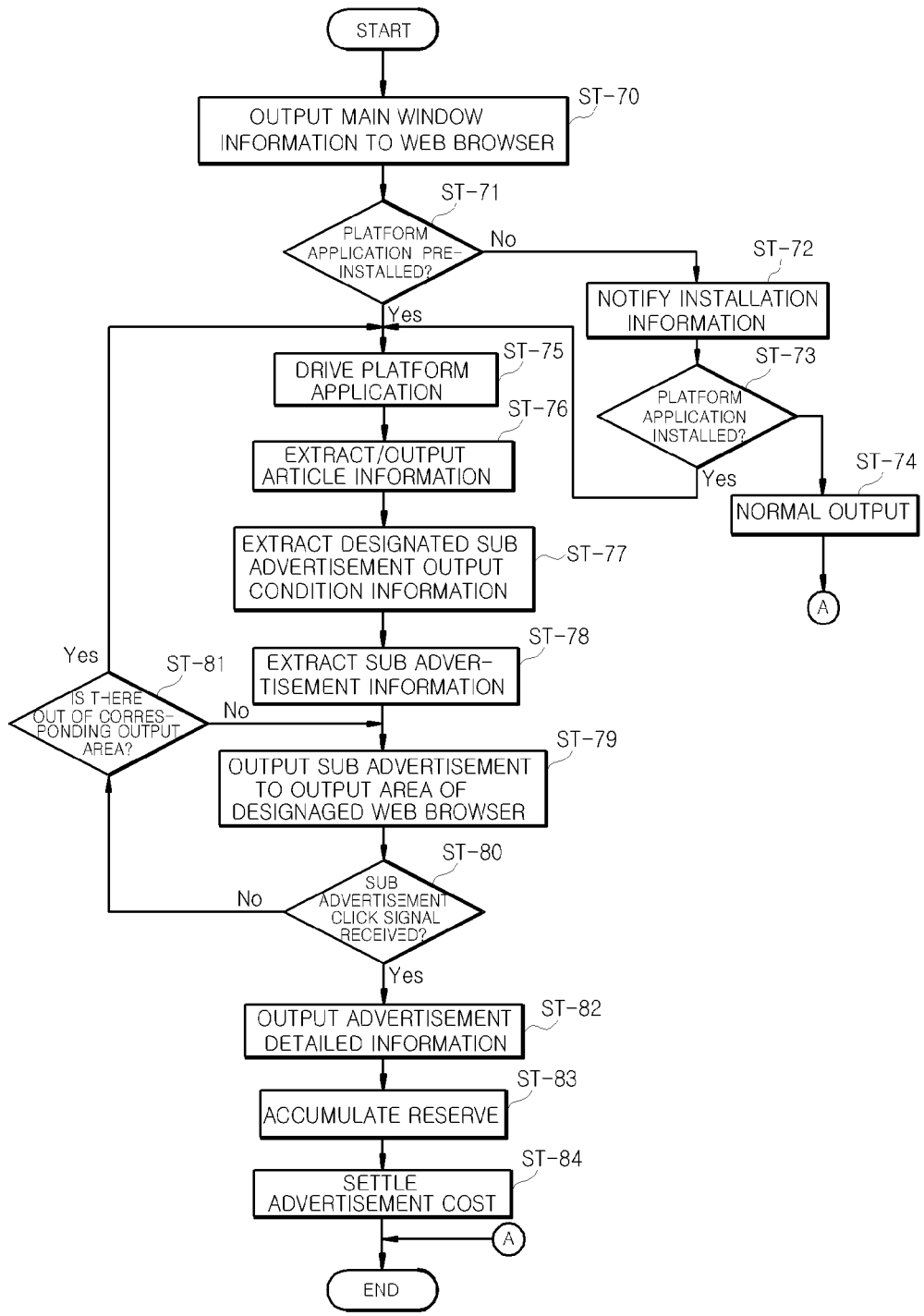
FIG. 13 is a flowchart describing the operation of the control system for advertisement exposure in accordance with another embodiment of the present invention.

FIG. 13 is a flowchart describing the operation of the advertisement exposure control system in accordance with this embodiment. In this embodiment shown in FIG. 13, since steps ST-70 to ST-84 are generally similar to steps ST-1 to ST-16 shown in FIG. 5, a detailed description thereof will be omitted. However, this embodiment is different from the above-described embodiment in that a sub advertisement matching a category code value of the corresponding article data is output.

Figure 14:
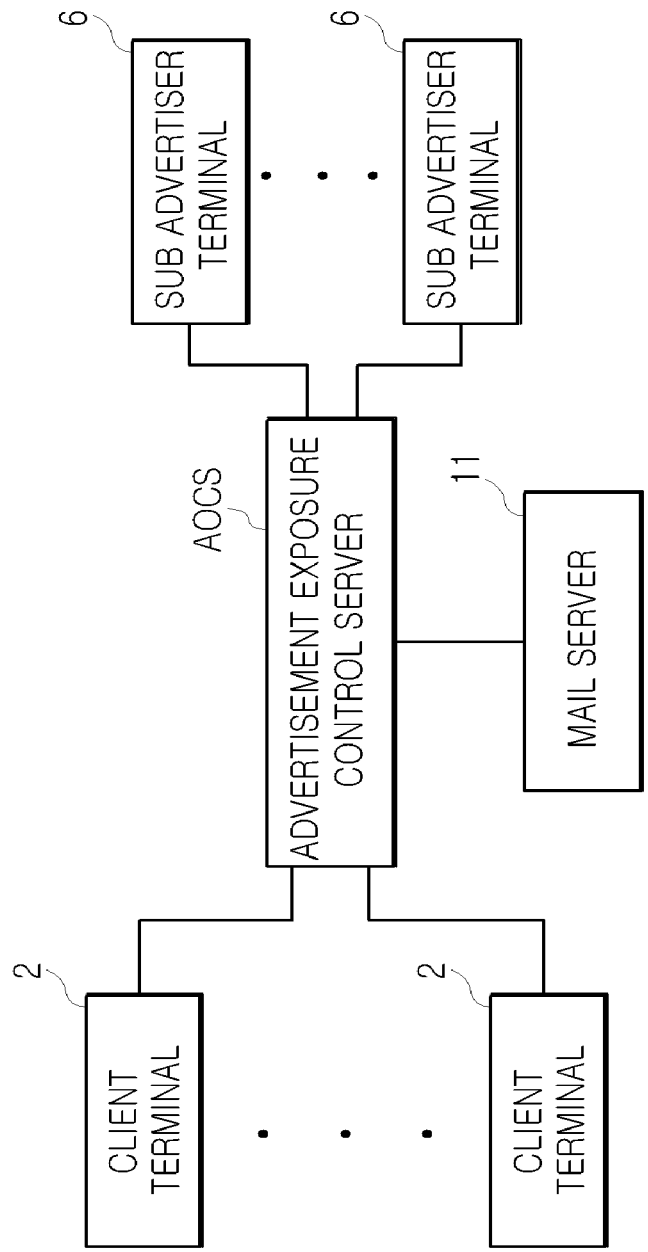
FIG. 14 shows a schematic configuration of a control system for advertisement exposure in accordance with still another embodiment of the present invention.

FIG. 14 shows a schematic configuration of a control system for advertisement exposure in accordance with another embodiment of the present invention. The description of the components of the advertisement exposure control system of this embodiment that is identical or similar to those of the above-described embodiment will be omitted.

Referring to FIG. 14, the advertisement exposure control system in accordance with this embodiment is designed such that, when sending a mail, a mail sender selects a category of a desired advertisement in a mail input window and sends it by attaching a corresponding category code value thereto, and, upon receipt of the mail, receives a sub advertisement of the corresponding category from the server based on the advertisement category code value attached to the mail data and outputs the sub advertisement to the sub area 16 of the web browser 10.

That is, the advertisement exposure control system in accordance with this embodiment is adapted to expose the sub advertisement pre-designated by the mail sender upon receipt of the mail and make part of an advertisement cost per click taken as a profit of the mail sender, thus providing more revitalization for user's participation in the sub advertisement service.

The client terminal 2 in accordance with this embodiment has access to the mail server 11 to output the mail input window to the web browser (see 60 in FIG. 15) to input mail contents to send a web mail, and selects category information of advertisement to be attached thereto to generate a mail send signal. Upon receipt of the mail, it outputs sub advertisement data matching the advertisement category code value attached to the corresponding mail data to the marginal space of the toolbar area of the web browser 10, namely, the sub area 16, by communication with the advertisement exposure control server AOCS.

When sending a mail through the client terminal 2, the advertisement exposure control server AOCS in accordance with the embodiment of the present invention includes installation information of the platform application in the mail data and then sends it, and, upon receipt of the mail data, extracts sub advertisement data matching the category code based on the advertisement category code value included in the mail data by communication with the platform application, and outputs it to the sub area 16 of the web browser 10.

The mail server 11 classifies and outputs advertisement categories in advance so that the mail sender can select any of them in the mail input window, and perform a process in which the category code value selected by the mail sender is attached to the corresponding mail data when sending the mail. The advertisement exposure control system in accordance with the embodiment of the present invention may include the mail server 11.

The client terminal 2 transmits the corresponding category code value to the advertisement exposure control server AOCS through the platform application installed therein, allowing a sub advertisement matching the category selected by the mail sender to be exposed to the sub area 16 of the web browser 10 of the client terminal 2.

Accordingly, if the mail sender knows the mail receiver's field of interest, the mail sender selects the corresponding category and then sends the mail, thus further improving advertisement effects.

Figure 15:
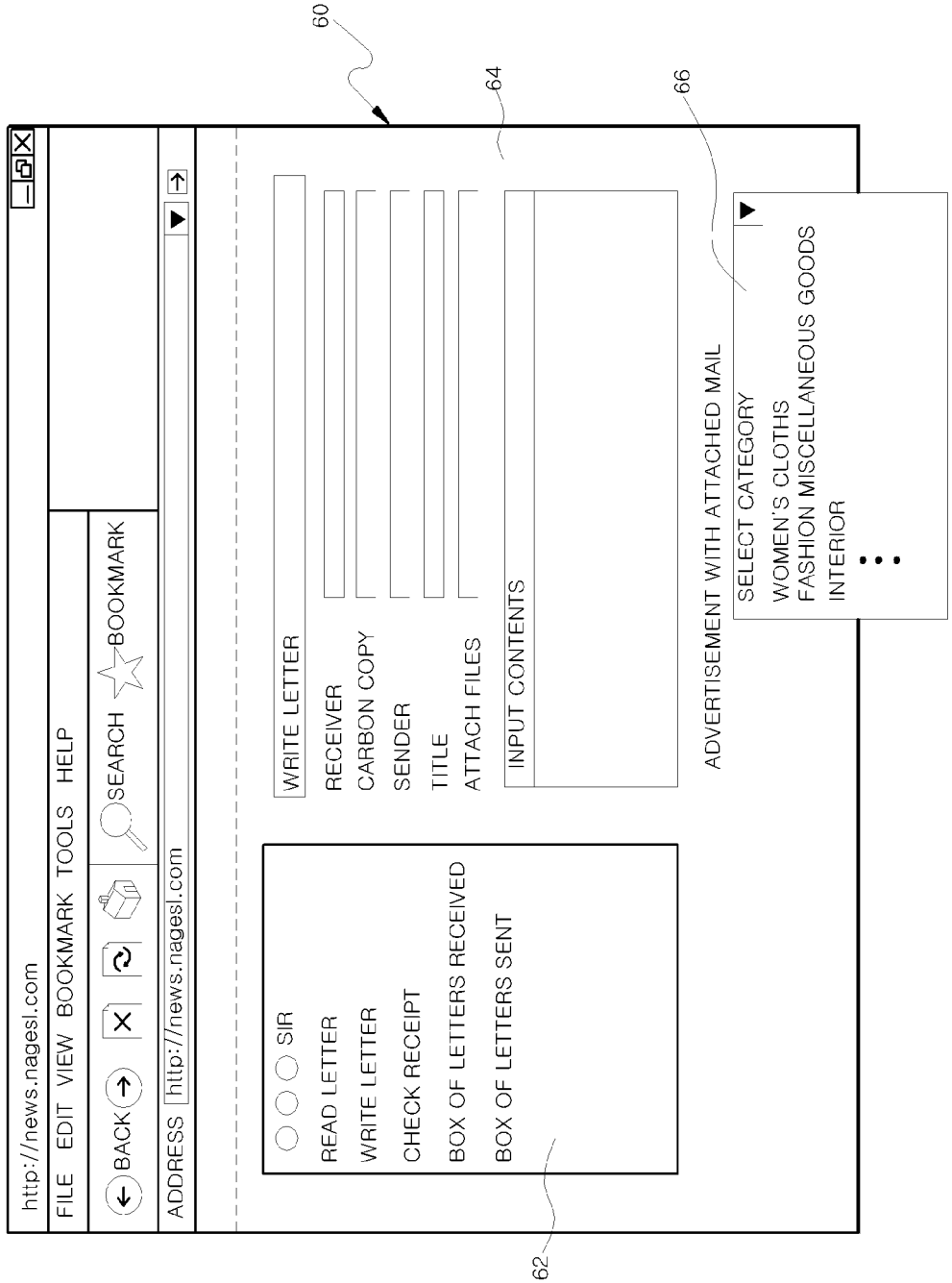
FIG. 15 shows a web browser in accordance with still another embodiment of the present invention.

FIG. 15 shows a web browser 60 in the advertisement exposure control system in accordance with this embodiment. The web browser 60 shown in FIG. 15 is almost similar to the web browser 10 in FIG. 3, except that it may include a menu output window 62 for outputting a plurality of menu bars including a box of received mails, a box of sent mails and a box of deleted mails, a mail content input window 64 for inputting mail contents, and a category selection tool 66 for selecting an advertisement category by the mail sender.

Figure 16:
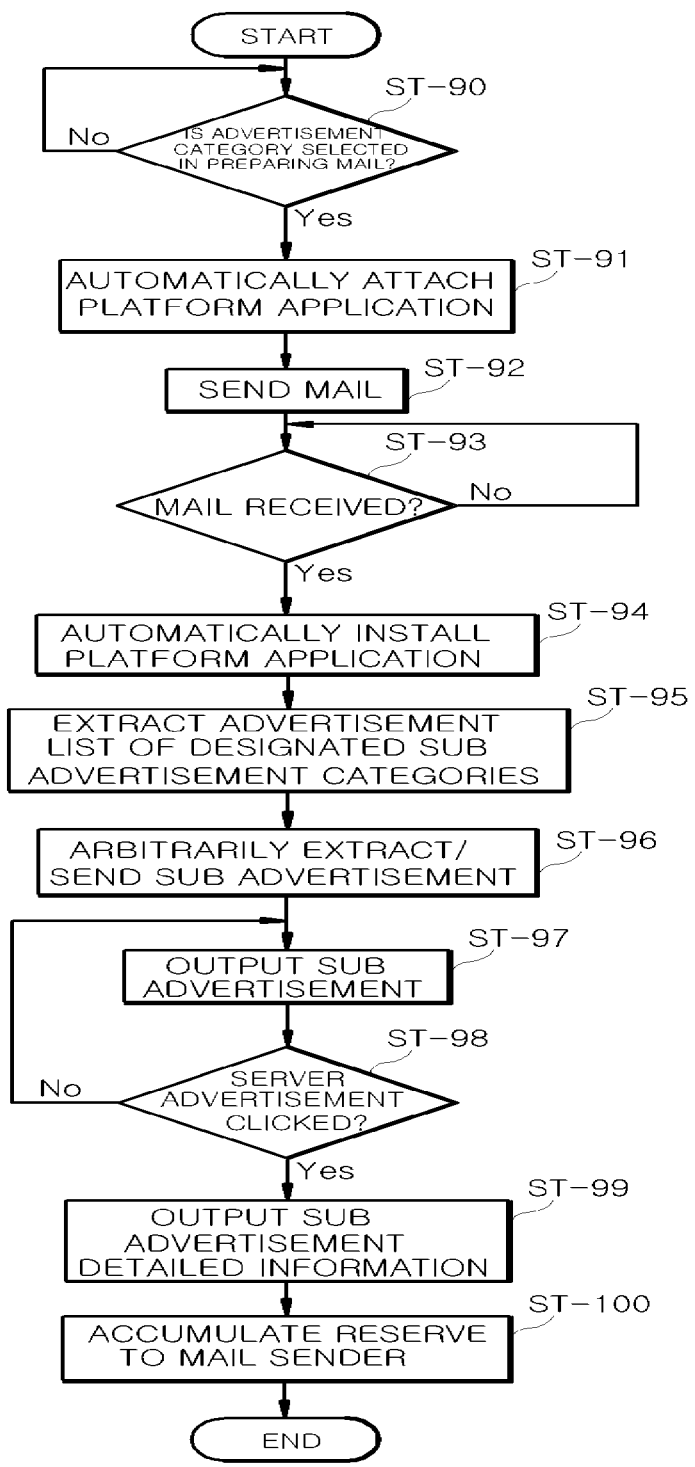
FIG. 16 is a flowchart describing the operation of the control system for advertisement exposure in accordance with still another embodiment of the present invention.

FIG. 16 is a flowchart describing the operation of the advertisement exposure control system in accordance with this embodiment. First, when the mail sender has access to the mail server 11 through the client terminal 2, the menu output window 62 shown in FIG. 15 is output to the web browser 60 of the client terminal 2.

When the mail sender inputs mail contents through the client terminal 2 and selects an advertisement category (ST-90), the mail server 11 attaches platform application installation information or platform application thereto (ST-91) and then sends the mail (ST-92).

Then, when the mail receiver accesses the mail server through the client terminal 2 and receives the corresponding mail data (ST-93), the platform application included in the corresponding mail data is automatically installed (ST-94) or the platform application installation information is exposed to induce such installation.

If the platform application is installed in the client terminal 2 of the mail receiver, then the platform application extracts the advertisement category code value included in the mail data and transmits it to the advertisement exposure control server AOCS (ST-96).

Then, the advertisement exposure control server AOCS extracts a sub advertisement matching the corresponding advertisement category code value and transmits it to the client terminal 2, so that the corresponding sub advertisement can be exposed to the marginal space of the toolbar area of the web browser 10, namely, the sub area 16 (ST-97).

The advertisement exposure control server AOCS determines whether or not a click signal of the corresponding sub advertisement is received from the client terminal 2 (ST-98). If the sub advertisement is clicked, the advertisement exposure control server AOCS outputs detailed information of the corresponding sub advertisement (ST-99) and pays a certain accumulated reserve to the mail sender in reward for the corresponding click (ST-100).

Figure 17:
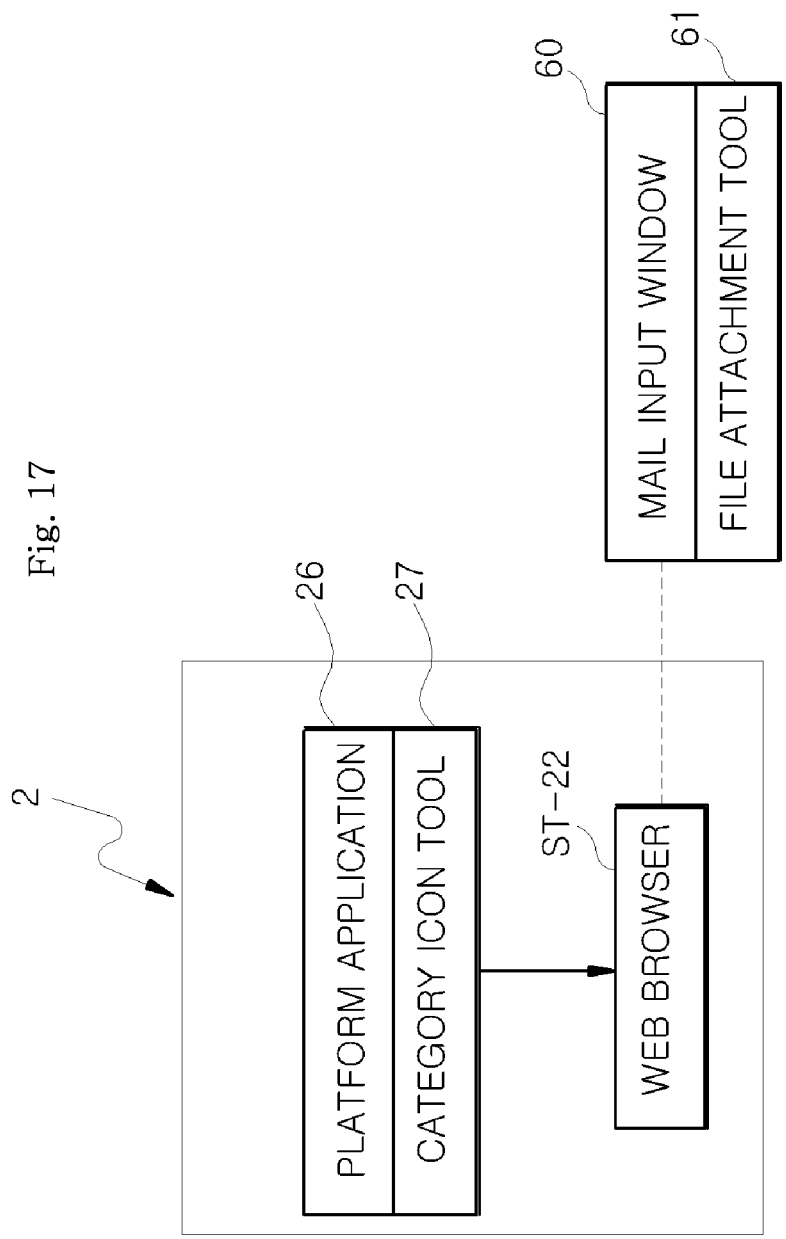
FIG. 17 is a block diagram showing the configuration of the control system for advertisement exposure in accordance with still another embodiment of the present invention.

FIG. 17 is a block diagram showing the configuration of a control system for advertisement exposure in accordance with another embodiment of the present invention. Referring to FIG. 17, in this embodiment, sub advertisement data is exposed by the advertisement exposure control server AOCS and the platform application installed in the client terminal 2 regardless of the mail server 11.

The client terminal 2 in accordance with this embodiment includes a category icon tool 27 for outputting an advertisement category icon to be included in mail data when preparing the mail through the web browser 22, and a platform application 26 for attaching a specific category icon to the mail data by activating the category icon tool 27, extracting category information of the corresponding advertisement upon receipt of the mail and transmitting it to the advertisement exposure control server AOCS and outputting the sub advertisement data transmitted from the advertisement exposure control server AOCS to the sub area 16 which is the marginal space of the toolbar area of the web browser 10.

When the category icon is attached to the mail data, only the category code value is attached thereto, and when the category icon is selected, the corresponding category code value may be attached in a manner that any file is attached to a file attachment tool 61 of a general mail.

Figure 18:
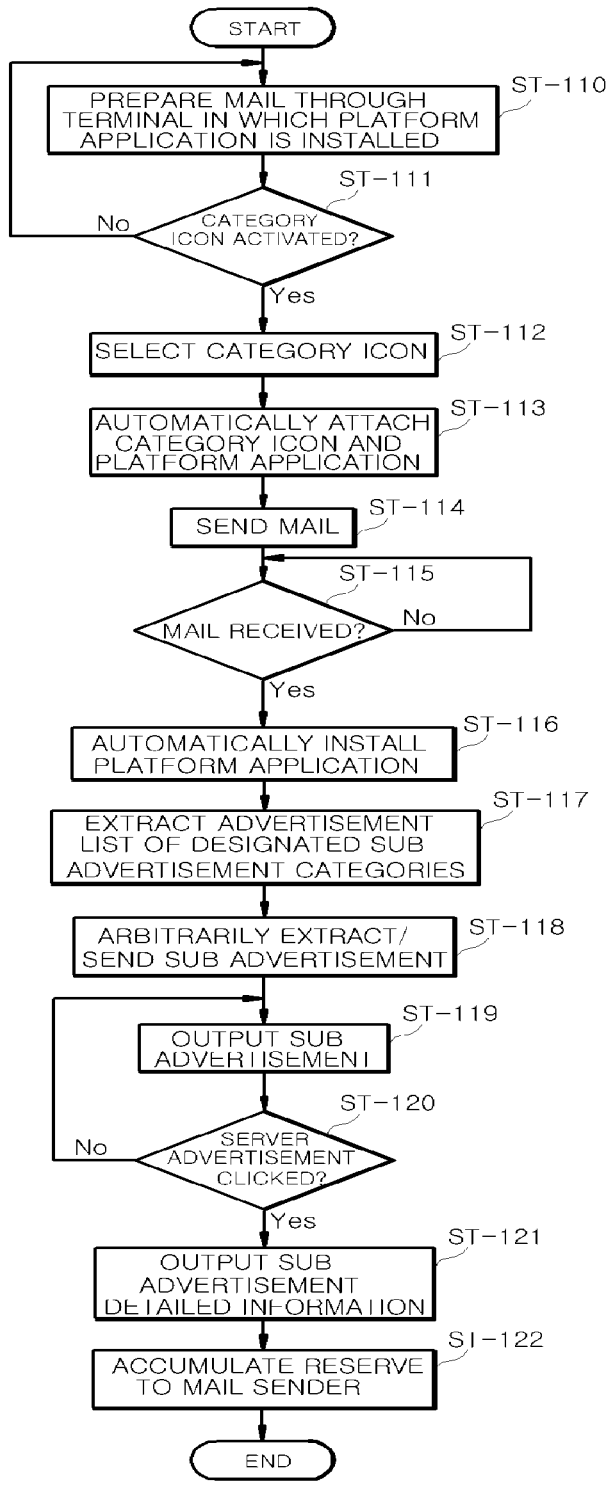
FIG. 18 is a flowchart describing the operation of the control system for advertisement exposure in accordance with another embodiment of the present invention.

FIG. 18 is a flowchart describing the operation of the control system for advertisement exposure in accordance with this embodiment. First, in this embodiment, when the mail sender accesses the mail server 11 through the client terminal 2, a mail input window 60 is output to the web browser 60 of the client terminal 2.

The mail sender inputs mail contents through the client terminal 2 and drives the pre-installed platform application 26 (ST-110). The platform application 26 checks whether or not the category icon toll 27 is activated (ST-111). When the category icon 27 is activated and any one category icon is selected (ST-112), the platform application 26 attaches a code value of the corresponding category icon and the platform application thereto and then sends the mail (ST-113).

Hereinafter, in this embodiment, steps ST-114 to ST-122 shown in FIG. 18 are similar to steps ST-92 to ST-100 shown in FIG. 16, a detailed description thereof will be omitted.

Figure 19:
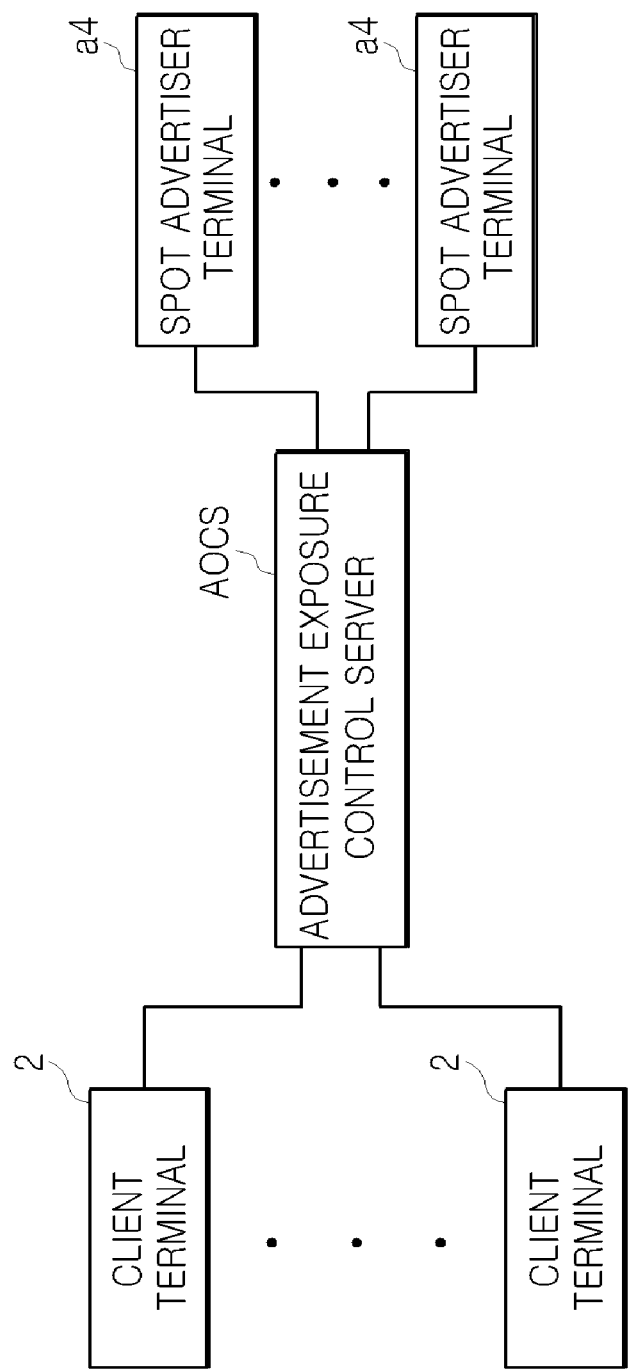
FIG. 19 schematically shows the configuration of the control system for advertisement exposure in accordance with still another embodiment of the present invention.

FIG. 19 schematically shows the configuration of a control system for advertisement exposure in accordance with another embodiment of the present invention. The description of the components of the advertisement expose control system of this embodiment that are identical or similar to those of the embodiment as described above will be omitted.

Referring to FIGS. 19 and 2, the advertisement exposure control system in accordance with this embodiment outputs a sub advertisement of a category matching a URL address value or key word entered by the user to the sub area 16 of the web browser 10, so that the user enables effective price comparison and condition comparison and event information collection, and a customized advertisement for products desired by the user can be executed. The URL address value or key word entered by the user is an example of user's input values.

The client terminal 2 in accordance with this embodiment catches a URL address value entered to the URL input window 13 or a key word entered in the search window and transmits the same to the advertisement exposure control server AOCS, and outputs the sub advertisement (hereinafter, referred to as "spot advertisement") transmitted from the advertisement exposure control server AOCS to the sub area 16 which is the marginal space of the toolbar area of the web browser 10.

A spot advertiser terminal a4 in accordance with this embodiment uploads the advertisement data to the advertisement exposure control server AOCS to output the spot advertisement to the sub area of the web browser of the client terminal 2.

The advertisement exposure control server AOCS in accordance with this embodiment receives the spot advertisement data from the spot advertiser terminal a4 and classifies and stores the same by category, and extracts advertisement data of a category matching the URL address value 13a or key word transmitted from the client terminal 2 by communication with the client terminal 2 and transmits it to the client terminal 2.

Referring to FIG. 2, for instance, when a URL address value 13a of "http://ssadarentcar.com" is entered in the URL input window 13 of the web browser 10 that is running in the client terminal 2, the spot advertisement output through the sub area 16 may be advertisement data that corresponds to a category of "rent car" matching the corresponding URL address value 13a.

In the same way, when the key word of "rent car" is entered in the search window 20 of the web browser 10 of the client terminal 2, the spot advertisement output through the sub area 16 may be advertisement data corresponding to the category of "rent car" that is the corresponding key word.

Figure 20:
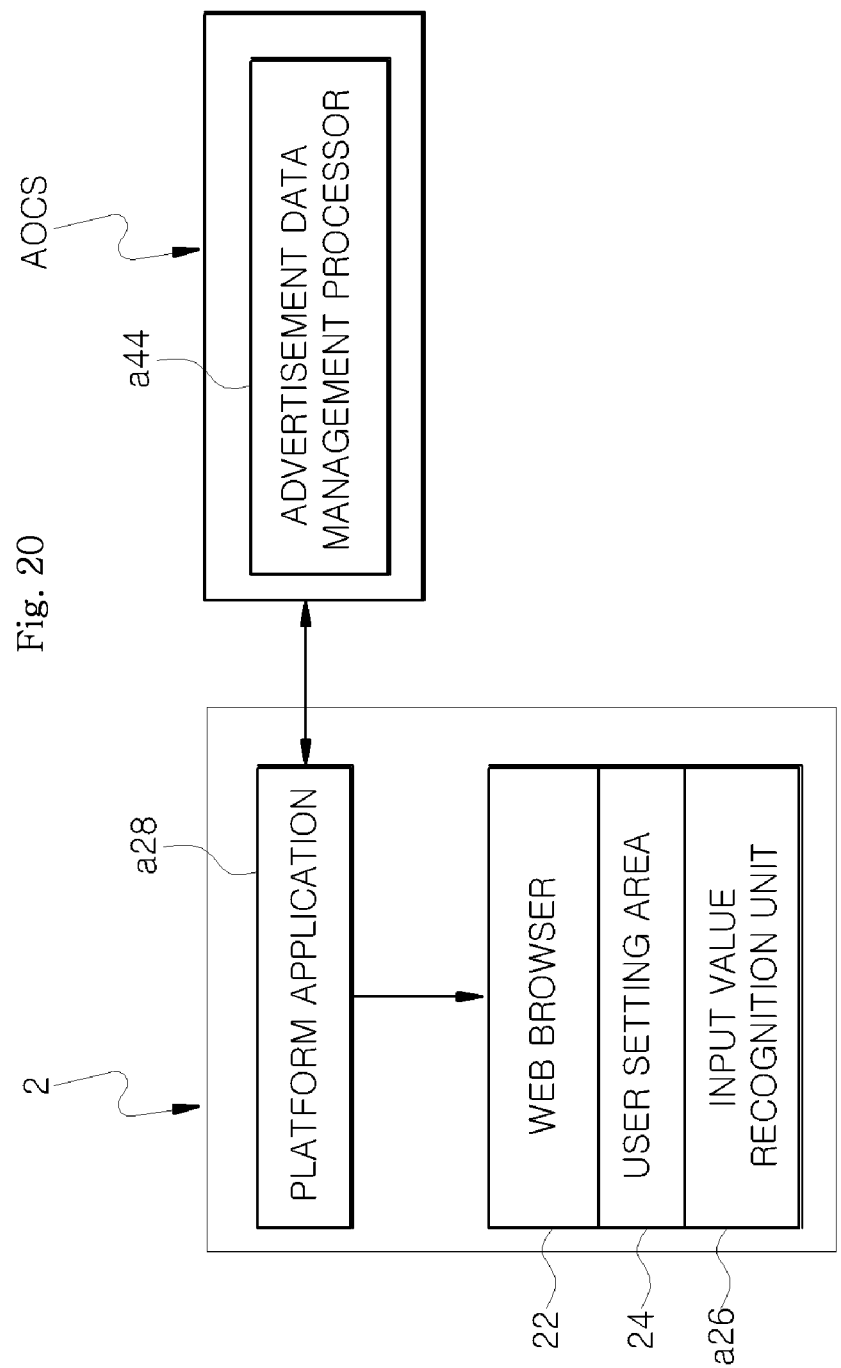
FIG. 20 is a block diagram schematically showing the configuration of the control system for advertisement exposure in accordance with still another embodiment of the present invention.

FIG. 20 is a block diagram schematically showing the configuration of the control system for advertisement exposure in accordance with this embodiment. Referring FIG. 20, the advertisement exposure control server AOCS in accordance with this embodiment receives an URL address value or key word from a platform application a28 installed in the client terminal 2, extracts spot advertisement data corresponding to a category matching a category of the transmitted URL address value or key word, and transmits it to the client terminal 2. The advertisement exposure control server AOCS may include an advertisement data management processor a44 for managing the spot advertisement data.

The advertisement exposure control server AOCS determines whether or not the corresponding web site or web page corresponds to a web site or web page of a pre-registered advertiser based on the URL address value or key word, and if the web site or web page does not correspond to the web site or web page of the pre-registered advertiser, it can extract the spot advertisement data and transmit the same to the client terminal 2.

The advertisement exposure control server AOCS has a plurality of URL address values pre-stored therein, which are classified by category. Of course, the advertisement exposure control server AOCS may receive URL address values from the outside.

The platform application a28 of the client terminal 2 catches the URL address value entered in the URL input window output to the web browser 10, transmits it to the advertisement exposure control server AOCS, and outputs the spot advertisement data transmitted from the advertisement exposure control server AOCS to the sub area 16 that is the marginal space of the toolbar area of the web browser a28.

The client terminal 2 may include an input value recognition unit a26 for transmitting the URL address value caught by an Internet option tool (not shown) to the platform application a28 by communication with the platform application a28 and the Internet option tool.

The input value recognition unit a26 performs the function of catching the key word entered in the search window from a keyboard tool (not shown) of a control panel by communication the keyboard tool, and transmitting it to the platform application a28. The keyboard tool is a well-known tool installed in the control panel environment of PC, from which the keyboard input value can be caught.

Figure 21:
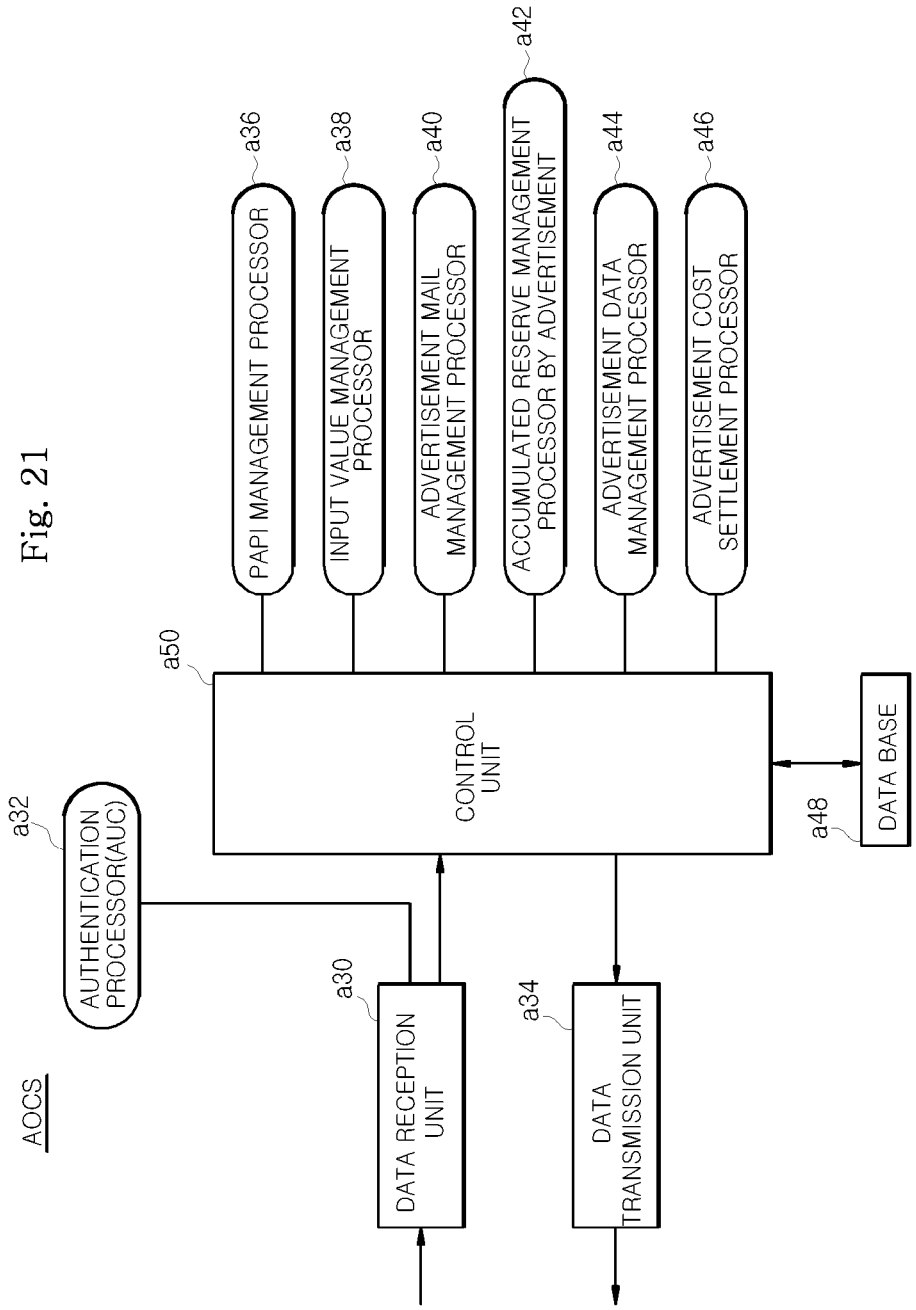
FIG. 21 is a block diagram showing the configuration of the advertisement exposure control server in accordance with still another embodiment of the present invention.

FIG. 21 is a block diagram showing the configuration of the advertisement exposure control server AOCS in accordance with this embodiment. Referring FIG. 21, the advertisement exposure control server AOCS in accordance with this embodiment may include a data reception unit, a data transmission unit, an authentication processor, a control unit, a PAPI management processor, an input value management processor, an advertisement matching management processor, an accumulated reserve management processor by advertisement, an advertisement data management processor, an advertisement cost settlement processor, and a database. In another embodiment, at least one of the authentication processor, the PAPI management processor, the input value management processor, the advertisement matching management processor, the accumulated reserve management processor by advertisement, the advertisement data management processor, and the advertisement cost settlement processor as shown in FIG. 21 may be incorporated in the control unit.

Reference numeral a30 denotes the data reception unit for receiving advertisement data and URL or key word from the client terminal 2 and the spot advertiser terminal a4. Reference numeral a34 denotes the data transmission unit for performing transmission of an advertisement data acknowledgment signal and spot advertisement data to the client terminal 2 and the spot advertiser terminal a4.

Reference numeral a32 denotes the authentication processor for performing a user authentication process when the client terminal 2 and the spot advertiser terminal a4 are connected.

Reference numeral a50 denotes the control unit for performing the control of each processor and performing a registration and transmission process of advertisement data with respect to the client terminal 2 and the spot advertiser terminal a4.

Reference numeral a36 denotes the PAPI management processor for managing installation of the platform application a28 in the client terminal 2 and a unique number of the platform application a28.

Reference numeral a38 denotes the input value management processor for managing a URL address value or key word transmitted from the client terminal 2, and reference numeral a40 denotes the advertisement matching management processor for extracting a category matching the URL address value or key word transmitted from the client terminal 2 to extract spot advertisement data of the corresponding category.

The advertisement matching management processor a40 carries out the function of extracting and outputting the spot advertisement data of the corresponding category only if the transmitted URL address value is not a URL address value of the pre-registered advertiser.

Reference numeral a42 denotes the accumulated reserve management processor by advertisement for receiving a click signal of the spot advertisement data from the client terminal 2, accumulating and calculating an advertisement cost per click (CPC), and performing a process in which accumulated reserve information is output to the corresponding spot advertisement output area.

Reference numeral a44 denotes the advertisement data management processor for performing a management process to classify and store the spot advertisement data transmitted from the advertiser by category. Reference numeral a46 denotes the advertisement cost settlement processor for settling the cost of spot advertisement per click and transmitting the advertisement cost settlement data of the spot advertiser.

Reference numeral a48 denotes the database for classifying and storing the spot advertisement data by category, storing the accumulated reserve information output together with the spot advertisement data by respective advertisements and storing banner advertisement output time data, and storing a platform application unique number of the client terminal 2.

Figure 22:
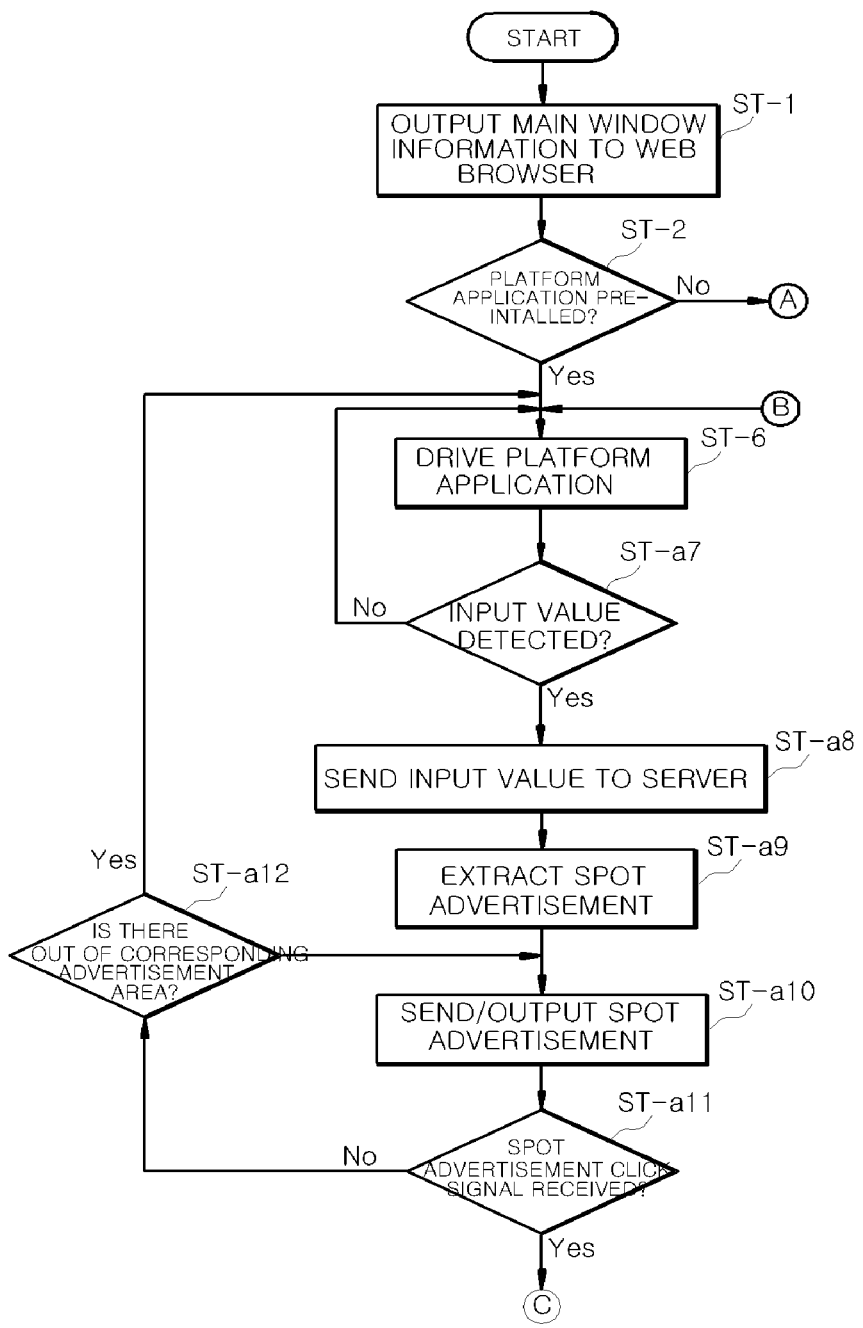
FIGS. 22 and 23 are flowcharts describing the operation of the control system for advertisement exposure in accordance with still another embodiment of the present invention.
Figure 23:
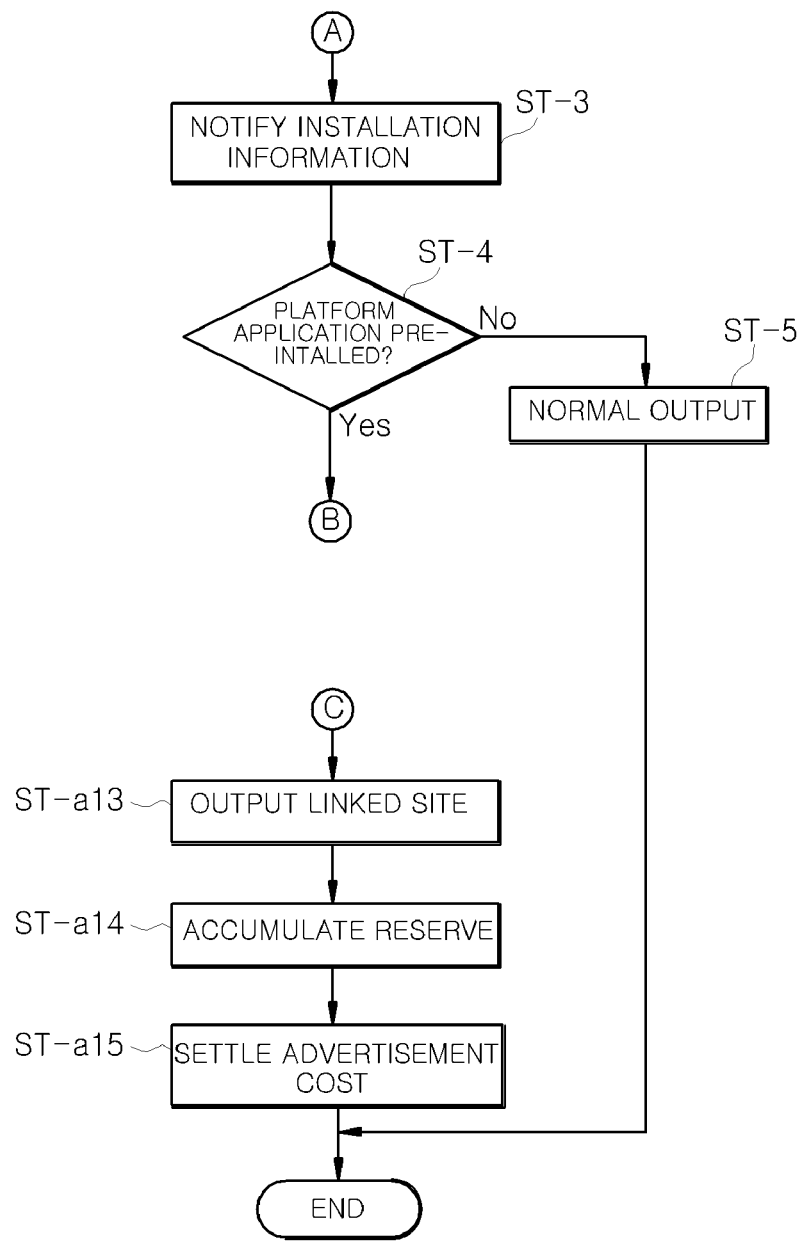

FIGS. 22 and 23 are flowcharts describing the operation of the control system for advertisement exposure in accordance with this embodiment. Steps ST-1 to ST-5 shown in FIGS. 22 and 23 are identical to steps ST-1 to ST-5 shown in FIG. 5, a detailed description thereof will be omitted.

When the platform application a28 is installed in the client terminal 2, the platform application a28 is driven (ST-6) and determines whether or not the URL address value or key word is entered in the URL input window 13 or the search window 20 of the web browser 10 (ST-a7). When the user tries to access to a particular site by entering a URL through the client terminal 2, or enters a key word in the search portal, the platform application a28 catches the URL address value or key word.

The platform application a28 transmits the entered URL address value or key word to the advertisement exposure control server AOCS (ST-a8).

Then, the advertisement exposure control server AOCS extracts spot advertisement data matching a category of the transmitted URL address value or key word (ST-a9) and transmits it to the client terminal 2, and outputs the spot advertisement data to the sub area 16 of the web browser 10 of the client terminal 2 (ST-a10).

The advertisement exposure control server AOCS determines whether or not a click signal of the corresponding spot advertisement is received from the client terminal 2 (ST-a11).

That is, the platform application a28 of the client terminal 2 monitors the spot advertisement data and transmits click information to the advertisement exposure control server AOCS when the click signal of the corresponding spot advertisement data is generated.

If the spot advertisement click signal is received from the client terminal 2, the advertisement exposure control server AOCS outputs detailed information of the corresponding spot advertisement (ST-a13) and accumulates a certain amount of reserve corresponding to the advertisement information in reward for the corresponding click (ST-a14).

On the other hand, if the spot advertisement click signal is not received from the client terminal 2, the advertisement exposure control server AOCS determines whether or not there is out of the corresponding advertisement output area through communication with the platform application a28 installed in the corresponding client terminal 2 (ST-a12).

Meanwhile, the advertisement exposure control server AOCS settles an advertisement cost incurred by clicking the spot advertisement data with the spot advertiser (ST-a15).

Figure 24:
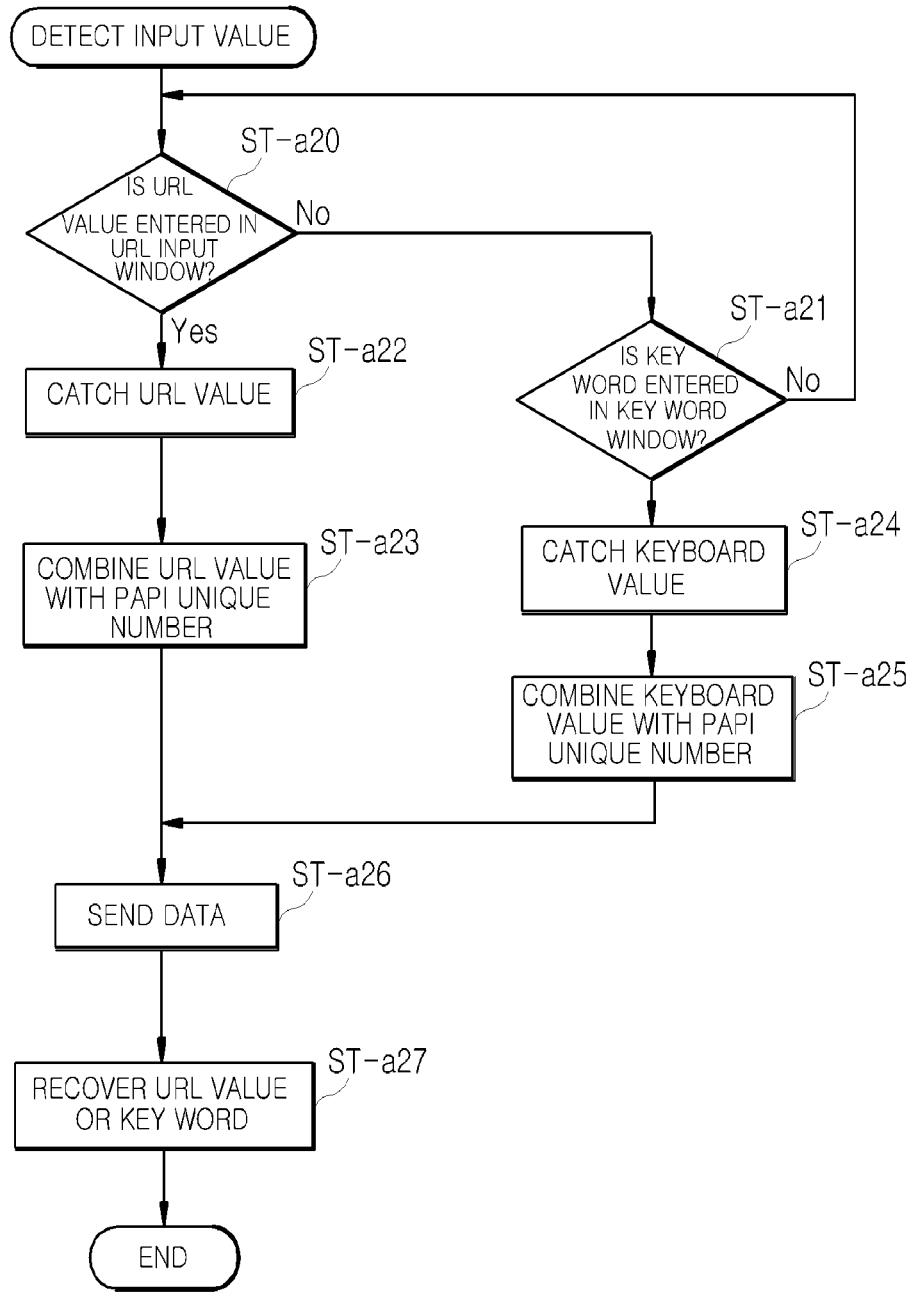
FIG. 24 is a flowchart describing the operation of detecting an input value by the control system for advertisement exposure in accordance with still another embodiment of the present invention.

FIG. 24 is a flowchart describing the operation of detecting an input value by the advertisement exposure control system in accordance with this embodiment.

First, the detection of an input value of this embodiment is roughly divided into a detection of URL address value and a detection of key word. The platform application a28 of the client terminal 2 determines whether or not the URL address value is entered in the URL input window 13 (ST-a20).

In this embodiment, the URL address value may be entered by using the keyboard directly by the user, by clicking a URL registered in the bookmark, or by clicking a hyperlinked URL address value.

When the URL address value is entered in the URL input window, the platform application a28 catches the URL address value by communication with the Internet option tool (ST-a22).

The platform application a28 combines the caught URL data with a unique number of the platform application a28 (ST-a23) and transmits the combined data to the advertisement exposure control server AOCS (ST-a26). Then, the advertisement exposure control server AOCS extracts and recovers the corresponding URL address value (ST-a27).

Meanwhile, when the URL address value is not entered in the URL input window 13, the platform application a28 of the client terminal 2 determines whether or not a key word is entered in the key word input window 20 (ST-a21).

If the key word is entered, the platform application a28 catches corresponding key word data, e.g., keyboard value, by communication with the keyboard tool of the control panel (ST-a24).

The platform application a28 combines the caught key word with the unique number of the platform application a28 (ST-a25) and transmits the combined data to the advertisement exposure control server AOCS (ST-a26). Then, the advertisement exposure control server AOCS extracts and recovers the corresponding key word (ST-a27).

Figure 25:
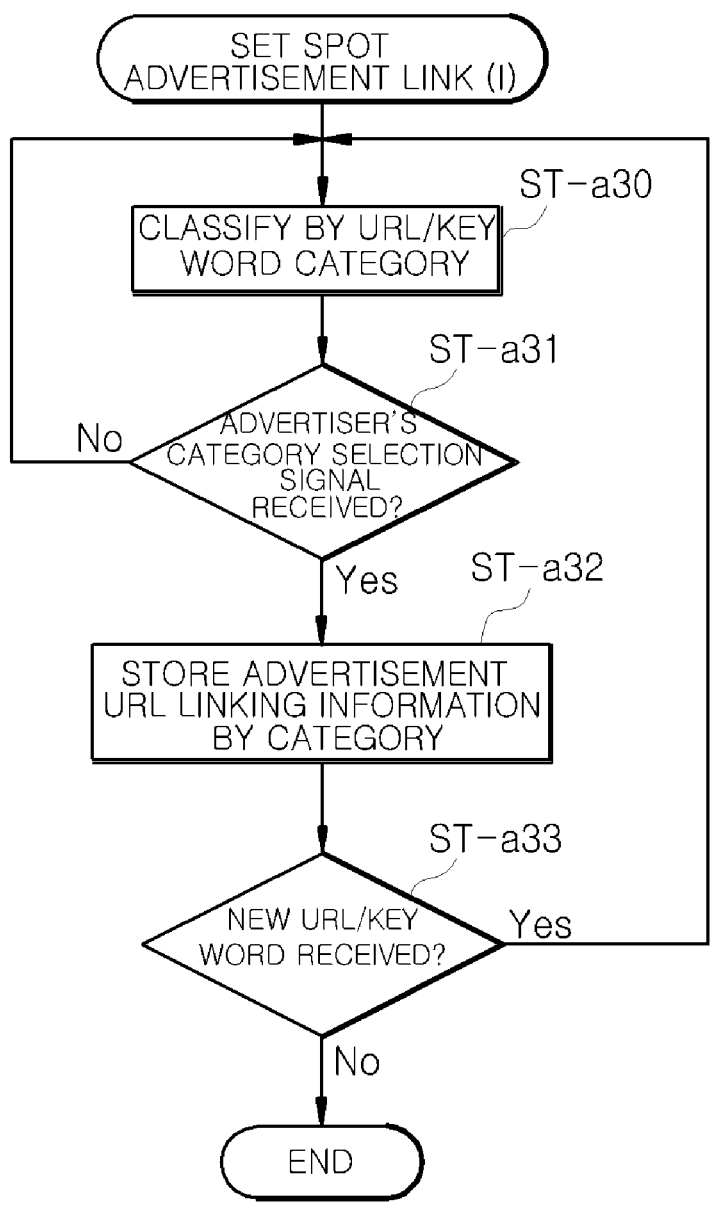
FIGS. 25 and 26 are flowcharts describing the operation of setting spot advertisement link of the control system for advertisement exposure in accordance with still another embodiment of the present invention.

FIG. 25 is a flowchart describing the operation of establishing spot advertisement link of the advertisement control system in accordance with this embodiment.

The operation of establishing spot advertisement link of the advertisement exposure control system in accordance with this embodiment is to classify and store the spot advertisement data stored in the advertisement exposure control server AOCS by category according to the advertiser's selection, more specifically, to designate a plurality of categories for each spot advertisement data stored by advertiser so that they are linked and extractable.

First, the advertisement exposure control server AOCS classifies and stores URL address values or key words managed by the hosting server by category (ST-a30).

The advertisement exposure control server AOCS determines whether or not a category selection signal is received from the spot advertiser terminal a4 (ST-a31). The number of categories that can be selected by the spot advertiser can be preset and selectively allowed up to three.

Upon completion of the selection of the category, the advertisement exposure control server AOCS stores the corresponding spot advertisement data and the selected category information to be linked with each other (ST-a32). That is, a plurality of spot advertisement data are linked by respective categories.

The advertisement exposure control server AOCS determines whether or not a new URL address value or key word is received (ST-a33), and, if the new URL address value or key word is received, designates its category so that the corresponding URL address value or key word is stored in the database.

For instance, if the spot advertiser is a computer seller and wants to advertise "oo computer" as the spot advertisement data, its category can be set to correspond to "electronic product", "computer", "notebook", etc. In this case, when the user enters a web site URL address window of the computer company, or the like in the URL input window 13, the spot advertisement data of the "oo computer" can be output to the corresponding client terminal 2.

Figure 26:
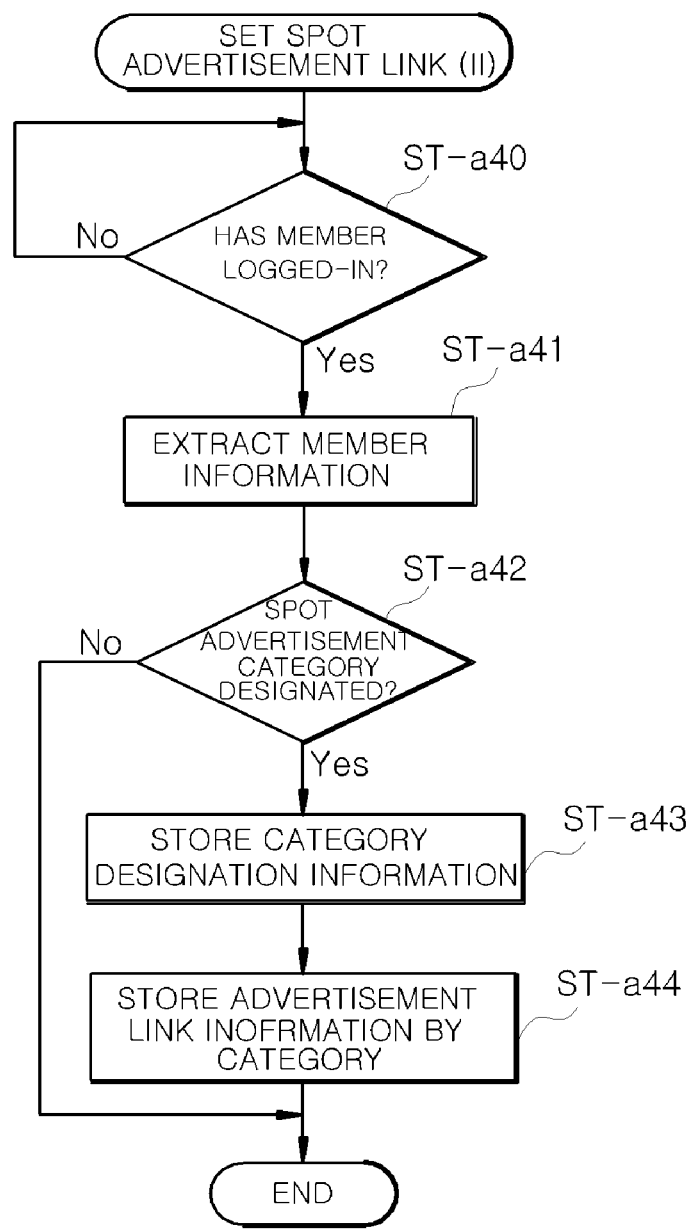

FIG. 26 is a flowchart describing the operation establishing spot advertisement link of the advertisement exposure control system in accordance with another embodiment of the present invention.

Unlike FIG. 25, FIG. 26 shows a process in which a member directly designates a category of interest. First, when the member accesses the advertisement exposure control server AOCS using the client terminal 2, the advertisement exposure control server AOCS determines whether or not the corresponding member has logged in (ST-a40).

When the member has logged in, the advertisement exposure control server AOCS extracts the corresponding member information (ST-a41). The advertisement exposure control server AOCS determines whether or not the corresponding member has transmitted a category designation value of the spot advertisement data through the client terminal 2 (ST-a42).

If the category designation value of the spot advertisement data of the corresponding member is received from the client terminal 2, the advertisement exposure control server AOCS stores the category designation information in the corresponding member information (ST-a43). The advertisement exposure control server AOCS stores the unique number of the platform application a28 installed in the corresponding client terminal 2 and the category designation value set by the corresponding member, both of which are linked with each other (ST-a44).

Figure 27:
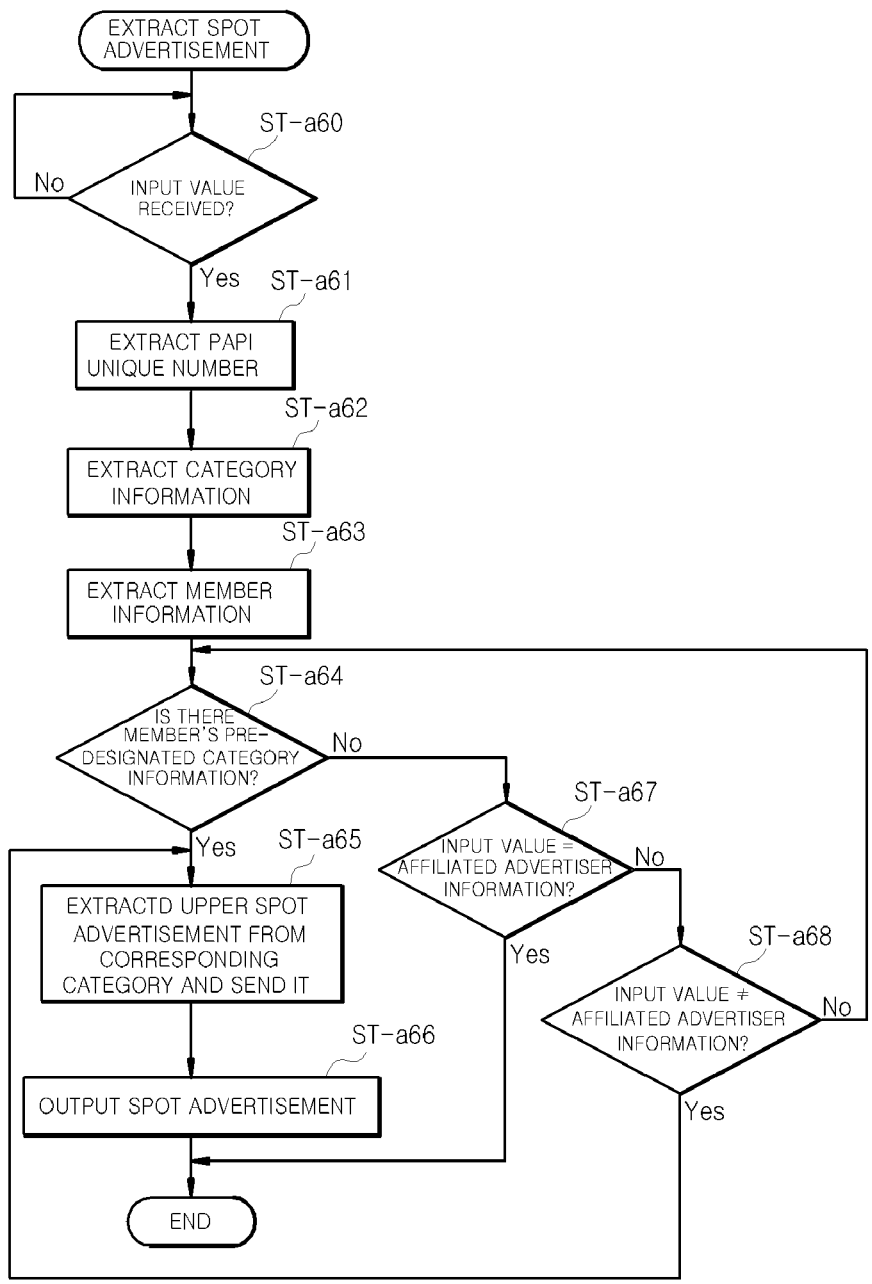
FIG. 27 is a flowchart describing the operation of extracting the spot advertisement of the control system for advertisement exposure in accordance still another embodiment of the present invention.

FIG. 27 is a flowchart describing a spot advertisement extracting process of the advertisement exposure control system in accordance with this embodiment.

FIG. 27 shows in more detail the process of extracting the spot advertisement depicted in FIGS. 22 and 23. First, the advertisement exposure control server AOCS determines whether or not the URL address value or key word is received from the client terminal 2 (ST-a60).

If the URL address value or key word is received, the advertisement exposure control server AOCS extracts a PAPI unique number of the platform application a28 installed in the corresponding client terminal 2 from among the received data combined with the URL address value or key word received from the client terminal 2 (ST-a61).

The advertisement exposure control server AOCS extracts category information matching the URL address value or key word included in the received data from the database (ST-a62).

The advertisement exposure control server AOCS extracts member information using the extracted PAPI unique number (ST-a63) and determines whether or not there is information about an interested category pre-designated by the corresponding member (ST-a64).

If there is the information about the interested category pre-designated by the corresponding the member, the advertisement exposure control server AOCS extracts the highly linked spot advertisement data from the interested category designated by the corresponding the member and transmits it to the client terminal 2 (ST-a76) so as to be output (ST-a66), regardless of the received URL address value or key word.

On the other hand, if there is no information about the interested category pre-designated by the corresponding the member, the advertisement exposure control server AOCS determines whether or not the received URL address value or key word matches affiliated advertiser information (ST-a67).

If the received URL address value or key word matches the affiliated advertiser information, this means that the web site of the affiliated advertiser is output to the main area 14 of the web browser 10, so the advertisement exposure control server AOCS does not output the spot advertisement data to the sub area 16 of the web browser 10 of the corresponding user.

On the other hand, if the received URL address value or key word does not match the affiliated advertiser information, this means that the web site of a non-affiliated advertiser is output to the main area 14 of the web browser 10, so the advertisement exposure control server AOCS extracts category information of the received URL address value or key word, and extracts the spot advertisement data that is classified and stored as the corresponding category and transmits it to the client terminal 2 so as to be output.

Figure 28:
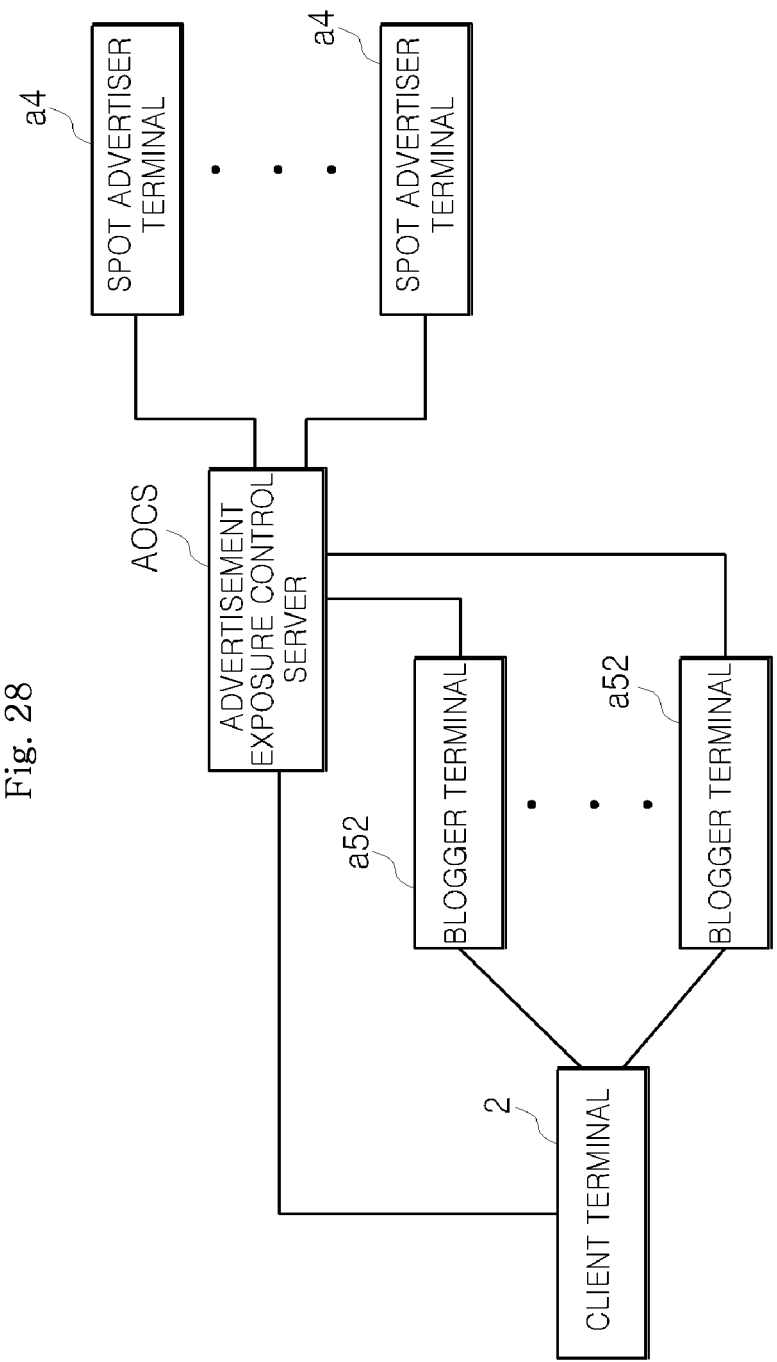
FIG. 28 is a block diagram showing a schematic configuration of the control system for advertisement exposure in accordance with still another embodiment of the present invention.

FIG. 28 is a block diagram showing a schematic configuration of a control system for advertisement exposure in accordance with another embodiment of the present invention. The description of the components of this embodiment that are identical or similar to those of the above-described embodiment will be omitted.

Referring FIG. 28, the advertisement exposure control system in accordance with this embodiment outputs, to the sub area of the web browser 10, spot advertisement of a category matching a blog or a URL address value for each page of the blog, or of a category pre-designated by a blogger when the user views the blog, which is an example of a category matching the web page.

That is, in accordance with this embodiment, when an unspecified number of users accesses a blog, a blogger who is the owner of the blog outputs the spot advertisement of a pre-designated category to the sub area of the web browser 10, so that a certain rate of the advertisement cost is paid to the corresponding blogger when the user clicks the corresponding spot advertisement.

In this embodiment, the category information can be set in the main page of each blog as well as in the sub page thereof, both of which are linked with each other, depending on the blogger's selection.

In accordance with this embodiment, if the blogger divides its own blog into a plurality of pages and then posts information about a different field of interest on each page in advance, the category of the spot advertisement can be set such that the spot advertisement output for each page also matches the corresponding field of interest. Thus, the user who accesses that blog can more easily click the spot advertisement.

Referring back to FIG. 28, the client terminal 2 in accordance with this embodiment catches the URL address value of the blog output to the web browser 10 and transmits it to the advertisement exposure control server AOCS. Then, the advertisement exposure control server AOCS outputs the transmitted spot advertisement to the sub area 16 that is the marginal space of the toolbar area of the web browser 10.

The blog terminal a52 in accordance with this embodiment designates a spot advertisement category to be matched with the URL address value of the main page or sub page of the blog and transmits the category designation data matching the URL address value to the advertisement exposure control server AOCS. In another embodiment, the category matching process of the spot advertisement with the URL address value of the blog may be also performed in the advertisement exposure control server AOCS.

The advertisement exposure control server AOCS in accordance with this embodiment receives the spot advertisement data from the spot advertiser terminal a4 and classifies and stores it by category, receives and registers the spot advertisement category information from the blogger terminal a52 so that it matches the URL address value of the main page or sub page of the blog, and extracts the advertisement data of the category matching the URL address value of the blog transmitted from the client terminal 2 by communication with the client terminal 2, and transmits it to the client terminal 2.

Figure 29:
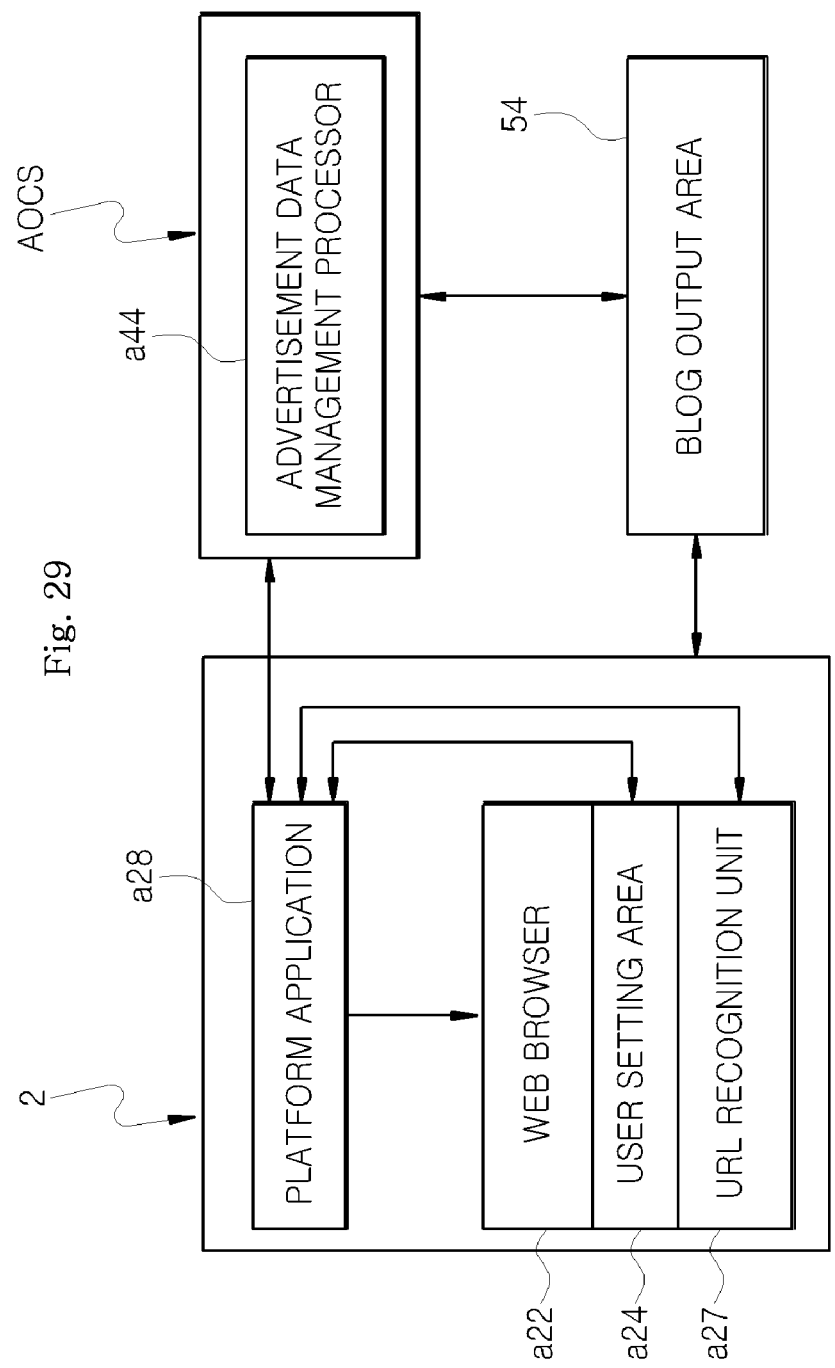
FIG. 29 is a block diagram schematically showing the configuration of the control system for advertisement exposure in accordance with still another embodiment of the present invention.

FIG. 29 is a block diagram schematically showing the configuration of the advertisement exposure control system in accordance with this embodiment. Referring to FIG. 29, the advertisement exposure control server AOCS in accordance with this embodiment manages the spot advertisement data to be output to the client terminal 2, and at the same time receives the URL address value of the blog from the platform application installed in the client terminal 2, extracts the spot advertisement data of the category corresponding to that URL address value and transmits it to the client terminal 2. The advertisement exposure control server AOCS may include an advertisement data management processor a44 for managing the spot advertisement data.

In addition, the spot advertisement data, which is managed by the advertisement data management processor a44 of the advertisement exposure control server AOCS, is classified by category and stored in order of large accumulated reserves. Thus, the spot advertisement data may be extracted in order of large accumulated reserves.

In the advertisement exposure control server AOCS, a plurality of pre-given URL address values of blog is pre-stored therein, and a plurality of categories pre-designated by a corresponding blogger is pre-stored therein to be matched with the URL address values of the blog.

When accessing a particular blog, the platform application a28 of the client terminal 2 catches the URL address value 13a of the blog entered in the URL input window 13, transmits it to the advertisement exposure control server AOCS, and outputs the spot advertisement data transmitted from the advertisement exposure control server AOCS to the sub area 16 that is the marginal space of the toolbar area of the web browser 10.

Further, the client terminal 2 may include a URL recognition unit a27 for transmitting the URL address value of the blog caught by the Internet option tool (not shown) to the platform application a28 by communication with the platform application a28 and the Internet option tool.

Figure 30:
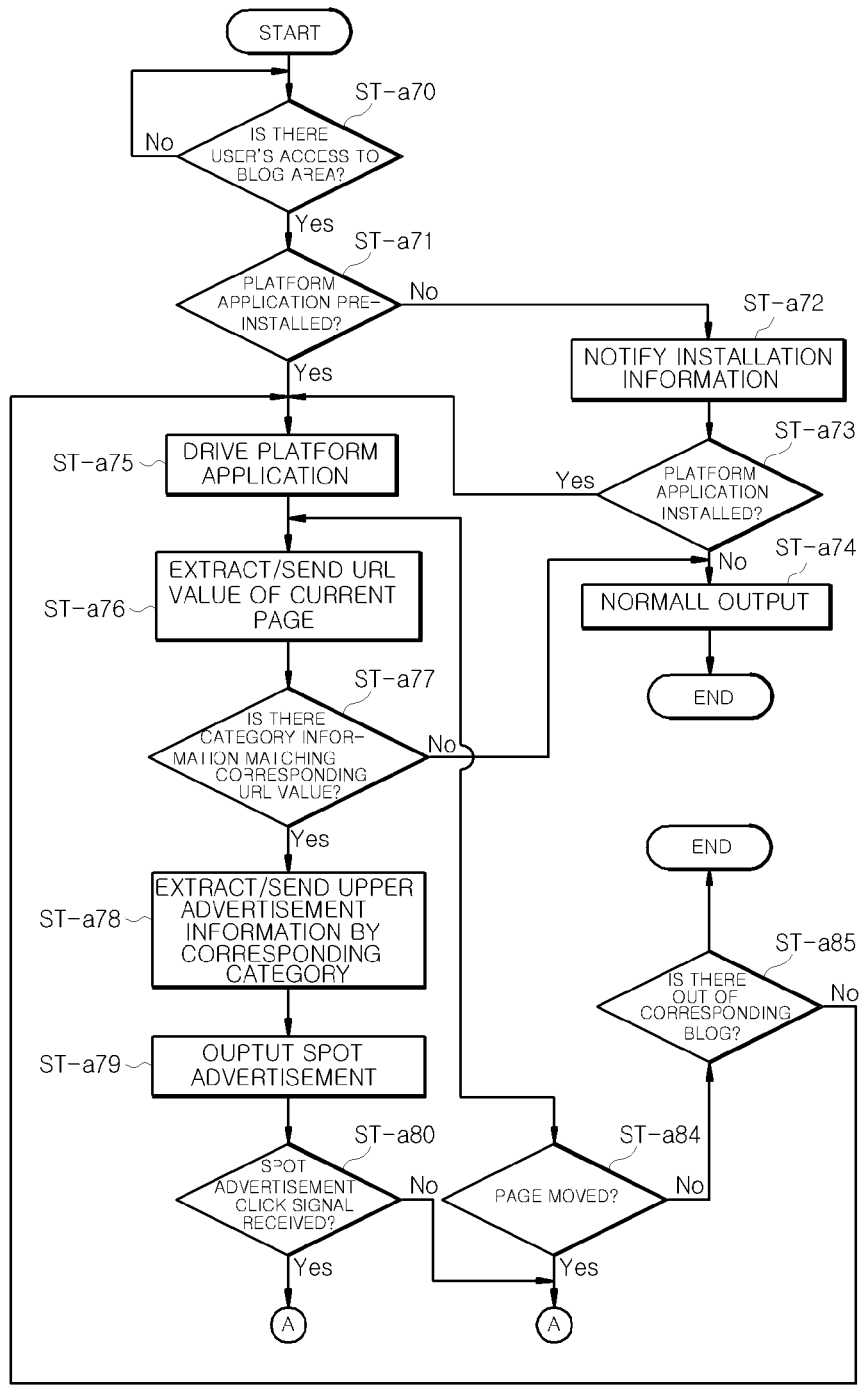
FIGS. 30 and 31 are flowcharts describing the operation of the control system for advertisement exposure in accordance with still another embodiment of the present invention.
Figure 31:
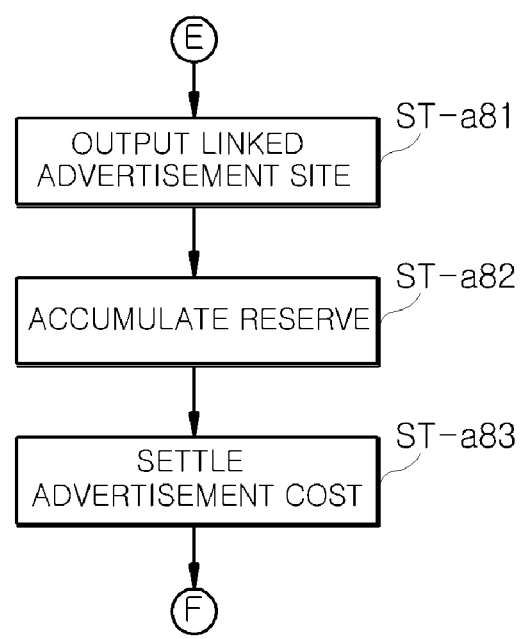

FIGS. 30 and 31 are flowcharts describing the operation of the advertisement exposure control system in accordance with this embodiment. Steps ST-a70 to ST-a74 shown in FIGS. 30 and 31 are similar to steps ST-1 to ST-5 shown in FIG. 5, and therefore, a detailed description thereof will be omitted.

When the user accesses a specific blog area using the client terminal 2, the platform application a28 installed in the client terminal 2 is driven (ST-a75) and the platform application a28 extracts a URL address value of a current blog page (ST-a76). Namely, when accessing the blog page, the URL address value of the corresponding blog page is entered in the URL input window 13 of the web browser 10 of the client terminal 2, so the corresponding URL address value can be extracted by the platform application a28. The platform application a28 transmits the URL address value of the corresponding blog page to the advertisement exposure control server AOCS (ST-a76).

The advertisement exposure control server AOCS determines whether or not there is any category information matching the received URL address value (ST-a77). If there is any category information matching the received URL address value, it extracts the spot advertisements classified by category in descending order, and transmits the spot advertisement to the client terminal 2 (ST-a78) so as to be output (ST-a79).

On the other hand, if there is no category information matching the received URL address value, this means that the corresponding blogger does not designate the category of the corresponding blog, so the advertisement exposure control server AOCS does not transmit separate spot advertisement data to the client terminal 2.

Next, the advertisement exposure control server AOCS determines whether or not a corresponding spot advertisement click signal is received from the client terminal 2 (ST-a80). That is, the platform application a28 of the client terminal 2 monitors the spot advertisement data and, upon generation of the click signal of the corresponding spot advertisement data, transmits the click information to the advertisement exposure control server AOCS.

If the spot advertisement click signal is received from the client terminal 2, the advertisement exposure control server AOCS outputs detailed information of the corresponding spot advertisement (ST-a81) and accumulates a certain amount of reserve in reward for the corresponding click (ST-a82).

The advertisement exposure control server AOCS settles an advertisement cost incurred by clicking the spot advertisement data with the spot advertiser, and may also perform a settlement process of paying a certain amount of the advertisement cost to the corresponding blogger (ST-a83).

On the other hand, if the spot advertisement click signal is not received from the client terminal 2, the advertisement exposure control server AOCS determines whether or not a signal relating to a movement to a different page of the corresponding blog, i.e., sub page is applied by communication the platform application a28 installed in the corresponding client terminal 2 (ST-a84).

Namely, the platform application a28 installed in the corresponding client terminal 2 continuously monitors the URL input window 13 and transmits, to the advertisement exposure control server AOCS, a URL address value when there is a change of the web page (ST-a76). When the user moves the web page, the advertisement exposure control server AOCS repeats the process of extracting the spot advertisement, and, if there is no movement of the web page, it monitors whether or not there is out of the corresponding blog area by communication the platform application a28 installed in the client terminal 2 (ST-a85).

If there is out of the corresponding blog area, the advertisement exposure control server AOCS stops outputting the spot advertisement of the category designated by the corresponding blogger.

Figure 32:
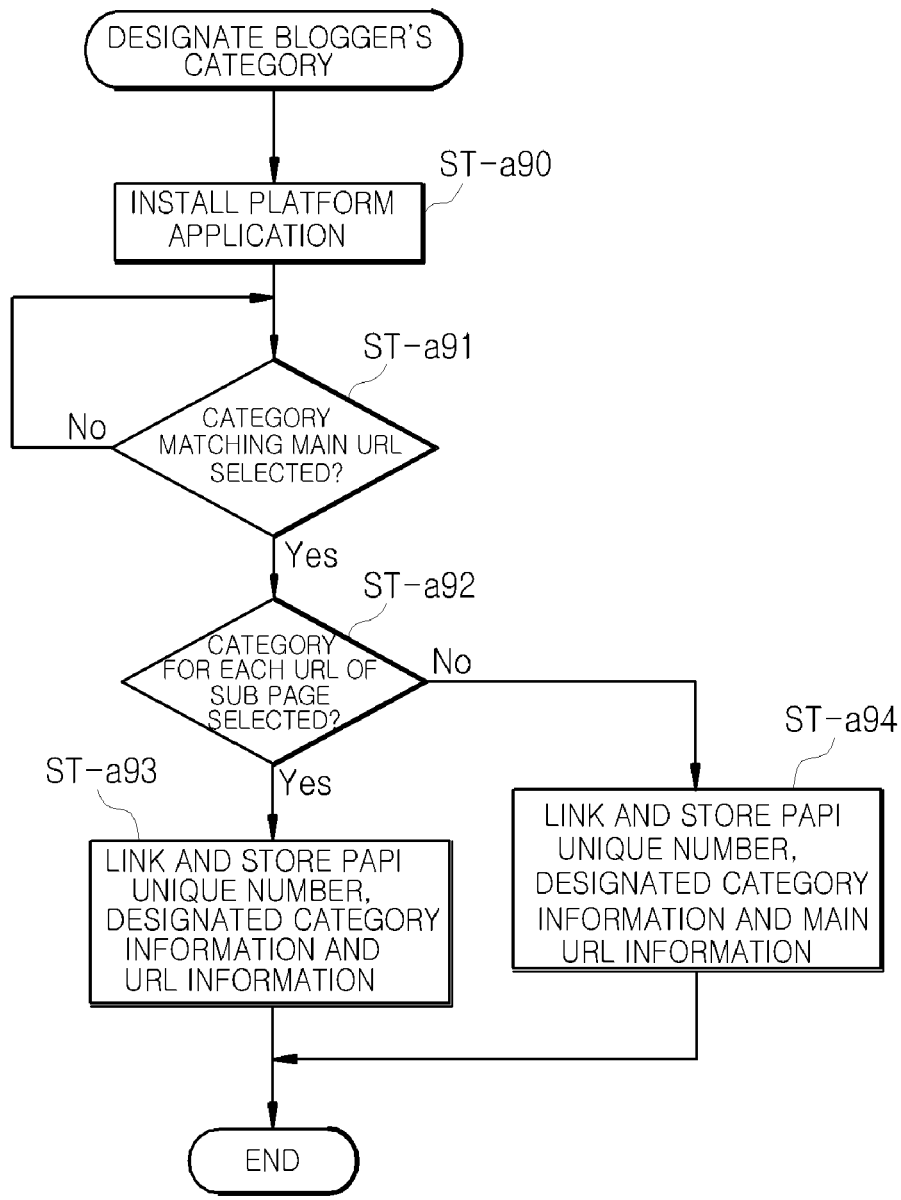
FIG. 32 is a flowchart describing the operation of designating a category in the control system for advertisement exposure in accordance with still another embodiment of the present invention.

FIG. 32 is a flowchart describing a category designating operation of the advertisement exposure control system in accordance with this embodiment. That is, FIG. 32 shows a process in which a blogger who owns a specific blog accesses the advertisement exposure control server AOCS and designates an advertisement category of the corresponding blog.

First, the blogger has access to the advertisement exposure control server AOCS through the blogger terminal a52 and then installs the platform application a28 in the blogger terminal a52 (ST-a90).

The advertisement exposure control server AOCS determines whether or not a specific blog URL address value and an advertisement category selection signal matching the URL address value are received from the blogger terminal a52 (ST-a91 and ST-a92). That is, when other user accesses the blog of the blogger, the blogger may pre-designate an advertisement category desired to be output to the web browser of the corresponding user. For instance, the blogger may designate an associated advertisement category depending on its own blog characteristic or information posted on the blog, and information features by respective blog pages.

The advertisement exposure control server AOCS receives URL address values of the main page and sub page of the specific blog from the blogger terminal a52, and receives an advertisement category selection signal matching each URL address value and stores it together with the blogger information (ST-a93 and ST-a94).

The blogger information may be a unique number of the platform application PAPI installed in the corresponding blogger terminal a52, and the unique number of the platform application PAPI, designated category information and URL information may be linked and stored in the advertisement exposure control server AOCS.

Hereinafter, a control system for advertisement exposure in accordance with another embodiment of the present invention will be described. Components of the advertisement exposure control system of this embodiment identical or similar to those of the above-described embodiment will be not described in detail.

The advertisement exposure control system in accordance with this embodiment preliminarily determines a category of a sub advertisement matching a web page output to the main area 14 according to a first user's input, and thereafter verifies the validity of the previously matching category of the sub advertisement according to a second user's input. Namely, the advertisement exposure control system in accordance with this embodiment allows the user to preliminarily register URL information or key word information by URL of Internet address and web information in the server and allow a certain rate of charge per click to be provided to the corresponding user during definite registration. Thus, it is possible that the user can directly participate in a variety of newly created information and register necessary information in the server, so that more users can install the platform application in their terminals and also register more exact information.

In order to verify whether or not the preliminarily registered information matches the category information, the advertisement exposure control system in accordance with the embodiment of the present invention allows other users to participate and to make a recommendation about whether the preliminarily registered information matches the category information, and provide a certain rate of charging per click to or impose a penalty on the preliminarily registered user or the user who made the recommendation based on the category matching result of the corresponding information The advertisement exposure control system in accordance with the embodiment of the present invention automatically notifies the manager of corresponding recommendation and non-recommendation information based on the number of recommendations and the number of non-recommendations about whether the preliminarily registered information matches the category information. In addition, it imposes a penalty on a user who selects a non-matching category and gives an incentive to a user with high degree of matching, thus increasing participation.

Referring again to FIGS. 19 and 20, the client terminal 2 of this embodiment catches the URL address value, which the user entered in the URL input window 13 of the web browser 10, and transmits it to the advertisement exposure control server AOCS, and outputs input value registration application information and/or spot advertisement transmitted from the advertisement exposure control server AOCS to the sub area 16 that is the marginal space of the toolbar area of the web browser 10.

The spot advertiser terminal a4 of this embodiment uploads the advertisement data to the advertisement exposure control server AOCS to output the spot advertisement to the web browser 10 of the client terminal 2.

The advertisement exposure control server AOCS of this embodiment receives the spot advertisement data from the spot advertiser terminal a4 and classifies and stores it by category, extracts the advertisement data of a category matching the URL address value or key word transmitted from the client terminal 2 by communication with the client terminal 2, transmits it to the client terminal 2, outputs an input value registration application screen for unregistered URL address values or key words and registers the input value registration application information transmitted from the client terminal 2, and classifies and registers the corresponding input value as the category as requested.

In this embodiment, the URL address values or key words unregistered in the advertisement exposure control server AOCS refer to new URL address values or key words that are unregistered in the database of the advertisement exposure control server AOCS, including URL address values or key words that are not classified by category. In this embodiment, the URL address values or key words registered in the advertisement exposure control server AOCS refer to those that have been already classified by category, and also to information regarding the spot advertisement data classified in the database of the advertisement exposure control server AOCS by category.

When an unregistered URL address value or key word is transmitted from the client terminal 2 to the advertisement exposure control server AOCS, the advertisement exposure control server AOCS transmits, to the client terminal 2, a screen (hereinafter, referred to as "input value registration application screen" or "unregistered input value registration application screen") that can register the corresponding unregistered URL address value or key word.

When any URL address value or key word unregistered in the database of the advertisement exposure control server AOCS is entered, the client terminal 2 of this embodiment outputs the input value registration application screen transmitted from the advertisement exposure control server AOCS to the sub area 16 of the web browser 10.

Figure 33:
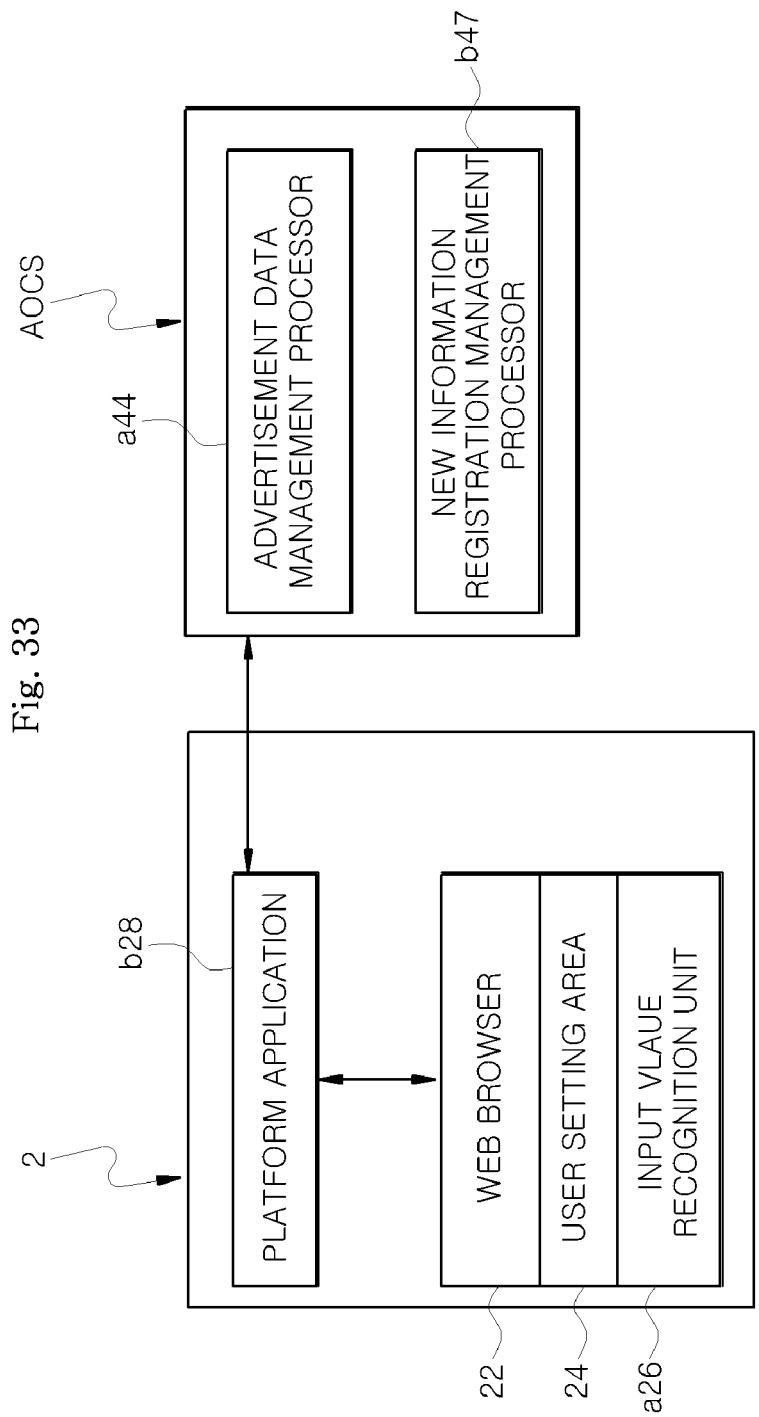
FIG. 33 is a block diagram schematically showing the configuration of the control system for advertisement exposure in accordance with still another embodiment of the present invention.

FIG. 33 is a block diagram schematically showing the configuration of the control system for advertisement exposure in accordance with the embodiment of the present invention. Referring to FIG. 3, the advertisement exposure control server AOCS in accordance with this embodiment may include a new information registration management processor b47 for comparing the URL address value or key word transmitted from the client terminal 2 with the information pre-registered in the database to determine whether or not they are registered, outputting a screen for registering the unregistered URL address value or key word to the client terminal 2, receiving the unregistered URL address value or key word and user-designated category information from the client terminal 2, performing a preliminary registration process, receiving a different user recommendation signal over a predetermined recommendation number, and definitely registering the unregistered URL address value or key word as a corresponding category when the registration condition is met.

Figure 34:
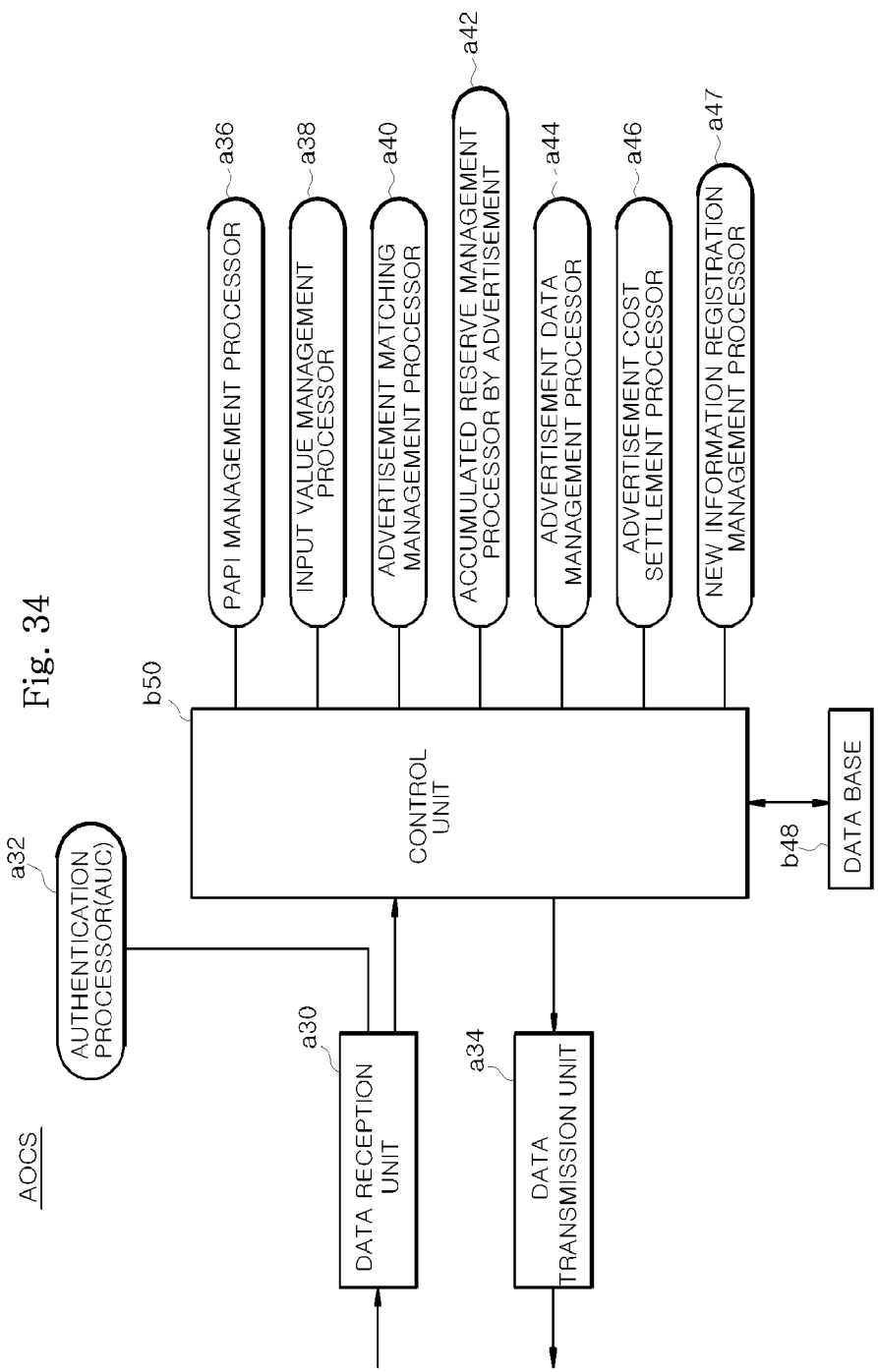
FIG. 34 is a block diagram showing the configuration of the advertisement exposure control server in accordance with still another embodiment of the present invention.

FIG. 34 is a block diagram showing the configuration of the advertisement exposure control server AOCS in accordance with this embodiment. Referring to FIG. 34, the configuration of the advertisement exposure control server AOCS in accordance with this embodiment may include a data reception unit, a data transmission unit, a PAPI management processor, an input value management processor, an advertisement matching management processor, an accumulated reserve management processor by advertisement, an advertisement data management processor, an advertisement cost settlement processor, a database, and a control unit. The description of the components of the advertisement exposure control server AOCS shown in FIG. 34 that are identical or similar to those of the advertisement exposure control server AOCS shown in FIG. 21 will be omitted.

Reference numeral b50 denotes the control unit for performing the control of each processor, performing a registration and transmission process of advertisement data with respect to the client terminal 2 and the spot advertiser terminal a4, and performing a registration process of unregistered input values.

Reference numeral b46 denotes the advertisement cost settlement processor for settling the cost of the spot advertisement per click, transmitting advertisement cost settlement data of the spot advertiser, and settling an incentive fee incurred by the registration of the unregistered input values.

Reference numeral b48 denotes the database for classifying and storing the spot advertisement data by category, storing the accumulated reserve information for each advertisement output together with the spot advertisement data, storing banner advertisement output time data, storing a platform application unique number of the client terminal 2, storing preliminary registration information and definite registration information about the input value of unregistered URL or key word, and storing recommendation and non-recommendation information related to the registration process.

Figure 35:
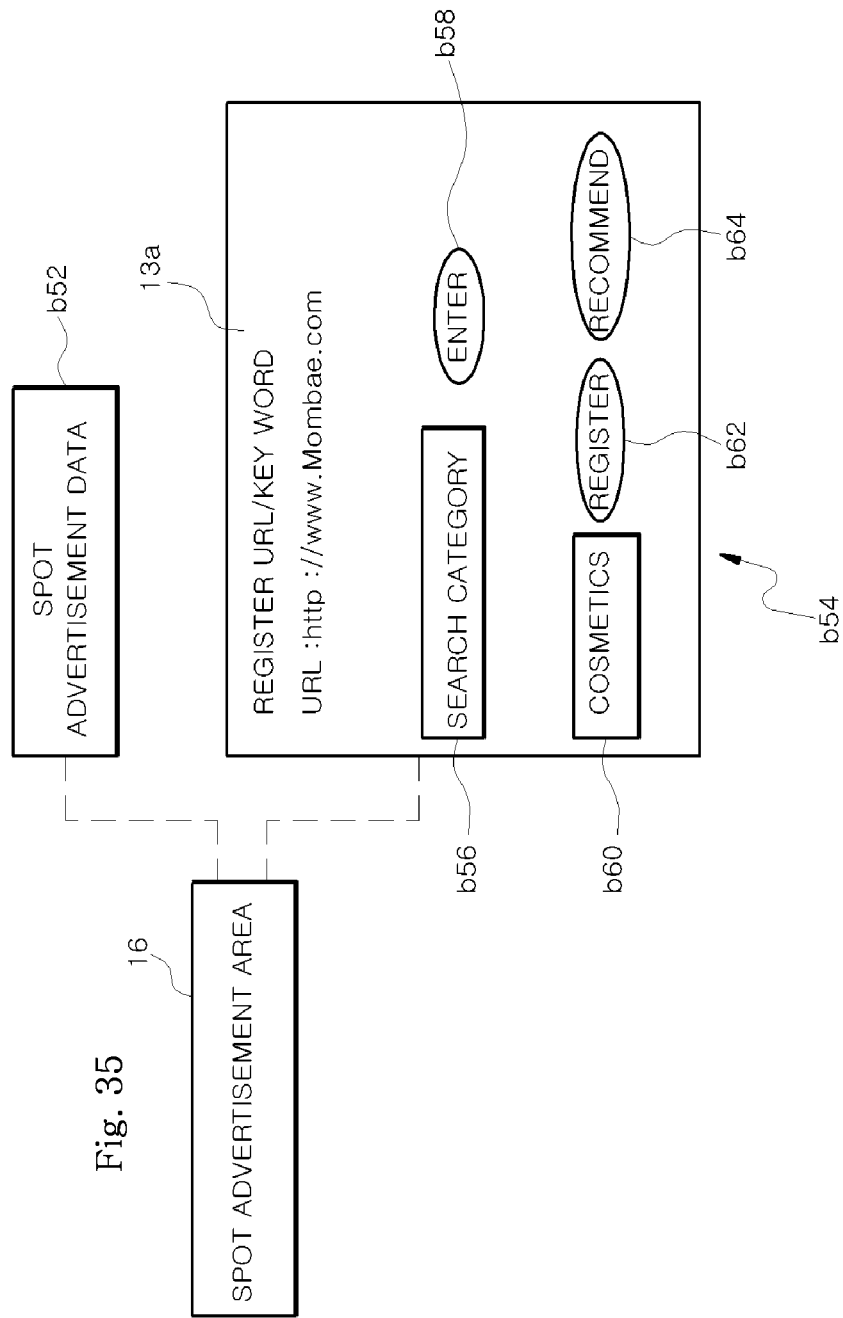
FIG. 35 shows a sub area in accordance with still another embodiment of the present invention.

FIG. 35 shows a sub area 16 (hereinafter, referred to as "spot advertisement area") in the control system for advertisement exposure in accordance with this embodiment. Referring to FIG. 35, output to the spot advertisement area 16 in accordance with this embodiment is spot advertisement data b52 of a category corresponding to a URL address value or key word transmitted by the client terminal 2.

If the URL address value or key word transmitted by the client terminal 2 has not been registered, the advertisement exposure control server AOCS outputs an unregistered input value registration application screen b54 to the spot advertisement area 16 of the client terminal 2. Any one of the spot advertisement data b52 and the unregistered input value registration application screen b54 may be selectively output to the spot advertisement area 16 in accordance with this embodiment.

The input value entered or clicked by the user, namely, the URL address value (e.g., "http://www.Mombae.com", see 13a) or key word may be output to the unregistered input value registration application screen b54. The unregistered input value registration application screen b54 may include a category search button b56 and an input button b58 that can be selected if the user determines that it has a high relationship with the corresponding input value.

The unregistered input value registration application screen b54 may further include an output window b60 for outputting information about a category (e.g., "cosmetics") selected by the user, a category registration button b62, and a recommendation button b64 for representing an intention that has a high relationship with a category registered by other user.

When the unregistered input value registration application screen b54 is output to the spot advertisement area 16, the user can recognize that the user-entered URL address value or key word has not been registered in the advertisement exposure control server AOCS, and can also register the corresponding unregistered input value in the advertisement exposure control server AOCS.

That is, the user may select and register a category that is likely to have a highest relationship with the corresponding unregistered input value, while viewing a plurality of categories output by clicking the category search button 56 on the unregistered input value registration application screen b54.

In this case, the platform application b28 installed in the client terminal 2 transmits the information on the application for the corresponding registration to the advertisement exposure control server AOCS.

This user's registration is a preliminary registration and a definite registration process may be performed later by reflecting recommendations of other users.

In addition, the user who has done the preliminary registration or recommendation may receive, as an incentive, a certain portion of the advertisement cost per click of the advertisement data that is exposed in association with the corresponding input value, and may get a penalty that the registration is prohibited for a predetermined period of time in case of non-matching registration information.

Figure 36:
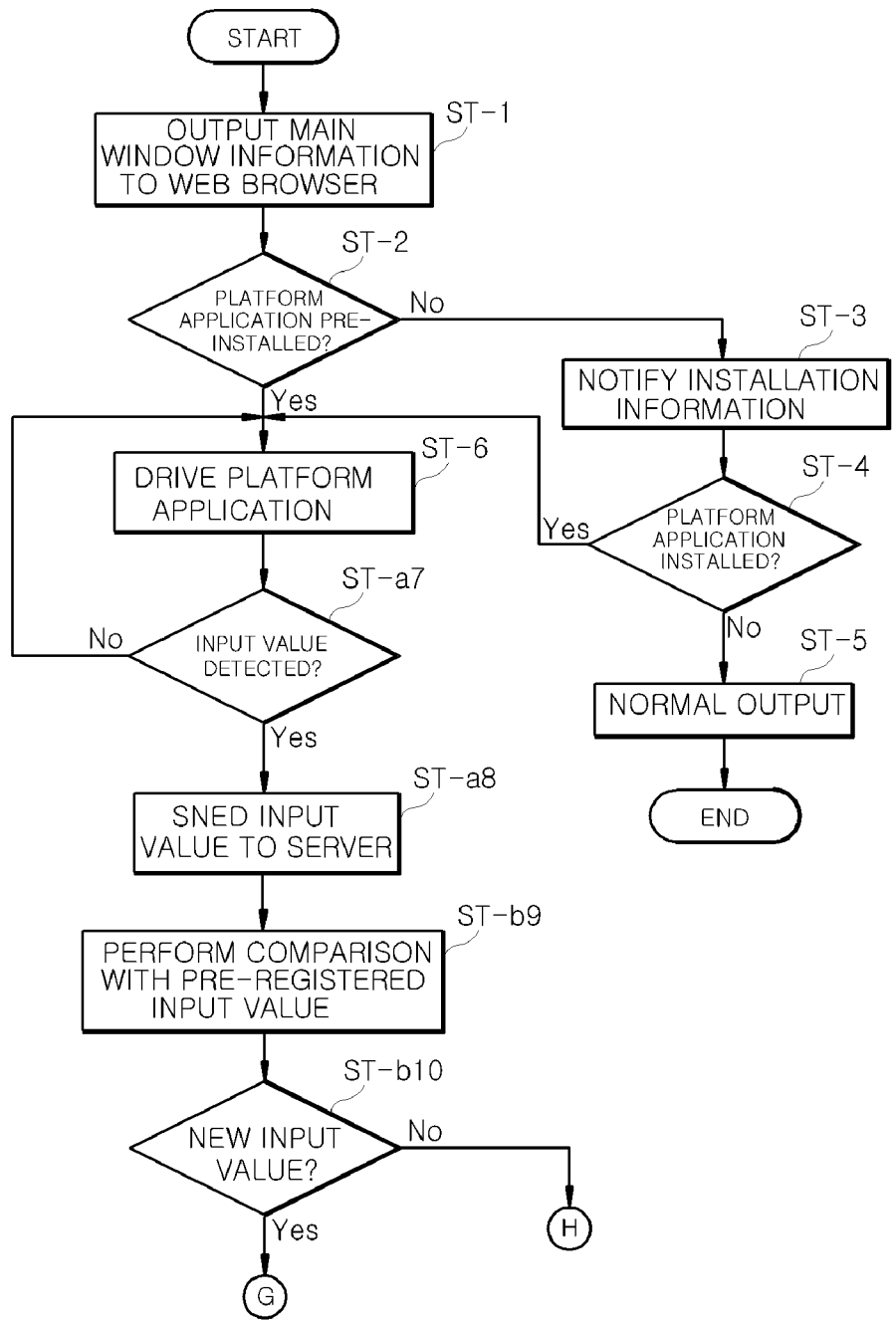
FIGS. 36 and 37 are flowcharts describing the operation of the control system for advertisement exposure in accordance with still another embodiment of the present invention.
Figure 37:
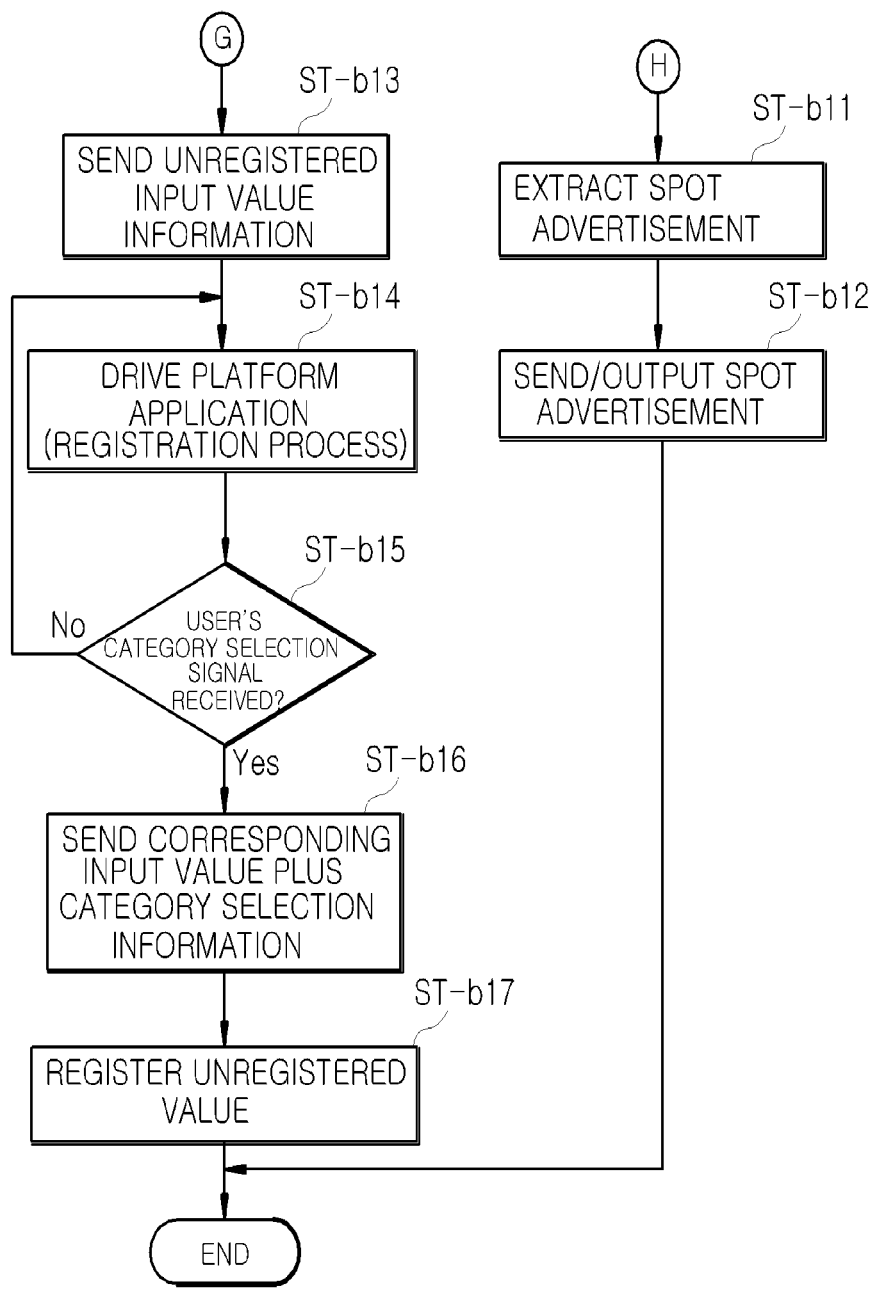

FIGS. 36 and 37 are flowcharts describing the operation of the control system for advertisement exposure in accordance with this embodiment. Since steps ST-1 to ST-5 shown in FIGS. 36 and 37 are identical to steps ST-1 to ST-5 shown in FIG. 5 and steps ST-6 to ST-a8 shown in FIGS. 36 and 37 are identical to steps ST-6 to ST-a8 shown in FIGS. 22 and 23, a detailed description thereof will be omitted.

The advertisement exposure control server AOCS determines whether or not a received URL address value or key word is data pre-registered in the database 48 (ST-b9 and ST-b10). If the URL address value or key word transmitted from the client terminal 2 is a new input value that is not pre-registered in the database 48, the advertisement exposure control server AOCS transmits the unregistered input value registration application screen data to the platform application b28 of the client terminal 2 (ST-b13).

The platform application b28 of the client terminal 2 outputs the transmitted unregistered input value registration application screen data to the spot advertisement area 16 (ST-b14). The unregistered input value registration application screen data of this embodiment may include incentive information that the user may secure when there is a registration application for the unregistered input value. The user can recognize that the user-entered URL address value or key word has not been registered in the advertisement exposure control server AOCS, and can register the corresponding unregistered input value in the advertisement exposure control server AOCS.

When the unregistered input value and category selection information of the user that may match the unregistered input value are received (ST-b15), the platform application b28 of the client terminal 2 transmits them to the advertisement exposure control server AOCS (ST-b16). Then, the advertisement exposure control server AOCS performs a registration process for the corresponding unregistered input value based on the received unregistered input value and the category selection value (ST-b17).

If the URL address value or key word transmitted from the client terminal 2 is data that is pre-registered in the database b48, the advertisement exposure control server AOCS extracts spot advertisement data that matches the category of the received URL address value or key word (ST-b11), transmits it to the client terminal 2, and outputs the spot advertisement data to the spot advertisement area 16 of the web browser 10 of the client terminal 2 (ST-b12).

Besides, in this embodiment, the accumulation of reserve made by clicking the spot advertisement, settlement of advertisement cost, and so on may be further performed, and since a description thereof is identical or similar to that of the above embodiment, a detailed description thereof will be omitted.

Figure 38:
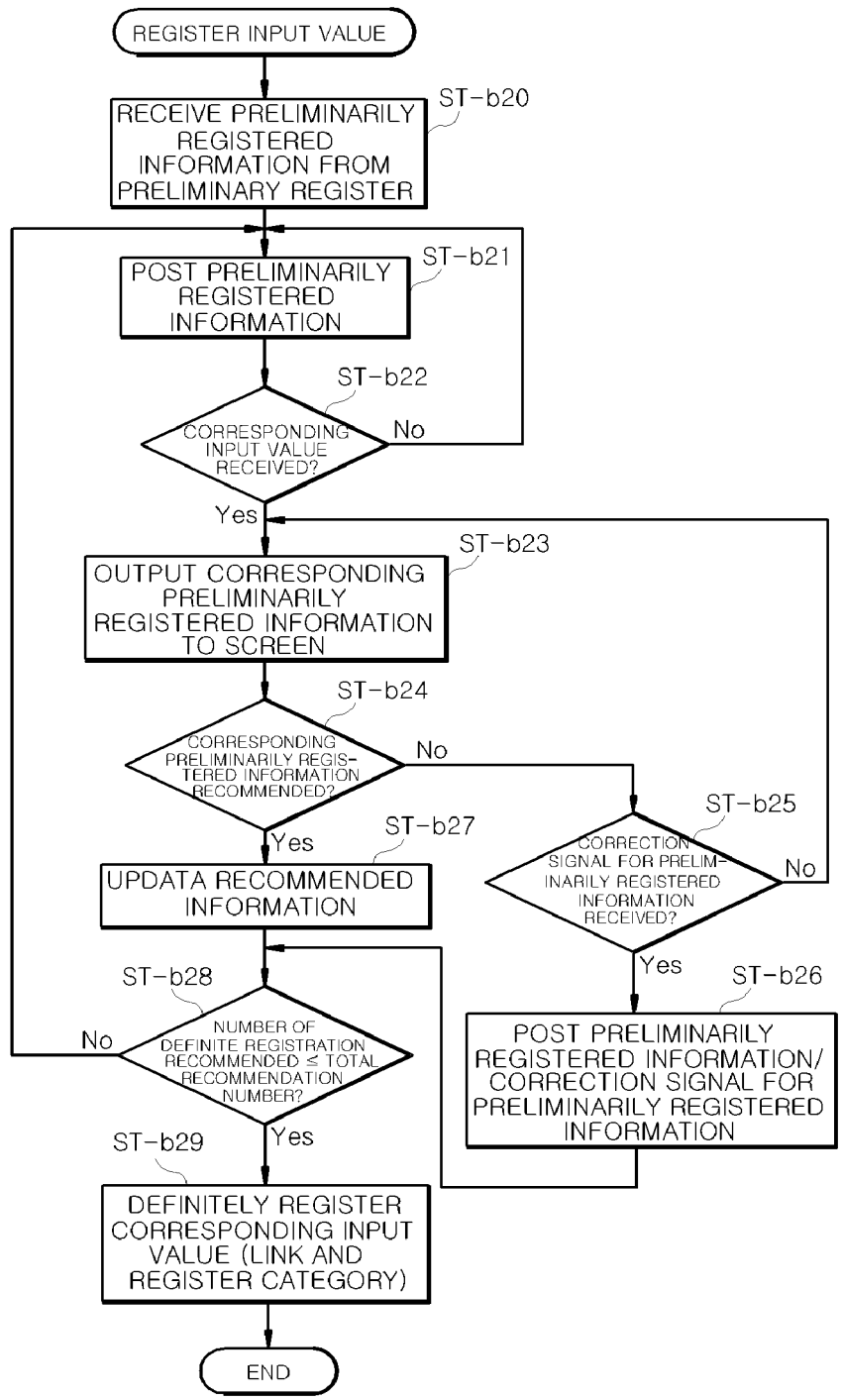
FIG. 38 is a flowchart describing an input value registration operation of the control system for advertisement exposure in accordance with still another embodiment of the present invention.

FIG. 38 is a flowchart describing an input value registration operation of the control system for advertisement exposure in accordance with this embodiment. In this embodiment, the reason why the user-entered new URL address value or key word is not registered directly but preliminarily registered in the advertisement exposure control server AOCS is to improve the accuracy and reliability of the user-selected category of the corresponding URL address value or key word.

Accordingly, the advertisement exposure control system in accordance with this embodiment can determine which user selects a correct category by inducing other users' participation in the new URL address value or key word, which any user has preliminarily registered.

First, the advertisement exposure control server AOCS in accordance with this embodiment receives a new URL address value or key word and preliminarily registered information that is category information selected by the user from the client terminal 2 (ST-b20), and preliminarily registers them in the database (ST-b21).

Then, the advertisement exposure control server AOCS determines whether or not a URL address value or key word entered through the client terminal 2 of other user is the input value that has been preliminarily registered in the database b48 (ST-b22). If the corresponding URL address value or key word is the preliminarily registered input value, the advertisement exposure control server AOCS transmits preliminarily registered screen data to the client terminal 2 so as to be output to the sub area 16 of the web browser 10 (ST-b23).

In this embodiment, the preliminarily registered screen data may include the preliminarily registered URL address value or key word and corresponding category information, together with a recommendation button for allowing other users to recommend the preliminarily registered URL address value or key word and a preliminary registration correction button for correcting this. Also, when other user pushes the preliminary registration correction button, a different category may be selected.

If a recommendation signal for the preliminarily registered information is received from the client terminal 2 of other user (ST-b24), the advertisement exposure control server AOCS receives the recommendation information from the corresponding client terminal 2 and updates the same (ST-b25), and determines whether a total number of recommendations for the corresponding preliminary registration information is larger than or equal to a predetermined recommendation number that can be definitely registered (ST-b28).

If the total number of recommendations for the corresponding preliminarily registered information is larger than or equal to the predetermined recommendation number that can be definitely registered, the advertisement exposure control server AOCS changes a category link registration of the corresponding input value to a definition registration state and updates it (ST-b29).

If the definite registration is made, although other users click or input the corresponding input value later, the advertisement exposure control server AOCS does not transmit a registration application screen to the client terminal 2.

Meanwhile, in additional embodiment, it may be possible to further perform a process which finally examines whether or not the category is linked well based on the manager's input with respect to the preliminarily registered or definitely registered input value. For examination by the manager, a notification may be automatically made to the manager a predetermined period of time (e.g., 30 minutes) after the preliminary registration or definite registration.

In step ST-b24, if there is no recommendation signal for the preliminarily registered information from the client terminal 2 of other user, the advertisement exposure control server AOCS determines whether a signal desired to correct the preliminarily registered information is received from the client terminal 2 of other user (ST-b29). If the correction signal for the preliminarily registered information is received, the advertisement exposure control server AOCS updates the database b48 to include received preliminary registration corrected information (for example, category change information) in the preliminarily registered information (ST-b26).

The previous preliminarily registered category information and category information corrected by other user may be output simultaneously to the web browser 10, and recommendation for respective link category information may be received.

Figure 39:
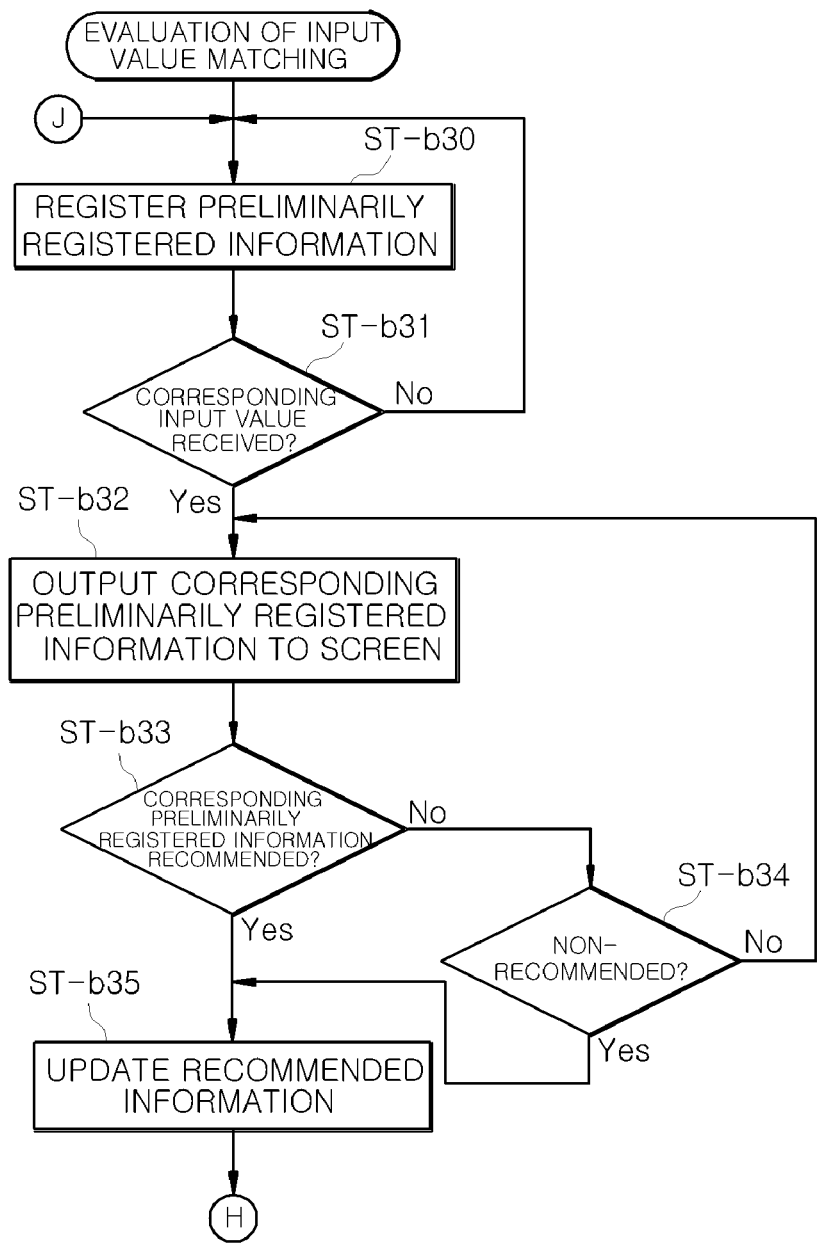
FIGS. 39 and 40 are flowcharts describing an input value matching evaluation operation of the control system for advertisement exposure in accordance with still another embodiment of the present invention.
Figure 40:
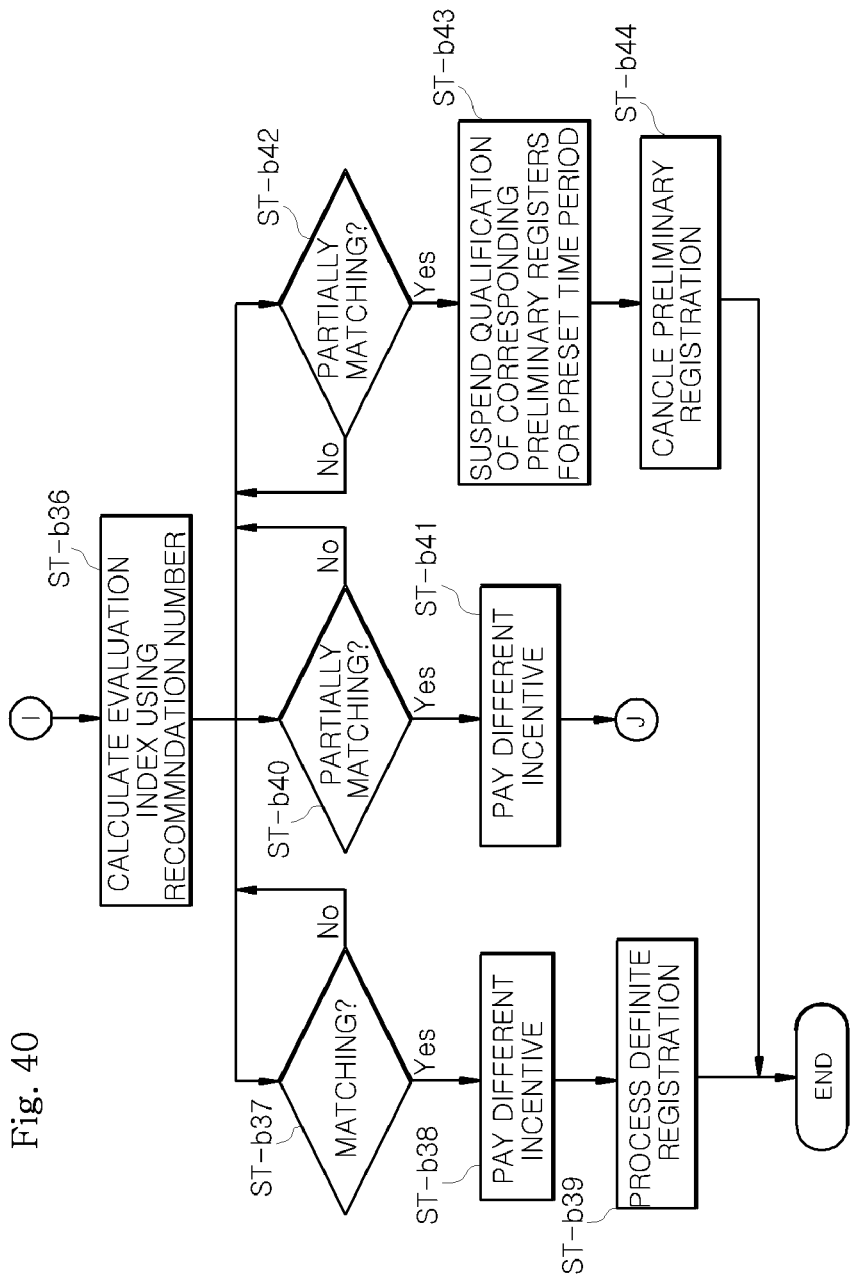

FIGS. 39 and 40 are flowcharts describing an input value matching evaluation operation of the control system for advertisement exposure in accordance with this embodiment. In this embodiment, it may be evaluated whether or not the user's input value matches category information linked with that input value, and receive an incentive or penalty based on the matching result.

First, when a URL address value or key word is received from the client terminal 2 of any user, the advertisement exposure control server AOCS in accordance with this embodiment registers corresponding preliminarily registered information in the database b48 (ST-b30).

Next, the advertisement exposure control server AOCS determines whether or not a URL address value or key word entered through the client terminal 2 of other user is the input value that has been preliminarily registered in the database 48 (ST-b31). If the corresponding URL address value or key word is the preliminarily registered input value, the advertisement exposure control server AOCS transmits the preliminarily registered screen data to the client terminal 2 so as to be output to the sub area 16 of the web browser 10 (ST-b32).

Thereafter, the advertisement exposure control server AOCS determines whether or not a recommendation signal for the preliminarily registered information is applied from the client terminal 2 of other user (ST-b33), and if so, the advertisement exposure control server AOCS receives recommendation information from the client terminal 2 and updates it (ST-b35).

On the other hand, if a non-recommendation signal for the preliminarily registered information is applied from the client terminal 2 of other user (ST-b34), the advertisement exposure control server AOCS updates the recommendation information based on the corresponding non-recommendation information from the client terminal 2 (ST-b35).

The advertisement exposure control server AOCS calculates an evaluation index of the corresponding preliminarily registered information on the basis of the recommendation information and non-recommendation information transmitted from a plurality of users (ST-b35), and evaluates whether or not the corresponding preliminarily registered input value matches with its linked category based on the evaluation index (ST-b37 to ST-b44).

For instance, the calculation of the evaluation index is a calculation process of comparing the recommendation number and the non-recommendation number, and if the recommendation number is larger than a predetermined number and the non-recommendation number is less than the predetermined number, this means that it has a high degree of matching with the corresponding preliminarily registered input value (see ST-b37). If the rates of the recommendation number and the non-recommendation number are similar to each other and within a predetermined range, it is determined that they partially matches, indicating that the degree of matching is proper (see ST-b40). If the recommendation number is less than the predetermined number and the non-recommendation number is larger than the predetermined number, it can be determined that the degree of matching of category that matches the corresponding preliminarily registered input value is very low (see ST-b42).

The advertisement exposure control server AOCS applies a preset differential incentive to a user with a very high degree of matching based on the evaluation index (ST-b38), and updates the preliminarily registered information as definite registered information (ST-b39).

If it is determined to be partially matched, the advertisement exposure control server AOCS applies a preset differential incentive to the corresponding user (ST-b41). Meanwhile, if it is determined to be mismatched due to a very low degree of matching, the advertisement exposure control server AOCS suspends the registration qualification of the corresponding user for a predetermined period of time (ST-b43), and cancels the preliminarily registered category and allows other users to re-register the corresponding input value (ST-b44).

According to the control system for advertisement exposure in accordance with the embodiment of the present invention, the URL and key word unregistered in the server are found by the users' participation and are used to match the category to perform preliminary registration, and at the same time the matching of the preliminarily registered URL and key word with the category is verified and definitely registered through other users' recommendation, thereby further improving accuracy and reliability of matching.

Hereinafter, a control system for advertisement exposure in accordance with another embodiment of the present invention will be described. The description of the functions and components of the control system for advertisement exposure of this embodiment identical or similar to those of the above-described embodiment will be omitted.

The advertisement exposure control system in accordance with this embodiment divides the spot advertisement area 16 provided in the web browser 10 into several areas and outputs the advertisement data in order of advertisement data with greater accumulated reserves, and also outputs new product advertisement data in order of new product advertisement data with late registration.

That is, the advertisement exposure control system in accordance with this embodiment extracts category information that is registered in association with the URL value transmitted through the client terminal 2 of the user, extracts a certain number of advertisement data with larger accumulated reserves and the advertisement data registered as the new products among a plurality of advertisement data classified as the corresponding category, and outputs their combined packet data to the spot advertisement area 16 of the web browser 10 of the client terminal 2. Thus, the advertiser does an advertisement through the new product advertisement although an accumulated reserve is small due to a short product release period of time, enabling an intensive advertisement within a short period of time after new product release.

The client terminal 2 of this embodiment catches a URL value the user has entered in the URL input window output to the web browser and automatically transmits it to the advertisement exposure control server AOCS, so that the advertisement exposure control server AOCS outputs the spot advertisement data and new product advertisement data with highly ranked accumulated reserves to the sub area 16 that is the marginal space of the toolbar area of the web browser 10.

The advertisement exposure control server AOCS in accordance with this embodiment receives the spot advertisement data from the spot advertiser terminal a4 and classifies and stores it by category, re-sorts the spot advertisement data in the order of accumulated reserves in real time, receives the new product advertisement data and stores and manages it separately, extracts the advertisement data with high accumulated reserves of a category matching the URL address value transmitted from the client terminal 2, determines whether or not the new product advertisement data are stored, and extracts the new product advertisement data together and transmits them to the client terminal 2.

In this embodiment, the new product advertisement data includes advertisement data that are within a certain period of time after a certain release date pre-designated in the advertisement exposure control server AOCS, and updates the same to have a classification of general advertisement data after a preset period of time. If the advertisement data, not the new products, is exposed as the new product advertisement data, the advertisement exposure control server AOCS may give a penalty on the corresponding advertiser upon receipt of a report thereon from the user.

Regarding extraction of the new product advertisement data, the advertisement exposure control server AOCS of this embodiment can extract the new product advertisement data of the category preset by the user and extract the new product advertisement data with late product registration time as the new product advertisement data within the same category. Namely, it is regarded that the later the product registration time, the newer the product.

The database of the advertisement exposure control server AOCS classifies the spot advertisement data by category, and is established to sort them in order of spot advertisement data with larger accumulated reserves and to sort the new product advertisement data in order of new product advertisement data with late registration time.

Figure 41:
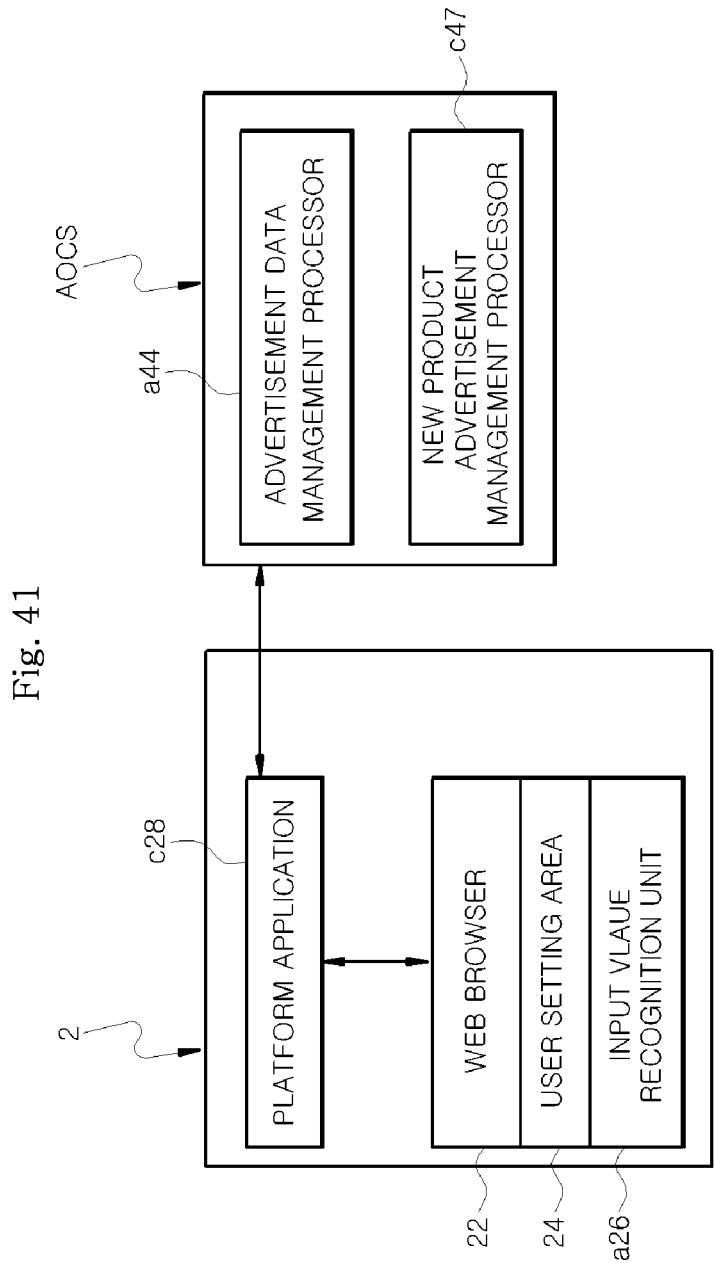
FIG. 41 is a block diagram showing the configuration of the control system for advertisement exposure in accordance with still another embodiment of the present invention.

FIG. 41 is a block diagram showing the configuration of the control system for advertisement exposure in accordance with this embodiment. Referring to FIG. 41, the advertisement exposure control server AOCS in accordance with this embodiment may include a new product management processor c47 for receiving the new product advertisement data from the advertiser, extracting the new product information established in the database, and transmitting them to the client terminal 2. The new product management processor c47 manages the new product registration time registered by the advertiser so that the new product information lately registered can be preferentially extracted.

When a URL address value is received, the advertisement exposure control server AOCS can extract the new product advertisement data and transmit it to the client terminal 2 if the received URL address value does not correspond to the pre-registered advertiser's site.

Figure 42:
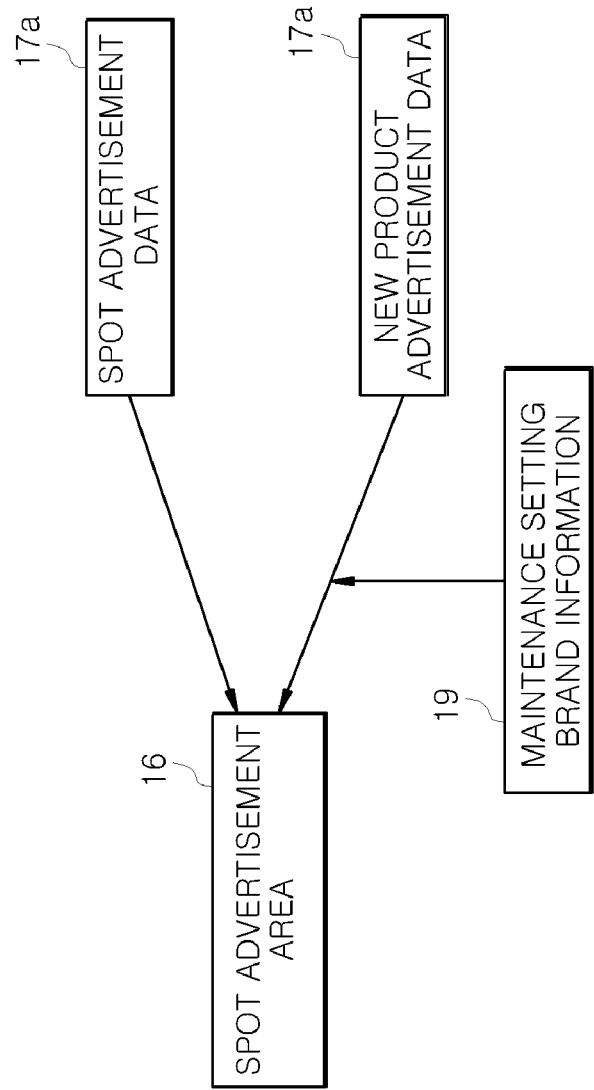
FIG. 42 shows a spot advertisement area of the control system for advertisement exposure in accordance with still another embodiment of the present invention.

FIG. 42 shows the spot advertisement area 16 of the control system for advertisement exposure in accordance with this embodiment.

Referring to FIG. 42, the spot advertisement area 16 in accordance with this embodiment is divided into two upper and lower ends. The spot advertisement data 17a transmitted from the advertisement exposure control server AOCS may be output to the upper end and the new product advertisement data 17b may be output to the lower end.

Figure 43:
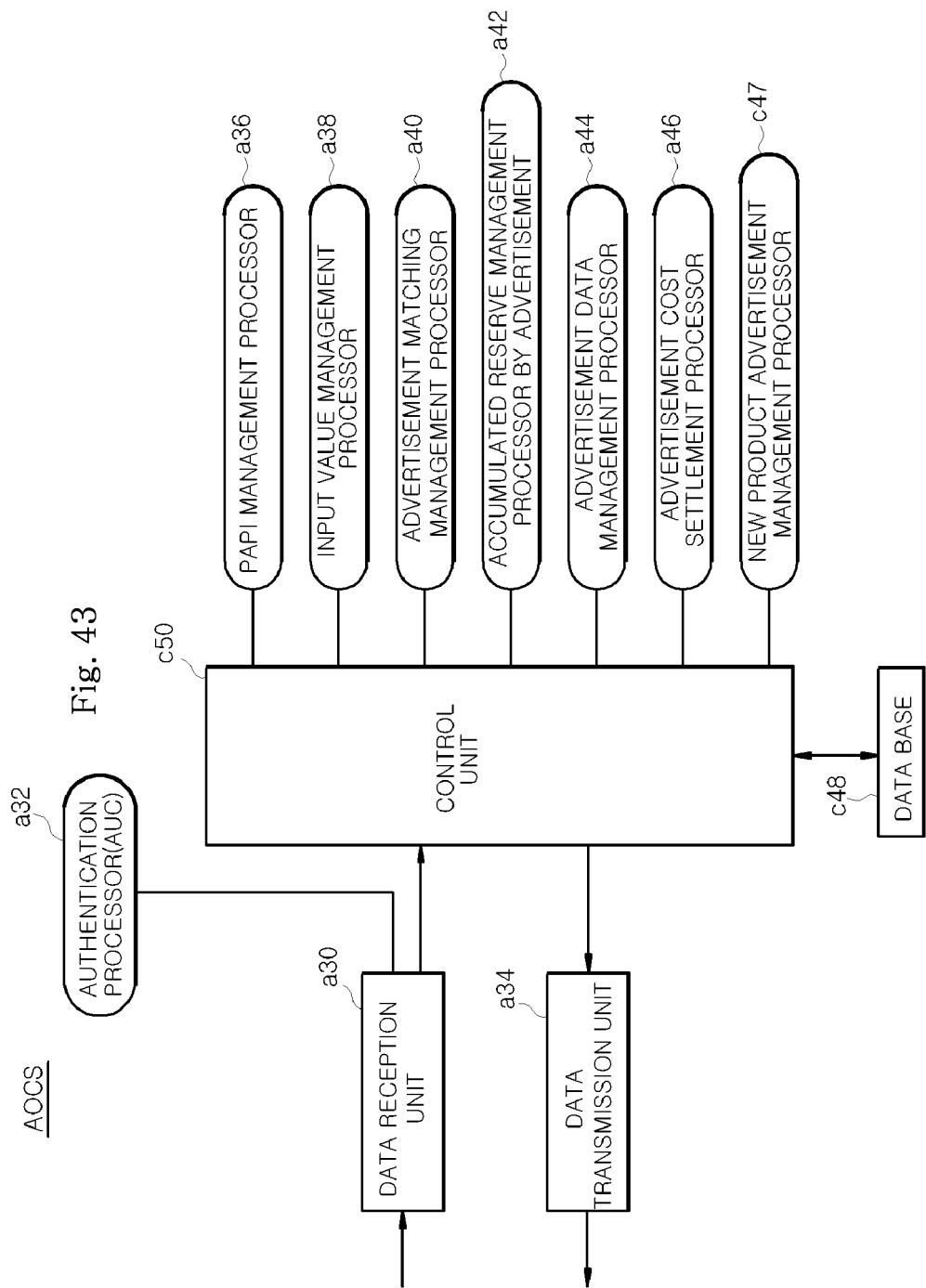
FIG. 43 is a block diagram showing the configuration of the advertisement exposure control server in accordance with still another embodiment of the present invention.

FIG. 43 is a block diagram showing the configuration of the advertisement exposure control server AOCS in accordance with this embodiment.

Referring to FIG. 43, the advertisement exposure control server AOCS in accordance with this embodiment may include a data reception unit, an authentication processor, a data transmission unit, a PAPI management processor, an input value management processor, an advertisement matching management processor, an accumulated reserve management processor by advertisement, an advertisement data management processor, an advertisement cost settlement processor, a new product advertisement management processor, a database and a control unit. In another embodiment, at least one of the authentication processor, the PAPI management processor, the input value management processor, the advertisement matching management processor, the accumulated reserve management processor by advertisement, the advertisement data management processor, the advertisement cost settlement processor and the new product advertisement management processor as shown in FIG. 43 may be embedded in the control unit. The description of the components of the advertisement exposure control server AOCS shown in FIG. 43 that are identical or similar to those of the advertisement exposure control server AOCS shown in FIG. 21 will be omitted.

Reference numeral c50 denotes the control unit for performing the control of each processor and performing a registration and transmission process of the spot advertisement and the new product advertisement data with respect to the client terminal 2 and the spot advertiser terminal a4.

Reference numeral c38 denotes the input value management processor for managing the URL address value or key word transmitted from the client terminal 2 so as to be associated with a pre-classified category, and setting information about user's items of interest, products of interest, brands of interest, and the like so as to be utilized as advertisement data extraction source values.

Reference numeral c47 denotes the new product management processor for storing and managing the new product advertisement data provided from the spot advertiser terminal a4 in order of late registration, and managing new product setting periods to update storage information of the new product advertisement data.

Reference numeral c48 denotes the database for classifying and storing the spot advertisement data by category, storing the accumulated reserve information of each advertisement output together with the spot advertisement data, storing the new product advertisement data to be extractable in order of late registration, and storing a platform application unique number of the client terminal 2.

Figure 44:
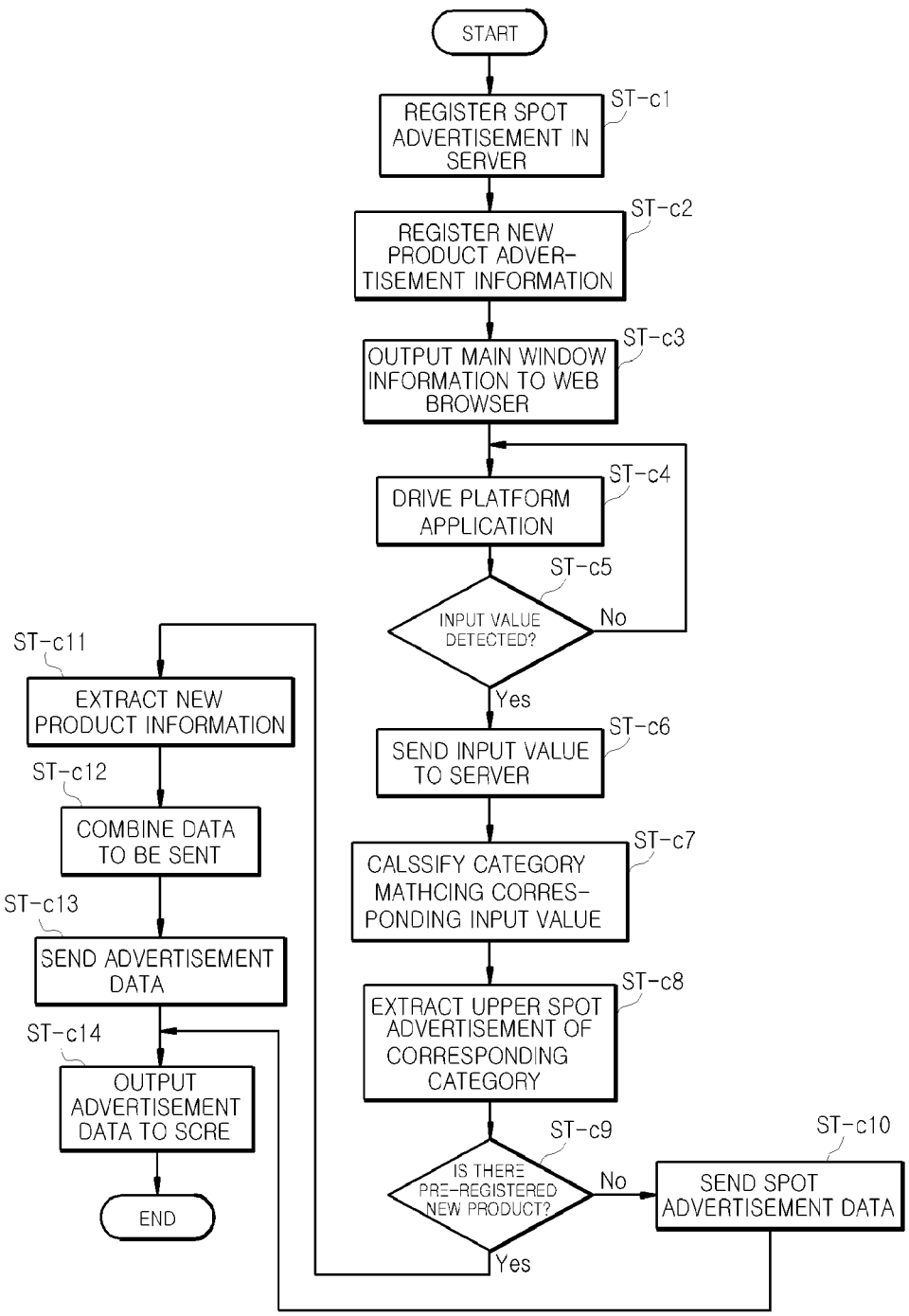
FIGS. 44 and 45 are flowcharts describing the operation of the control system for advertisement exposure in accordance with still another embodiment of the present invention.
Figure 45:
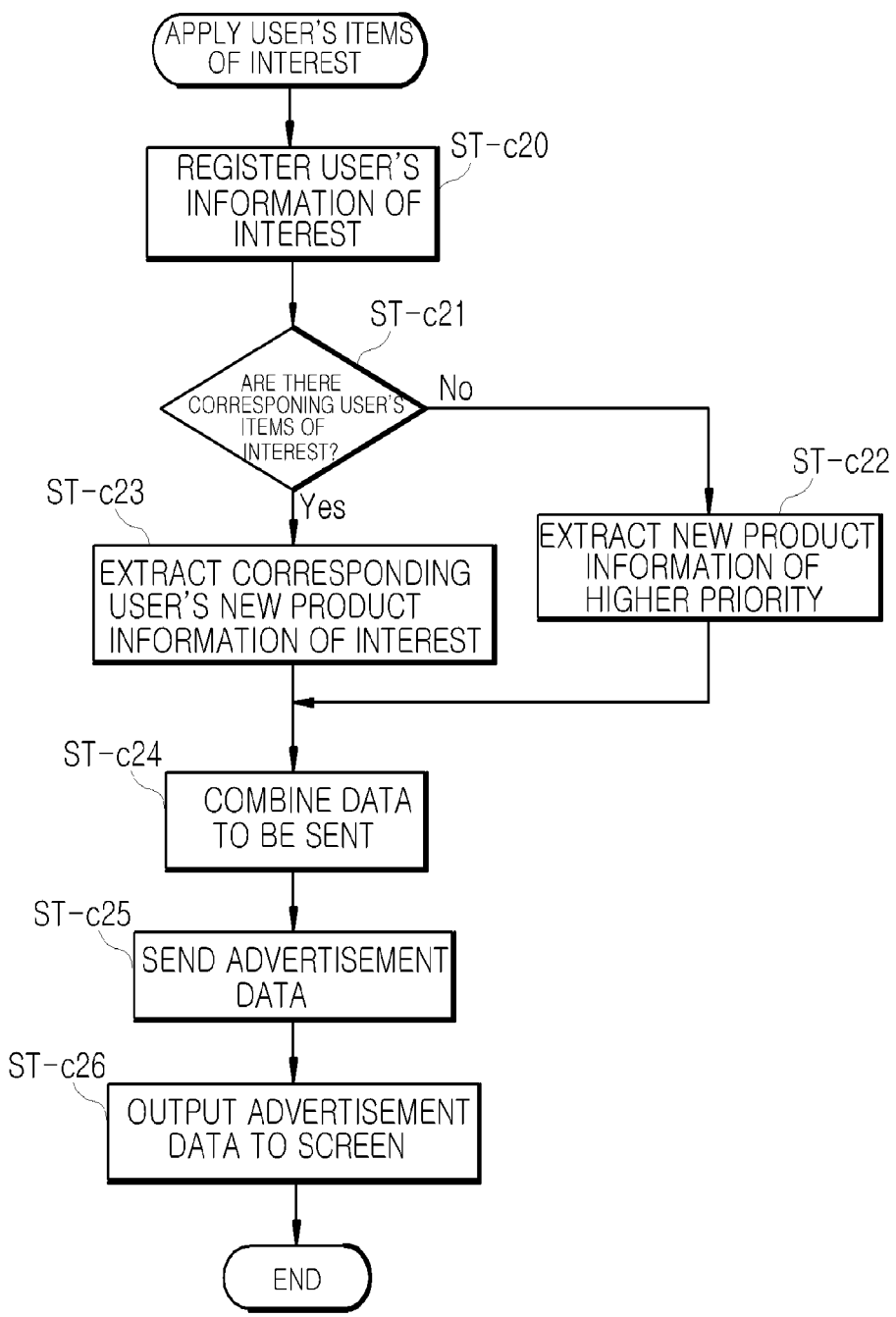

FIGS. 44 and 45 are flowcharts describing the operation of the control system for advertisement exposure in accordance with this embodiment.

The description of the functions or components of this embodiment identical or similar to those of the above-described embodiment will be omitted. First, referring to FIG. 44, an advertiser who wants to perform the spot advertisement or new product advertisement through the advertisement exposure control system in accordance with this embodiment transmits the spot advertisement data or new product advertisement data to the advertisement exposure control server AOCS and registers it (ST-c1 and ST-c2). In this embodiment, the new product advertisement data includes new product information to be registered, release date, release even information, and so on.

When the user has access to a web site such as a search portal and shopping mall through the client terminal 2, the advertisement exposure control system in accordance with this embodiment outputs the information of the web site as the main information to the main area 14 of the web browser 10 that is running in the client terminal 2 (ST-c3).

If the platform application c28 has been installed in the client terminal, the platform application c28 is driven (ST-c4) and determines whether the URL address value or key word is entered in the URL input window 13 or search window 20 of the web browser 10 (ST-c5).

When the URL address value or key word is entered, the platform application c28 transmits the entered URL address value or key word to the advertisement exposure control server AOCS (ST-c6).

Then, the advertisement exposure control server AOCS determines whether the URL address value or key word transmitted from the client terminal 2 is the information pre-registered in the database by comparing them, and, if it is the pre-registered information, the advertisement exposure control server AOCS extracts information of a category matching the transmitted URL address value or key word (ST-c7).

The advertisement exposure control server AOCS extracts the spot advertisement data based on the matching category information (ST-c8). The advertisement exposure control server AOCS determines whether there is any new product advertisement data stored in the new product advertisement database (ST-c9), and, if the new product advertisement data is the pre-registered one, it extracts the corresponding new product advertisement data (ST-c11) and combines it with the spot advertisement data (ST-c12).

The advertisement exposure control server AOCS transmits the combined advertisement data to the client terminal 2 (ST-c13) so that the spot advertisement data and the new product advertisement data to the sub area 16 of the web browser of the client terminal 2 (ST-c14).

In step ST-c9, if the new product advertisement data is not pre-registered, the advertisement exposure control server AOCS transmits the spot advertisement data to the client terminal 2 (ST-c10).

In another embodiment, the spot advertisement data of the present invention may be sorted in order of high selling price, in order of a large number of products, in order of a large number of clicks of advertisement data, in order of high advertisement payment cost per click, or the like, and the advertisement data with high priority among them may be extracted first.

Referring to FIG. 45, FIG. 45 shows a process in which the spot advertisement data or new product advertisement data is extracted by reflecting the interested information pre-registered by the user. The advertisement exposure control server AOCS may register the interested information about the corresponding user's items of interest, categories of interest, products of interest, brands of interest, and so on based on the user's input from the client terminal 2 (ST-c20).

When the URL address value or key word and platform application unique number are received from the client terminal 2, the advertisement exposure control server AOCS determines whether or not the corresponding URL data or key word is the pre-registered information by comparison between itself and that in the database. In this case, the advertisement exposure control server AOCS determines whether or not there is the interested information pre-registered by the corresponding user by using the unique number of the platform application c28 installed in the client terminal 2 (ST-c21).

If the user has pre-registered the interested information, the advertisement exposure control server AOCS extracts the advertisement data that corresponds to the category or product reflecting the interested information of the corresponding user (ST-c23).

The advertisement exposure control server AOCS combines the extracted advertisement data (ST-c24), and transmits the combined advertisement data to the client terminal (ST-c25) so as to be output (ST-c26).

If the user has not registered the interested information, the advertisement exposure control server AOCS extracts the new product advertisement data in the same order as the above-described embodiment (ST-c22).

Meanwhile, whether the spot advertisement data related to the interested items or new product advertisement data is to be output to the spot advertisement area 16 may be preset by the user.

Figure 46:
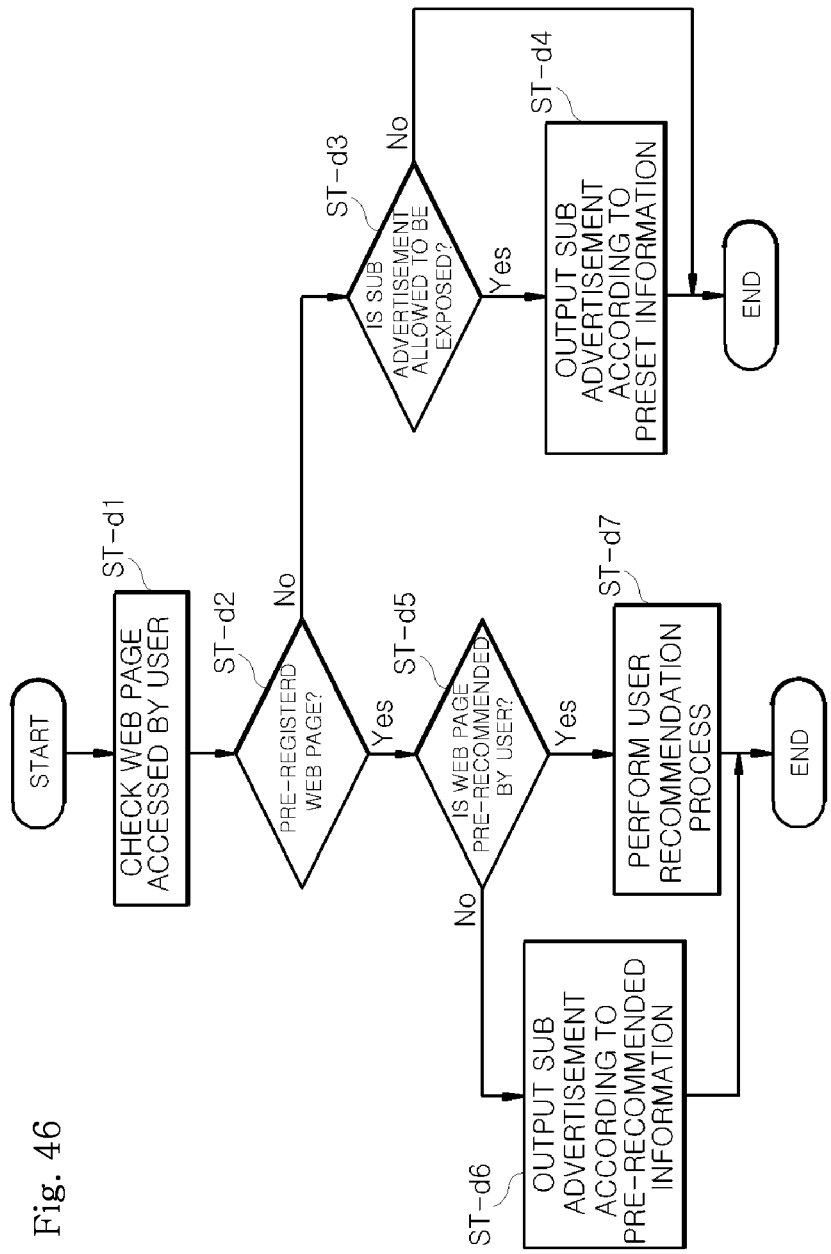
FIG. 46 is a flowchart describing the operation of the control system for advertisement exposure in accordance with still another embodiment of the present invention.

FIG. 46 is a flowchart describing the operation of the control system for advertisement exposure in accordance with another embodiment of the present invention.

First, when the user tries to access a certain web page to be output to the main area 14 through the client terminal 2, the advertisement exposure control server AOCS checks whether or not the corresponding web page is the pre-registered web page (ST-d1). In step ST-d1, for example, it may be checked whether the corresponding web page is a pre-registered affiliated site or advertiser's site. This information about whether it is the pre-registered web page may be pre-stored in the advertisement exposure control server AOCS.

If the corresponding web page is the pre-registered web page (Yes in ST-d2), the advertisement exposure control server AOCS checks whether or not a certain sub advertisement is allowed to be exposed to the sub area 16 (ST-d3). In step ST-d3, for example, it may be checked whether an affiliated company of the pre-registered web page or advertiser wants to expose the sub advertisement to the sub area 16. Information about whether the sub advertisement is allowed to be output may be pre-stored in the advertisement exposure control server AOCS. In this embodiment, the information about whether the sub advertisement is allowed to be exposed may include information on a concrete category of advertisement information that is allowed or not allowed to be exposed.

In step ST-d3, if the sub advertisement is allowed to be exposed, the advertisement exposure control server AOCS outputs a certain category of sub advertisement to the sub area 16 based on the predetermined information. In step ST-d3, if the sub advertisement is not allowed to be exposed, the advertisement exposure control server AOCS outputs no sub advertisement to the sub area 16.

In the previous step ST-d2, if the corresponding web page is not the pre-registered page, the advertisement exposure control server AOCS checks whether the corresponding web page is a web page pre-recommended by the user (ST-d5). In step ST-d5, information about whether the corresponding web page is a web page pre-recommended by the user may be pre-stored in the advertisement exposure control server AOCS.

In step ST-d5, if the corresponding web page is a web page pre-recommended by the user, the advertisement exposure control server AOCS outputs a certain category of sub advertisement to the sub area 16 based on the pre-recommended information (ST-d6). In step ST-d5, if the corresponding web page is not a web page pre-recommended by the user, the advertisement exposure control server AOCS performs a web page commendation process by the user (ST-d7). The web page recommendation by the user was described with reference to FIG. 19, and therefore, a detailed description thereof will be omitted.

While the present invention have been described with respect to the preferred embodiments, it will be apparent to those skilled in the art that the present invention is not limited thereto, but may be practiced in various ways within the scope of the appended claims.

What is claimed is:

1. A control system for advertisement exposure, the system comprising:
   a client terminal (2) including a web browser (10) having a main area (14) and a toolbar area (16), the client terminal being configured to communicate with a main advertisement data offering server (8) and output main advertisement data on the main area (14) of the web browser (10);
   a main advertiser terminal (4) configured to upload the main advertisement data onto the main advertisement data offering server (8); and
   a sub advertiser terminal (6) configured to upload sub advertisement data onto an advertisement exposure control server (AOCS),
   wherein the AOCS is configured to:
   transmit a platform application for communications with the AOCS to the client terminal;
   receive category information or unique code value information for each main advertisement included in the main advertisement data from the client terminal; and
   output a sub advertisement out of the uploaded sub advertisement data on the toolbar area of the web browser, wherein the output sub advertisement does not match with the main advertisement output on the main area of the web browser, and
   wherein the client terminal is installed with the platform application for controlling the output of the sub advertisement on the toolbar area received from the AOCS and configured to extract the category information or the unique code value information from the main advertisement and transmit the category information or the unique code value information to the AOCS.

2. The control system of claim 1, wherein the toolbar area comprises at least one toolbar icon and a URL input window.

3. The control system of claim 1, wherein, when the sub advertisement is clicked on the toolbar area, the client terminal is configured to transmit a corresponding click signal to the AOCS.

4. The control system of claim 1, wherein the AOCS comprises a main advertisement management processor for managing the main advertisement data, and a sub advertisement management processor for managing the sub advertisement data.

5. The control system of claim 1, wherein the main advertisement data offering server is configured to save the unique code value information corresponding to the main advertisement.

6. The control system of claim 1, wherein the platform application is configured to set a predetermined standard value as the unique code value information.

7. The control system of claim 6, wherein the predetermined stand value includes a position value and a size value of the toolbar area.

8. The control system of claim 1, wherein the platform application is configured to automatically extract the category information or the unique code value information included in the main advertisement data when the client terminal receives the main advertisement data.

* * * * *